(12) United States Patent
Ohta et al.

(10) Patent No.: US 7,188,224 B2
(45) Date of Patent: Mar. 6, 2007

(54) CONTENT DUPLICATION MANAGEMENT SYSTEM AND NETWORKED APPARATUS

(75) Inventors: Yuusaku Ohta, Neyagawa (JP); Hiroki Yamauchi, Ibaraki (JP); Masaya Miyazaki, Ikeda (JP); Natsume Matsuzaki, Mino (JP); Toshihisa Abe, Izumisano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 607 days.

(21) Appl. No.: 10/649,890

(22) Filed: Aug. 28, 2003

(65) Prior Publication Data

US 2004/0078338 A1   Apr. 22, 2004

(30) Foreign Application Priority Data

Aug. 28, 2002  (JP) .............................. 2002-249241

(51) Int. Cl.
  *G06F 12/14* (2006.01)
(52) U.S. Cl. ................... 711/163; 711/152; 711/164; 705/57; 713/156
(58) Field of Classification Search ...................... None
  See application file for complete search history.

(56) References Cited

U.S. PATENT DOCUMENTS

| | | | | |
|---|---|---|---|---|
| 5,956,715 | A * | 9/1999 | Glasser et al. ................. 707/9 |
| 6,978,376 | B2 * | 12/2005 | Giroux et al. ................. 713/189 |
| 2002/0078361 | A1 * | 6/2002 | Giroux et al. ................. 713/183 |
| 2002/0091848 | A1 * | 7/2002 | Agresta et al. .............. 709/231 |
| 2002/0116614 | A1 | 8/2002 | Shibasaki |
| 2003/0076955 | A1 | 4/2003 | Alve et al. |
| 2003/0084332 | A1 * | 5/2003 | Krasinski et al. ........... 713/200 |
| 2003/0195854 | A1 * | 10/2003 | Wittkotter ..................... 705/51 |

FOREIGN PATENT DOCUMENTS

| | | |
|---|---|---|
| EP | 1 061 514 A2 | 12/2000 |
| JP | 2000-357213 | 12/2000 |

OTHER PUBLICATIONS

Eskicioglu, A. M. et al., "An overview of multimedia content protection in consumer electronics devices", Signal Processing Image Communication, 2001, pp. 681-699.

* cited by examiner

*Primary Examiner*—B. James Peikari
(74) *Attorney, Agent, or Firm*—Wenderoth, Lind & Ponack, L.L.P.

(57) ABSTRACT

A highly-convenient content duplication management system for allowing users to duplicate a content as long as the duplication is in compliance with a given usage right. In the system, a request destination device stores a content and a permitted number of duplications of the content. In response to a duplication request, the request destination device judges whether or not the request source device is an in-group device that belongs to the same group as the request destination device. When judging that the request source device is an in-group device, the request destination device transmits the content together with a permitted number that is equal to or smaller than the currently stored permitted number. The request destination device then updates the currently stored permitted number by subtracting the permitted number transmitted.

20 Claims, 35 Drawing Sheets

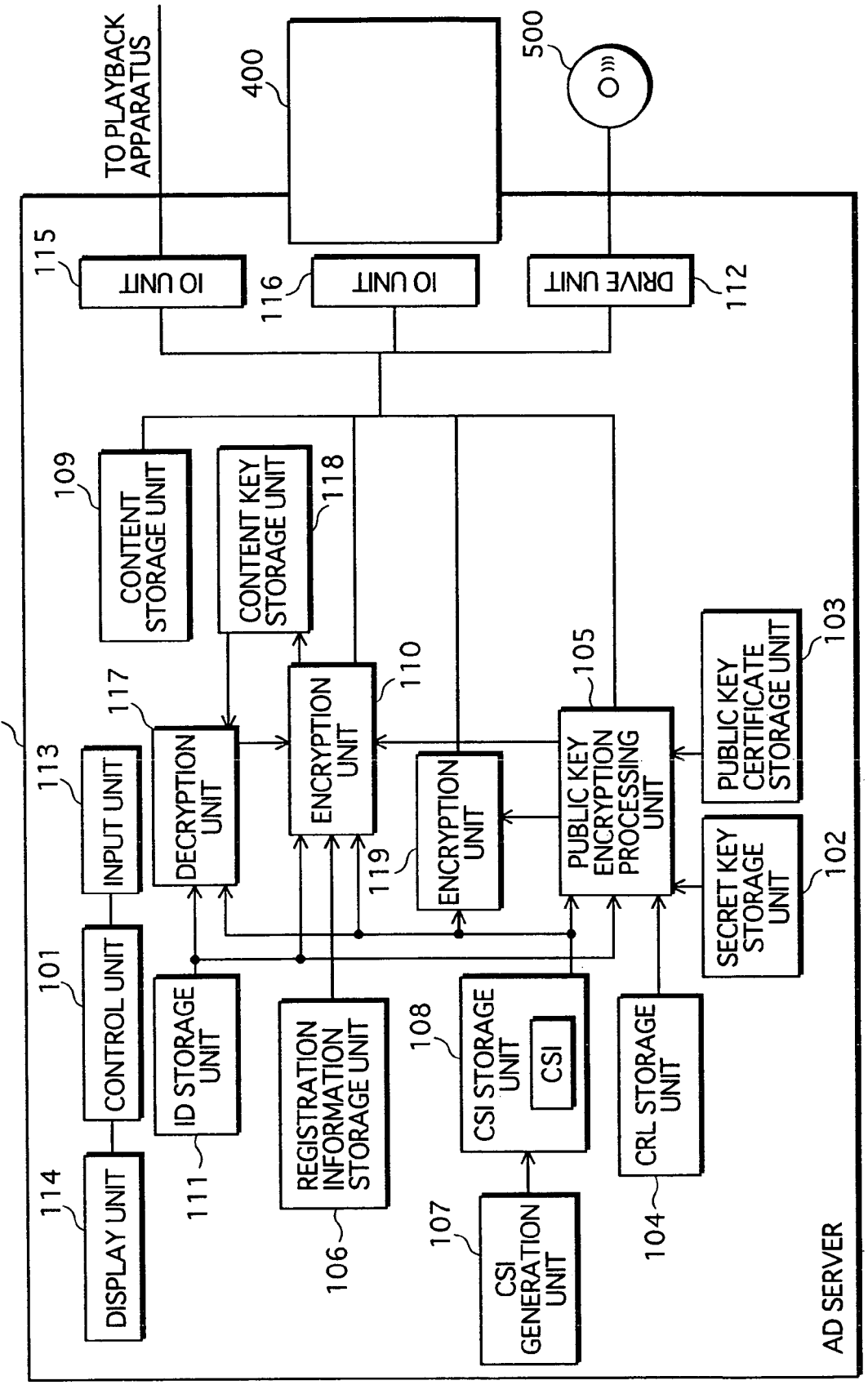

FIG.3A

| REGISTRATION INFORMATION | |
|---|---|
| DEVICE ID | |
| MAXIMUM | 2 |
| REGISTERED | 0 |
| REMAINING | 2 |
| IC CARD ID | ID_4 |

FIG.3B

| REGISTRATION INFORMATION | |
|---|---|
| DEVICE ID | ID_2 |
| | ID_3 |
| MAXIMUM | 2 |
| REGISTERED | 2 |
| REMAINING | 0 |
| IC CARD ID | ID_4 |

ON-VEHICLE REGISTRATION (2)

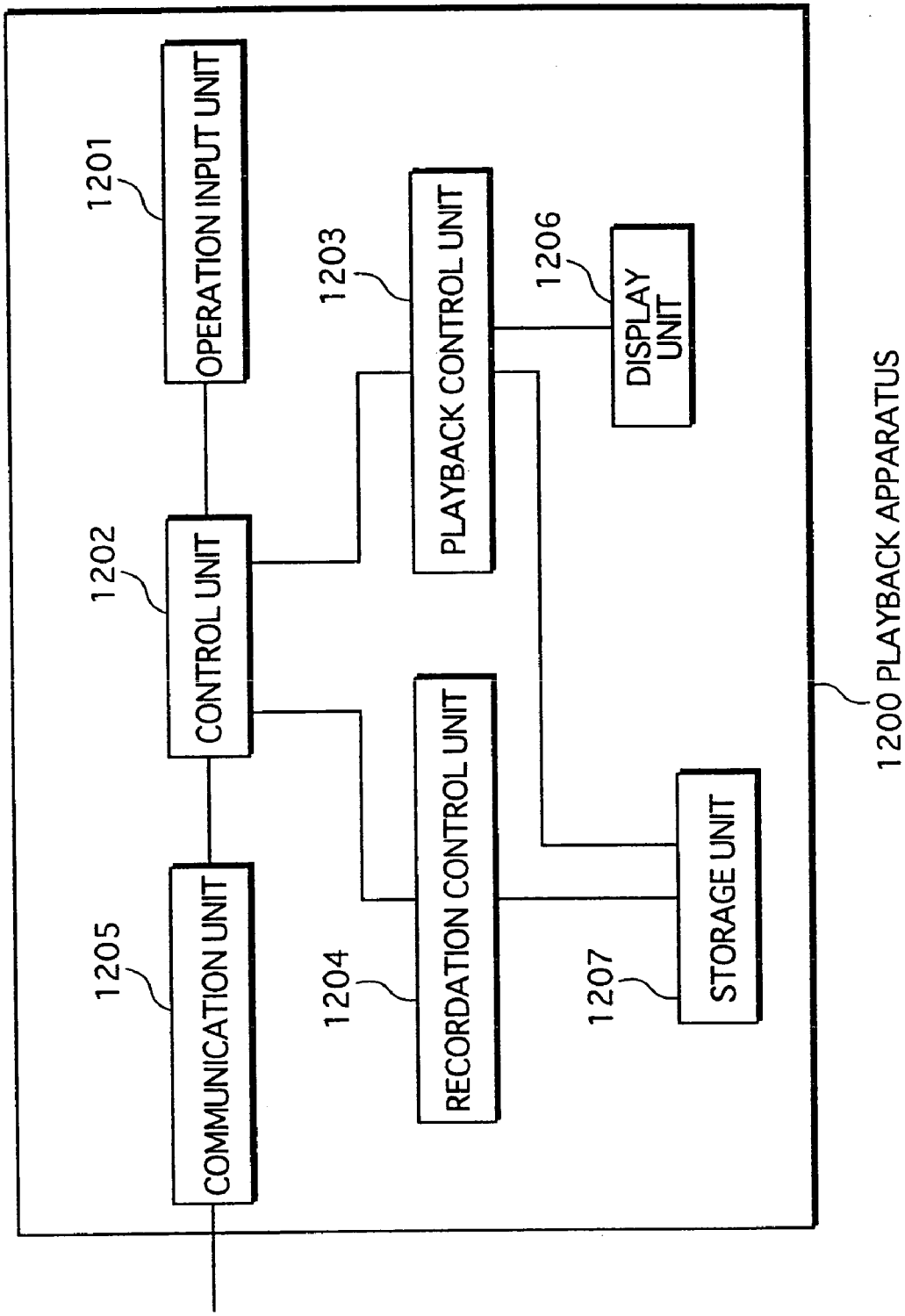

CONTENT DUPLICATION MANAGEMENT SYSTEM AND NETWORKED APPARATUS

This application is based on application No. 2002-249241 filed in Japan, the content of which is hereby incorporated by reference.

BACKGROUND OF THE INVENTION (1) Field of the Invention

The present invention relates to a technology of managing duplication of contents in the use of the contents in a networked environment.

(2) Description of the Related Art

Conventionally, there are several known techniques to restrict an unlimited duplication of contents. One example is copy generation management that prohibits a copy or duplication of a duplicated content (a third generation duplication). Another example is disclosed in Japanese unexamined patent application publication No. 2000-357213 that requires mutual authentication to be performed between a transmitting end and a receiving end and allows duplication of a content according to the authentication result.

The above copy generation management technique and the one disclosed in the above publication gazette are mainly applied to a system composed of a recording apparatus and a recording medium. Examples of such a recording apparatus include a personal computer and a recorder, while examples of such a recording medium include a DVD and an SD card. In such a system, a recording apparatus collectively manages control information that is used, for example, to restrict the number of times that contents can be duplicated.

Unfortunately, however, the above conventional techniques involve the following problems when applied to distributing contents via a network.

Suppose, for example, contents are used in a home network environment in which a plurality of devices are mutually connected. In this case, a recording apparatus is the only apparatus that manages control information that is used, for example, to restrict the number of times each content can be duplicated. Consequently, in order to duplicate a content, all the other devices need to make a request to the recording apparatus, and then receive the content from the recording apparatus. In other words, any content cannot be transmitted unless the recording apparatus is the transmitting end. Such usage of contents in a home network environment is inconvenient for users and thereby fails to meet the users' need for high usability.

SUMMARY OF THE INVENTION

The present invention is made in view of the above problems. Accordingly, an object of the present invention is to provide a highly-convenient content duplication management system which allows users to freely duplicate contents as long as it is in compliance with the given usage right.

To achieve the object stated above, one aspect of the present invention provides a networked apparatus that belongs to a group and that is connected via a network to at least one device in the group and to at least one device out of the group. The networked apparatus: stores a content; receives, from a device, a duplication request for the content; judges whether the device is in the group or out of the group; and duplicates the content to the device if the device is judged to be in the group, and imposes restrictions on duplication of the content to the device if the device is judged to be out of the group.

With the above-stated structure, the networked apparatus prevents unlimited duplication of the content as well as unauthorized distribution of the content to an out-of-group device.

The networked apparatus may store duplication restricting information that is attached to the content. The duplication restricting information shows (i) a permitted number representing a right to duplicate the content, and (ii) restrictions to be imposed on duplication of the content to a device that is out of the group. The networked apparatus may control duplication of the content based on the duplication restricting information.

With the above-stated structure, the networked apparatus controls duplication of the content based on the duplication restricting information attached to the content. This arrangement eliminates the need to store the duplication restricting information collectively in the networked apparatus.

Each device that is in the group may be one of a first type of device that records a content to a non-portable recording medium and a second type of device that records a content to a portable recording medium. The permitted number may be a sum of a permitted number of duplications to a first type device and a permitted number of duplications to a second type device. If the device issued the duplication request is judged to be in the group, the networked apparatus may judge whether the device is a first type device or a second type device, and control duplication of the content based on the judgment and the duplication restricting information.

With the above-stated structure, the networked apparatus is capable of controlling duplication of the content to a device in the group based on whether the device is a first type or a second type device.

Each device that is in the group may belong to at least one subgroup. The networked apparatus may store, in advance, a first table showing whether or not duplication of the content from a subgroup to another subgroup is permitted. If the device that issued the duplication request is judged to be in the group, the networked apparatus may judge to which subgroup the device belongs, and control duplication of the content based on the judgment, the duplication restricting information, and the first table.

With the above-stated structure, the networked apparatus is further capable of controlling duplication of the content to a device in the group based on the subgroup to which the device belongs.

If the device that issued the duplication request is judged to be in the group, the networked apparatus may transmit, to the device, information showing a permitted number that is equal to or smaller than the stored permitted number so as to transfer at least part of the right to duplicate the content, and if the device that issued the duplication request is judged to be out of the group, the networked apparatus may refuse to perform the transmission to the device.

With the above-stated structure, the networked apparatus transmits a permitted number that is equal to or smaller than the permitted number of duplications that is held by the networked apparatus so as to transfer at least part of the right to duplicate the content. Accordingly, the sum of the permitted numbers held by all the devices in the group remains constant at all times. In other words, the devices in the group are allowed to duplicate the content only within the originally given permitted number.

The networked apparatus may transmit, to the device that issued the duplication request, the content attached by duplication restricting information that includes the permitted number showing the number equal to or smaller than the originally permitted number.

With the above-stated structure, the networked apparatus transmits, to the device that issued the duplication request, the content together with the duplication restricting information showing the permitted number that is equal to or smaller than the permitted number held in the networked apparatus. Upon receiving the content, the request source device is permitted to duplicate the content to another device the number of times shown by the duplication restricting information attached to the received content. With a networked apparatus as described above, it is possible to construct a system that is more convenient for users in comparison with a system in which, for example, a server device collectively manages a permitted number of duplications.

The networked apparatus may store secret information that is also stored in all devices that is in the group, and may judge that the device that issued the duplication request is in the group if the device has the secret information, and otherwise judges that the device is out of the group.

With the above-stated structure, all the devices in the group share the secret information, so that the networked apparatus is allowed to judge whether the device that issued the duplication request is in the group of out of the group.

The networked apparatus may: generate a first permitted number of duplications; generate a second permitted number of duplications by subtracting the first permitted number from the permitted number that is currently stored; transmit the first permitted number and the content to the device that issued the duplication request so as to transfer at least part of the right to duplicate the content; and overwrite the permitted number with the second permitted number.

With the above-stated structure, what is transferred to the device that is judged to be in the group is a part or all of the right to duplicate the content represented by a permitted number that is smaller than or equal to the permitted number held in the networked apparatus. That is to say, the sum of the permitted numbers held in all the devices in the group remains constant at all times. As a result, the devices in the group are allowed to duplicate the content in such a manner that does not exceed the permitted number of duplications that is originally given.

The duplication request may be composed of a requested number of duplications of the content. The networked apparatus may judge whether the stored permitted number is equal to or greater than the requested number, and designate, if the judgment is affirmative, the requested number as the first permitted number, and designate, if the judgment is negative, the permitted number as the first permitted number.

With the above-stated structure, each device is allowed to request an intended number of duplications. Further, the networked apparatus compares the requested number with the permitted number held in the networked apparatus so as to transfer the right to duplicate the content the number of times not exceeding the permitted number of times. As a result, the devices in the group are allowed to duplicate the content only within the permitted number of times that is originally given.

Each device that is in the group may be one of a first type device that records a content to a non-portable recording medium and a second type device that records a content to a portable recording medium. The permitted number may be a sum of a permitted number of duplications to a first type device and a permitted number of duplications to a second type device. The duplication request may be composed of a requested number of duplications of the content to a first type device and a requested number of duplications of the content to a second type device. The networked apparatus may judge whether or not each of the two permitted numbers are equal to or greater than a corresponding one of the two requested numbers, and designate, if the judgment is affirmative, a sum of the two requested numbers as the first permitted number, and designate, if the judgment is negative, a sum of the two permitted numbers as the first permitted number.

With the above-stated structure, the networked apparatus is capable of controlling duplication of the content to a device in the group in accordance with whether the device is a first type device or a second type device.

Each device that is in the group may belong to at least one subgroup. The networked apparatus may: store a first table showing whether duplication of the content from a subgroup to another subgroup is permitted; judge with reference to the first table whether or not duplication of the content to the device issued the duplication request is permitted; and generate the first permitted number if the judgment is affirmative.

Also, the networked apparatus may further store a second table showing subgroup identifiers that are each associated with an upper limit to a permitted number that is possibly held in total by devices belonging to a subgroup identified by a corresponding subgroup identifier. The duplication request may include a subgroup identifier identifying a subgroup to which the device that issued the duplication request belongs. The networked apparatus may generate the first permitted number with reference to the second table.

With the above-stated structure, duplication of the content between devices in the group may be restricted. For example, suppose that the group represents a home network, it is possible to restrict duplication by prohibiting a device located in a child's room to duplicate a TV program that is not considered suitable for children. Similarly, it is possible to prohibit a device located in a library to duplicate a children's program.

The networked apparatus may transmit, to the device that issued the duplication request, the first and second tables together with the content and the first permitted number.

With the above-stated structure, the networked apparatus transmits the content together with information relating to subgroups. This arrangement eliminates the need for all the devices in the group to store such information in advance.

The networked apparatus may further clock a date-and-time, and store a predetermined date-and-time and a post-update permitted number. When the clocked date-and-time reaches the predetermined date-and-time, the networked apparatus may update the stored permitted number by overwriting it with the post-update permitted number.

With the above-stated structure, it is possible to update the permitted number of duplications at the predetermined date-and-time.

The networked apparatus may further clock a date-and-time, and store a predetermined date-and-time and information identifying a device to which the content is to be duplicated. When the clocked date-and-time reaches the predetermined date-and-time, the networked apparatus may transmit, to the identified device, the content together with a permitted number that is equal to or smaller than the stored permitted number so as to transfer at least part of the right to duplicate the content.

With the above-stated structure, duplication processing may be performed at a predetermined date-and-time, which allows a user to program the apparatus to duplicate the content at a scheduled time.

If the device that issued the duplication request is judged to be out of the group, the networked apparatus may transmit, to the device, the content together with a right to play back the content.

With the above-stated structure, the networked apparatus transmits the content to a device out of the group with a right to play back the content but without a right to duplicate the content. Accordingly, an unlimited distribution of the content is prevented.

In another aspect of the present invention, the present invention provides a content duplication management system including a first device that belongs to a group and a second device connected to the first device via a network. The first device: stores a content and a permitted number representing a right to duplicate the content; receives, from the second device, a duplication request for the content; judges whether or not the second device belongs to the group; and transmits, to the second device if the second device is judged to belong to the group, information showing a permitted number that is equal to or smaller than the stored permitted number so as to transfer at least part of the right to duplicate the content, and refuses to perform the transmission to the second device if the second device is judged to be out of the group. The second device: transmits, to the first device, a duplication request for the content; and receives permission from the first device to store the content and the permitted number of duplications.

With the above-stated structure, the content duplication management system protects the content from unlimited distribution to a device out of the group, while allowing duplication of the content to a device in the group only within the permitted number of duplications.

The content duplication management system may further include a plurality of devices that belong to the group. The first device may further transmit, to each of the devices, detection information used to detect the requested content. Each of the devices may receive the detection information and perform a search based on the detection information to judge whether or not the requested content is stored within the device.

With the above-stated structure, the content duplication management system is capable of specifying all devices each of which is in the group and stores a desired content.

BRIEF DESCRIPTION OF THE DRAWINGS

These and other objects, advantages and features of the invention will become apparent from the following description thereof when taken in conjunction with the accompanying drawings which illustrate a specific embodiment of the invention.

In the drawings:

FIG. 2 is a block diagram showing a structure of an AD server 100;

FIGS. 3A and 3B show a structure of registration information;

FIG. 25 is a block diagram showing a structure of a playback apparatus 1200;

DETAILED DESCRIPTION OF THE PREFERRED EMBODIMENT

An embodiment of the present invention will now be described in detail with reference to the drawings.

Group Formation/Management System 1

<Structure of Group Formation/Management System>

Figure 1:
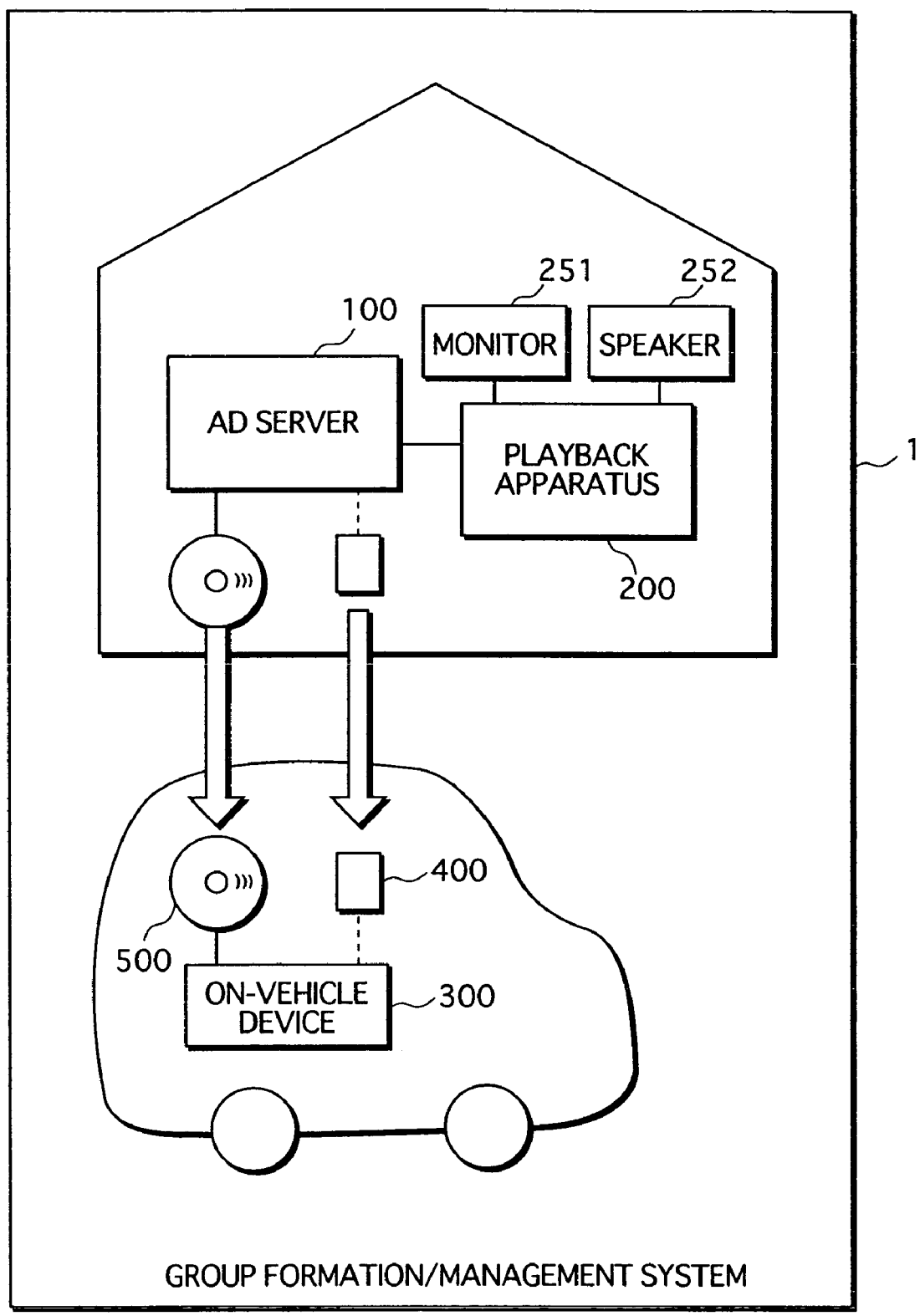
FIG. 1 is a block diagram showing an overall structure of a group formation/management system 1.

As shown in FIG. 1, a group formation/management system 1 is structured from an authorized domain (AD)

server 100, a playback apparatus 200, an on-vehicle device 300, an IC card 400, and a DVD 500.

AD server 100 and playback apparatus 200, which is connected to a monitor 251 and a speaker 252, are disposed in a user's home and are connected online. On-vehicle device 300 is mounted in a vehicle owned by the user. IC card 400 and DVD 500 are connectable to AD server 100 and on-vehicle device 300. IC card 400 is affiliated with AD server 100, and AD server 100 only operates when IC card 400 is connected thereto.

Group formation/management system 1 is a system in which AD server 100 manages an authorized domain (AD), being a range within which content usage is permitted.

AD server 100 receives and manages the registration of client devices, and AD server 100 registers and manages client devices that share common secret information (CSI) that is generated by AD server 100. Mutual authentication using shared CSI is conducted among devices within the same authorized domain, and when authorization is successful, transmission/reception, copying and the like of contents is conducted among these devices. Because the CSI differs between authorized domains, devices not holding the CSI of the authorized domain managed by AD server 100 cannot transmit/receive or copy contents that are available within the authorized domain of AD server 100.

Playback apparatus 200 is connected to AD server 100 and is thus able to conduct authentication and to register as a client device. Also, on-vehicle device 300, although not connected to AD server 100, is able to register as a client device by having CSI stored on IC card 400 and notifying the CSI from IC card 400 to on-vehicle device 300.

1.1 Structure of AD Server 100

As shown in FIG. 2, AD server 100 is structured from a control unit 101, a secret-key storage unit 102, a public-key-certificate storage unit 103, a CRL storage unit 104, a public-key-encryption processing unit 105, a registration-information storage unit 106, a CSI generation unit 107, a CSI storage unit 108, a content storage unit 109, an encryption unit 110, an ID storage unit 111, a drive unit 112, an input unit 113, a display unit 114, an input/output (IO) unit 115, an input/output (IO) unit 116, a decryption unit 117, a content-key storage unit 118, and an encryption unit 119.

AD server 100 is specifically a computer system structured from a microprocessor, a ROM, a RAM, a hard disk unit and the like. A computer program is stored on the RAM or the hard disk unit. AD server 100 carries out functions as a result of the microprocessor operating in accordance with the computer program.

AD server 100 conducts processing to register devices, manage copying of CSI and withdrawals, deliver contents, and copy contents.

Each of the elements will now be described.

(1) IO Unit 115, 116, Drive Unit 112

IO unit 115 conducts transmission/reception of data with playback apparatus 200. IO unit 116, when the connection of IC card 400 is detected, outputs the detection to control unit 101. Also, IO unit 116 conducts transmission/reception of data with IC card 400. Drive unit 112 writes/reads data to/from DVD 500.

(2) Secret-Key Storage Unit 102, Public-Key-Certificate Storage Unit 103, CRL Storage Unit 104, Content Storage Unit 109, ID Storage Unit 111, Content-Key Storage Unit 118

ID storage unit 111 stores an ID_1, which is an identifier (ID) unique to AD server 100.

Public-key-certificate storage unit 103 stores a public key certificate (PKC) Cert_1.

PKC Cert_1 certifies that a public key PK_1 is the legitimate public key of AD server 100. PKC Cert_1 includes signature data Sig_CA1, public key PK_1, and ID_1. Signature data Sig_CA1 is generated by a certification authority (CA) performing a signature algorithm S on public key PK_1 and ID_1. Here, a CA is a reliable third party authority that issues public key certificates certifying the legitimacy of the public keys of devices belonging to group formation/management system 1. Moreover, signature algorithm S is, as one example, an ElGamal signature over a finite field. Since ElGamal signatures are a known technology, a description thereof is omitted here.

Secret-key storage unit 102 is a tamper-resistant area that cannot be viewed from outside AD server 100, and stores a secret key SK_1 corresponding to public key PK_1.

CRL storage unit 104 stores a certificate revocation list (CRL). A CRL is a list, issued by a CA, in which are registered the IDs of invalidated devices are registered. Invalidated devices are devices that have conducted improper processing, devices whose secret key has been disclosed, and the like. Moreover, it need not be device IDs that are registered in a CRL, but may be the serial numbers of public key certificates held by invalidated devices. A CRL is distributed to devices, for example, via a broadcast, the Internet or stored on a recording medium such as a DVD, and devices obtain the most recent CRL. Moreover, a detailed disclosure of CRLs can be found in the American National Standards Institute's ANSI X9.57: "Public Key Cryptography for the Financial Services Industry: Certificate Management," 1997.

Content storage unit 109 stores encrypted contents that are encrypted by using content keys. Moreover, although the method of acquiring contents is not the subject of the present invention and a description is thus omitted here, acquisition methods include, for example, acquiring contents using the Internet, broadcasts or the like, or acquiring contents from a recording medium such as a DVD.

Content-key storage unit 118 receives an encrypted content key a from encryption unit 110, and stores the encrypted content key a.

(3) Public-Key-Encryption Processing Unit 105

Public-key-encryption processing unit 105 conducts authentication at a time of communicating with another device, and establishes a secure authenticated channel (SAC). A SAC refers to a safe communication channel that enables encrypted communication. As a result of processing to establish a SAC, it is possible to confirm that the device being authenticated is a legitimate device recognized by the CA. A detailed description of the SAC establishment method is given later. Also, public-key-encryption processing unit 105, as a result of the authentication, shares a session key SK.

(4) Registration-Information Storage Unit 106

Registration-information storage unit 106 is a tamper-resistant area, and stores registration information as shown in FIG. 3A. Registration information is information for managing the number of devices that are registerable in AD server 100 and the ID of registered devices, and is structured from DEVICE ID, MAXIMUM, REGISTERED, REMAINING, and IC CARD ID.

DEVICE ID is an area storing the ID of devices registered in AD server 100. When playback apparatus 200 and on-vehicle device 300 are registered in AD server 100, an ID_2 and an ID_3, being the respective IDs of devices 200 and 300, are stored, as shown in FIG. 3B.

MAXIMUM shows the maximum number of devices that can be registered in AD server 100, the maximum number being two in the present embodiment. REGISTERED shows the number of devices already registered in AD server 100. REMAINING shows the remaining number of devices that can be registered in AD server 100.

In an initial state in which no client devices are registered in the authorized domain managed by AD server 100, the registered number (REGISTERED) is "0", and the remaining number (REMAINING) has the same value as the maximum number (MAXIMUM). When a client device is registered in the authorized domain by AD server 100, "1" is added to the registered number, and "1" is subtracted from the remaining number.

IC CARD ID prestores the ID of IC card 400 affiliated with AD server 100, and cannot be rewritten.

(5) CSI Generation Unit 107, CSI Storage Unit 108

CSI storage unit 108 is a tamper-resistant area storing a CSI that cannot be read from outside AD server 100, and stores, when no devices are registered in AD server 100, "0" as a value showing that no devices are registered.

CSI generation unit 107 generates CSI when a device is initially registered in AD server 100, under the control of control unit 101. Also, when all of the devices withdraw, CSI storage unit 108 rewrites the stored value to "0".

Here, CSI is arbitrary data generated by CSI generation unit 107, and has a 200-bit length in the present embodiment. Moreover, the bit length of the CSI is not limited to this, and may be any length that is not readily estimatable, and that cannot be easily tested.

CSI generation unit 107 stores generated CSI in CSI storage unit 108. Also, CSI generation unit 107 outputs generated CSI to IC card 400 when IC card 400 is connected to AD server 100.

Moreover, CSI may be updated regularly or irregularly.

(6) Encryption Unit 110, Encryption Unit 119

Encryption unit 119, at a time of playback apparatus 200 being registered and under the control of control unit 101, performs an encryption algorithm E on CSI by using a session key SK received from public-key-encryption processing unit 105 to generate encrypted CSI, and transmits the encrypted CSI to playback apparatus 200 via IO unit 115. Here, encryption algorithm E is, as one example, a Data Encryption Standard (DES) algorithm. Since DES algorithms are known technology, a description thereof is omitted here.

Encryption unit 110, at a time of storing a content key in content-key storage unit 118, reads ID_1 from ID storage unit 111 and reads CSI from CSI storage unit 108. Encryption unit 110 concatenates the read ID_1 and CSI in the stated order to generate an encryption key a, performs an encryption algorithm E on the content key by using encryption key a to generate encrypted content key a, and outputs encrypted content key a to content-key storage unit 118.

Encryption unit 110, at a time of writing an encrypted content onto DVD 500 and under the control of control unit 101, reads ID_2 and ID_3, which are the IDs of the registered devices, from DEVICE ID of the registered information in registration-information storage unit 106. Encryption unit 110 concatenates ID_2 and CSI in the stated order to generate an encryption key b, and concatenates ID_3 and CSI in the stated order to generate an encryption key c. An encrypted content key b and an encrypted content key c are respectively generated by using encryption key b and encryption key c, and written to DVD 500.

(7) Decryption Unit 117

Decryption unit 117, under the control of control unit 101, reads ID_1 stored in ID storage unit 111 and reads CSI stored in CSI storage unit 108. Decryption unit 117 performs a decryption algorithm D on encrypted content key a read from content-keys to rage unit 118, by using a decryption key generated by concatenating the read ID_1 and CSI in the stated order, to obtain a content key. Decryption unit 117 outputs the obtained content key to encryption unit 110. Here, decryption algorithm D is an algorithm for conducting the reverse processing of encryption algorithm E.

(8) Control Unit 101, Input Unit 113, Display Unit 114

Input unit 113 receives inputs from a user, and outputs the received inputs to control unit 101.

At a time of starting processing, control unit 101, upon receipt of an IC card ID from connected IC card 400, confirms whether or not the received ID matches the IC card ID in the registration information. If the IC card IDs do not match, control unit 101 displays on display unit 114 the fact that the connected IC card is not the IC card affiliated with AD server 100, and ends the processing. If the IC card IDs match, control unit 101 continues the processing as follows.

Registration of Playback Apparatus 200

Upon receipt of a registration request from playback apparatus 200 via IO unit 115, control unit 101 controls public-key-encryption processing unit 105, and establishes a SAC using a CSI initial value "0", by the SAC establishment method to be described later (here, the CSI initial value "0" used at a time of registration indicates that playback apparatus 200 has yet to be registered). From the result of the device authentication at a time of establishing the SAC, control unit 101 judges whether or not the target device has an authorized public key pair and whether or not the target device is unregistered. If the target device has the authorized public key pair and CSI having a "0" value, authentication is judged to be successful. If the target device does not hold CSI having a "0" value, control unit 101 judges the target device to already be registered in another authorized domain. Moreover, whether or not the authorized domain in which the target device is registered is the authorized domain managed by AD server 100 may be judged by confirming whether or not the CSI of the target device matches the CSI stored in CSI storage unit 108.

When it is judged that the target device is unregistered, control unit 101 reads registration information from registration-information storage unit 106, and judges whether or not the remaining number of devices is "0". If the remaining number is not "0", control unit 101 judges whether or not the registered number is "0". If the registered number is "0", control unit 101 controls CSI generation unit 107 to generate CSI, and stores the generated CSI in CSI storage unit 108. If the registered number is not "0", control unit 101 reads CSI from CSI storage unit 108, has the generated or read CSI encrypted by encryption unit 110 to generate encrypted CSI, and outputs the encrypted CSI to playback apparatus 200 via IO unit 115. Upon receipt from playback apparatus 200 of a receipt notification showing that the outputted CSI has been received, control unit 101 adds "1" to the registered number in the registration information, subtracts "1" from the remaining number, and ends the processing.

If authentication is unsuccessful, or if the target device is registered, or if the remaining number is "0", control unit 101 transmits a registration failure notification to playback apparatus 200 showing that registration is not possible, and ends the processing.

Also, at a time of CSI being generated by CSI generation unit 107, control unit 101 establishes a SAC with IC card 400 and shares session key SK, performs encryption algorithm E on the generated CSI by using session key SK to generate encrypted CSI, and transmits the encrypted CSI to IC card 400.

Registration of On-vehicle Device 300

(a) Upon receipt of an input from input unit 113 showing the copying of CSI when IC card 400, whose ID has already been confirmed, is connected, control unit 101 judges whether or not the remaining number is "0", and if not "0", transmits a permission right to IC card 400 showing that a once-only copy of CSI is permitted. Control unit 101, upon receipt from IC card 400 of a receipt notification, ends the processing.

When the remaining number is "0", control unit 101 displays the fact that copying is not possible on display unit 114, and ends the processing.

(b) When IC card 400 is connected to AD server 100, AD server 100 confirms that the IC card ID has been registered in the registration information, and upon receipt of a copy notification showing that CSI has been copied, control unit 101 extracts the ID of the CSI copy target (i.e. on-vehicle device 300), which is included in the copy notification, and stores the extracted ID as a device ID in the registration information. Also, control unit 101 transmits a receipt notification to IC card 400 showing that the copy target ID has been received.

Moreover, although the above description relates to CSI having been generated, when CSI has not been generated, CSI is generated and transmitted to IC card 400 in the same manner as when playback apparatus 200 is registered.

Content Delivery

Upon receipt of a content delivery request from playback apparatus 200 via IO unit 115, control unit 101 controls public-key-encryption processing unit 105 to establish a SAC by using the SAC establishment method to be described later, and shares session key SK. Since CSI stored in CSI storage unit 108 is used in authentication conducted at the time of establishing the SAC, when authentication is successful, control unit 101 judges that the target device is registered because of the target device holding CSI generated in AD server 100, and when authentication is unsuccessful, control unit 101 judges that the target device is not registered in AD server 100.

When authentication is unsuccessful, control unit 101 transmits a delivery failure notification to playback apparatus 200 showing that distribution of contents is not possible.

When authentication is successful, control unit 101 controls decryption unit 117 to decrypt encrypted content key a stored in content-key storage unit 118 to obtain a content key. Next, control unit 101 controls encryption unit 110 to encrypt the content key by using session key SK to generate an encrypted content key s, and transmits encrypted content key s to playback apparatus 200. Also, control unit 101 reads an encrypted content from content storage unit 109, and transmits the encrypted content to playback apparatus 200.

Recording of a Content onto DVD

Upon receipt of an input from input unit 113 indicating to record a content onto DVD 500, control unit 101 controls decryption unit 117 to decrypt encrypted content key a stored in content-key storage unit 118 to obtain a content key. Next, control unit 101 controls encryption unit 110 to encrypt the content key using encryption key b and encryption key c generated respectively by using ID_2 and ID_3 registered in the registration information to generate encrypted content key b and encrypted content key c, and writes the encrypted content keys b and c to DVD 500. Also, control unit 101 reads an encrypted content from content storage unit 109 and writes the encrypted content to DVD 500.

Moreover, the content key may be encrypted by using an encryption key generated based on an ID that is unique to DVD 500, or an encryption key generated based on the DVD 500 ID and CSI.

Withdrawal

Upon receipt from playback apparatus 200 of a withdrawal request that includes ID_2, control unit 101 controls public-key-encryption processing unit 105 to establish a SAC by using the SAC establishment method to be described later. At this time, control unit 101 conducts authentication by using CSI stored in CSI storage unit 108. From the authentication result at the time of establishing the SAC, control unit 101 judges whether or not the device that sent the request is registered. If control unit 101 judges that the target device is unregistered, control unit 101 transmits an unregistered notification to playback apparatus 200 showing playback apparatus 200 to be unregistered, since it is impossible to withdraw in this case.

When playback apparatus 200 is registered, control unit 101 transmits a deletion notification to playback apparatus 200 indicating to delete CSI. Upon receipt of a deletion-completed notification from playback apparatus 200 showing that deletion of the CSI has been completed, control unit 101 deletes ID_2 from DEVICE ID in the registration information, subtracts "1" from the registered number, and adds "1" to the remaining number.

1.2 Structure of Playback Apparatus 200

Figure 4:
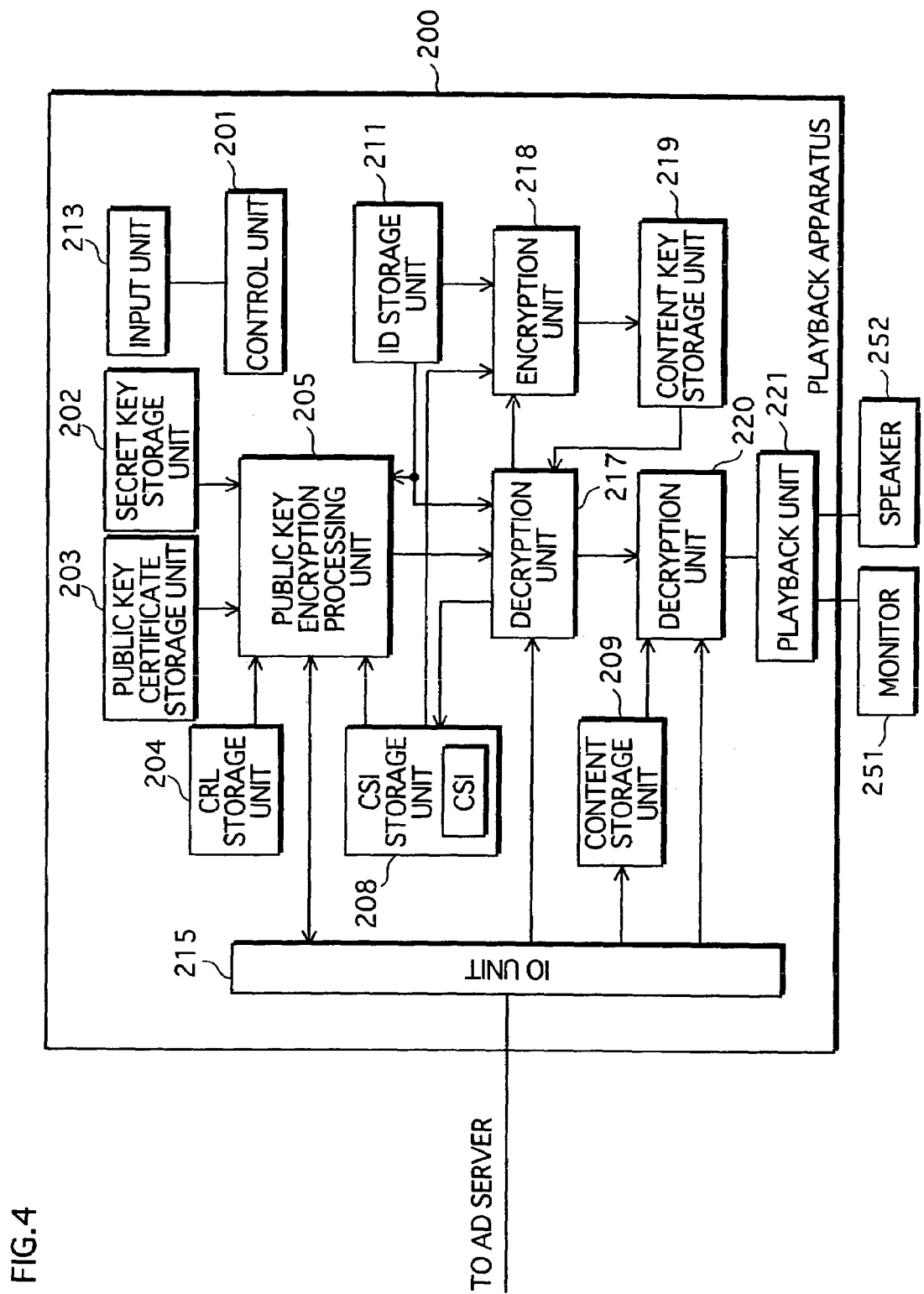
FIG. 4 is a block diagram showing a structure of a playback apparatus 200.

As shown in FIG. 4, playback apparatus 200 is structured from a control unit 201, a secret-key storage unit 202, a public-key-certificate storage unit 203, a CRL storage unit 204, a public-key-encryption processing unit 205, a CSI storage unit 208, a content storage unit 209, an ID storage unit 211, an input unit 213, an input/output (IO) unit 215, a decryption unit 217, an encryption unit 218, a content-key storage unit 219, a decryption unit 220, and a playback unit 221. A monitor 251 and a speaker 252 are connected to playback unit 221.

Playback apparatus 200 is a computer system similar to AD server 100, and a computer program is stored in the RAM or the hard disk unit. Playback apparatus 200 carries out functions as a result of the microprocessor operating in accordance with the computer program.

(1) IO Unit 215

IO unit 215 conducts transmission/reception of data with AD server 100.

(2) Secret-Key Storage Unit 202, Public-Key-Certificate Storage Unit 203, CRL Storage Unit 204, CSI Storage Unit 208, ID Storage Unit 211

CRL storage unit 204 stores the most recent CRL.

ID storage unit 211 stores ID_2, which is the ID that is unique to playback apparatus 200.

CSI storage unit 208 is a tamper-resistant area, and stores "0" showing playback apparatus 200 to be unregistered. When playback apparatus 200 is registered in AD server 100, CSI storage unit 208 stores CSI acquired from AD server 100.

Public-key-certificate storage unit 203 stores a PKC Cert_2 issued by the CA. PKC Cert_2 includes a public key PK_2 of playback apparatus 200, ID_2 of playback apparatus 200, and signature data Sig_CA2 generated by the CA performing signature algorithm S on public key PK_2 and ID_2.

Secret-key storage unit 202 is a tamper-resistant area, and stores a secret key SK_2 corresponding to public key PK_2 of playback apparatus 200.

(3) Public-Key-Encryption Processing Unit 205

Public-key-encryption processing unit 205 establishes a SAC by the SAC establishment method to be described later, at a time of communicating with AD server 100, and shares session key SK. Public-key-encryption processing unit 205 outputs the shared session key SK to decryption unit 217.

(4) Decryption Unit 217, Decryption Unit 220

Decryption unit 217, at a time of a content being distributed from AD server 100, performs decryption algorithm D on encrypted content key s delivered from AD server 100, by using session key SK shared by public-key-encryption processing unit 205, to obtain a content key. Here, decryption algorithm D is an algorithm for conducting the reverse processing of encryption algorithm E.

Also, at a time of playing a content once it is stored, decryption unit 217 reads ID_2 from ID storage unit 211, reads CSI from CSI storage unit 208, and concatenates the read ID_2 and CSI in the stated order to generate a decryption key b. Decryption unit 217 performs decryption algorithm D on encrypted content key b read from content-key storage unit 219, by using the generated decryption key b, to obtain a content key, and outputs the obtained content key to decryption unit 220.

Decryption unit 220 reads an encrypted content stored in content storage unit 209, performs decryption algorithm D on the encrypted content by using the content key received from decryption unit 217 to obtain a content, and outputs the obtained content to playback unit 221.

(5) Encryption Unit 218

Encryption unit 218, at a time of storing a content acquired from AD server 100, reads ID_2 from ID storage unit 211, and reads CSI from CSI storage unit 208. Encryption unit 218 concatenates the read ID_2 and CSI in the stated order to generate encryption key b, and performs encryption algorithm E on the content key received from decryption unit 217 by using the generated encryption key b to generate encrypted content key b, and outputs encrypted content key b to content-key storage unit 219.

(6) Content Storage Unit 209, Content-Key Storage Unit 219

Content storage unit 209 stores encrypted contents transmitted from AD server 100.

Content-key storage unit 219 stores encrypted content key b encrypted by encryption unit 218.

(7) Control Unit 201, Input Unit 213

Registration

Upon receipt by input unit 213 of an input indicating to start the registration processing, control unit 201 reads ID_2 from ID storage unit 211, transmits a registration request that includes ID_2 to AD server 100 via IO unit 215, and establishes a SAC by the SAC establishment method to be described later.

Control unit 201, upon receipt from AD server 100 of a registration failure notification, displays the fact that registration is not possible on monitor 251, and ends the registration processing.

Control unit 201, upon receipt from AD server 100 of encrypted CSI, controls decryption unit 217 to decrypt the encrypted CSI to obtain CSI, and stores the obtained CSI in CSI storage unit 208. Also, control unit 201 transmits a receipt notification to AD server 100 showing that the CSI has been received.

Content Delivery

Upon receipt by input unit 213 of an input indicating to acquire and playback a content, control unit 201 transmits a delivery request to AD server 100.

Control unit 201, upon receipt of a delivery failure notification from AD server 100, displays the fact that delivery is not possible on monitor 251, and ends the processing.

When a received content is to be played, control unit 201, upon receipt of encrypted content key s from AD server 100, controls decryption unit 217 to decrypt encrypted content key s to obtain a content key. Also, upon receipt of an encrypted content from AD server 100, control unit 201 controls decryption unit 220 to decrypt the encrypted content to obtain a content, and has playback unit 221 play the content.

Playback after Accumulating Contents

Upon receipt by input unit 213 of an input indicating to acquire and accumulate contents, control unit 201 conducts the same processing as above to acquire contents. Once contents have been acquired, control unit 201 has decryption unit 217 decrypt encrypted content key s received from AD server 100, controls encryption unit 218 to encrypt the decrypted content key, and stores the encrypted content key in content-key storage unit 219 as encrypted content key b. Also, upon receipt of encrypted contents from AD server 100, control unit 201 stores the encrypted contents in content storage unit 209.

Upon receipt by input unit 213 of an input indicating to playback contents stored in content storage unit 209, control unit 201 controls decryption unit 217 to decrypt encrypted content key b, has decryption unit 220 decrypt the encrypted contents to obtain contents, and has playback unit 221 play the contents.

Withdrawal

Upon receipt by input unit 213 of an input indicating to start withdrawal processing, control unit 201 establishes a SAC by the SAC establishment method to be described later.

Control unit 201, upon receipt of an unregistered notification from AD server 100, displays on monitor 251 the fact that playback apparatus 200 is not registered in AD server 100, and ends the processing.

Control unit 201, upon receipt of a deletion notification from AD server 100, deletes CSI stored in CSI storage unit 208, and stores "0" in CSI storage unit 208 showing playback apparatus 200 to be unregistered. Also, control unit 201 transmits a deletion-completed notification that notifies AD server 100 that deletion of the CSI has been completed.

(8) Playback Unit 221

Playback unit 221 generates video signals from contents received from decryption unit 220, and outputs the generated video signals to monitor 251. Also, playback unit 221 generates audio signals from received contents, and outputs the generated audio signals to speaker 252.

1.4 Structure of On-Vehicle Device 300

Figure 5:
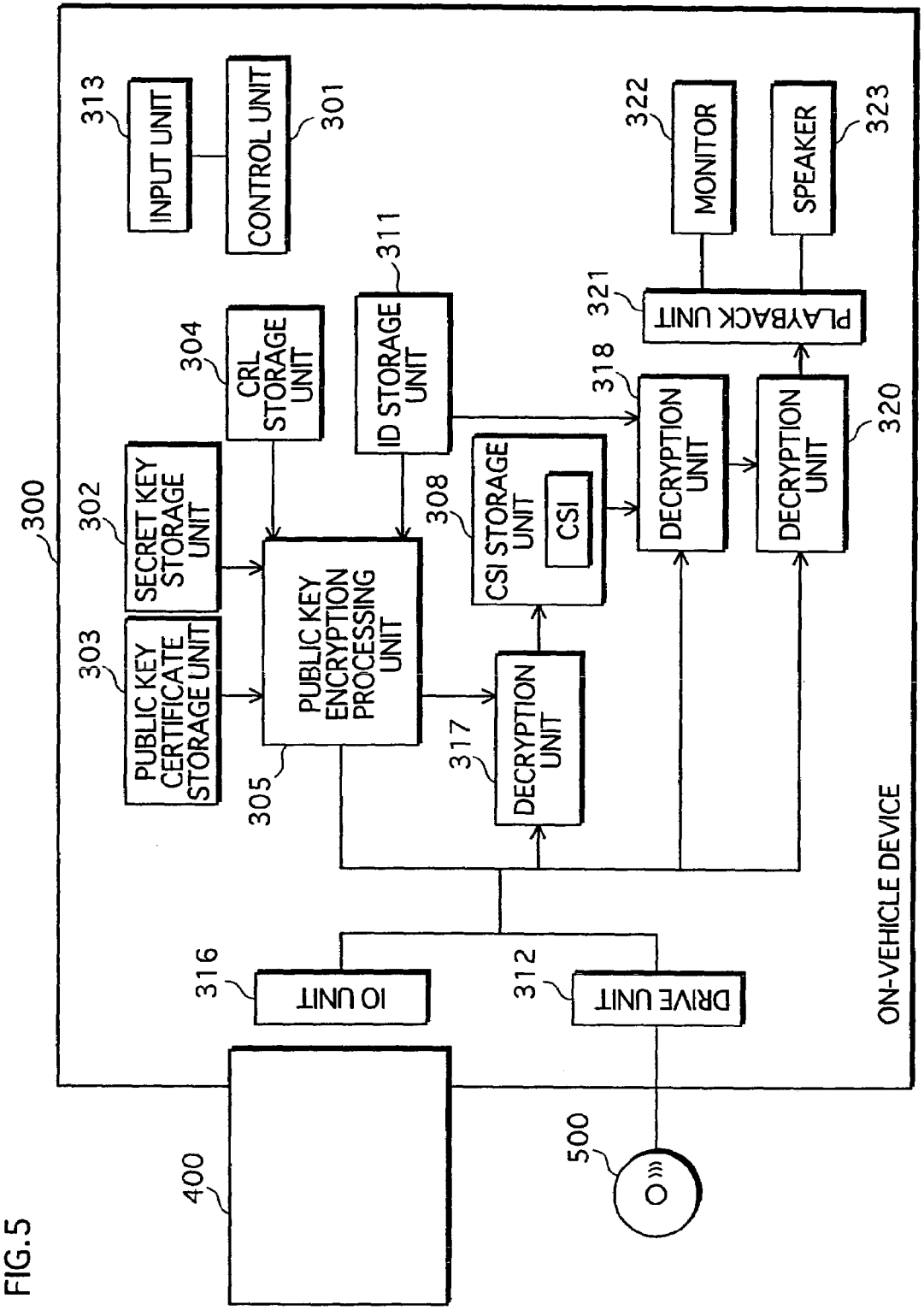
FIG. 5 is a block diagram showing a structure of an on-vehicle device 300.

As shown in FIG. 5, on-vehicle device 300 is structured from a control unit 301, a secret-key storage unit 302, a public-key-certificate storage unit 303, a CRL storage unit 304, a public-key-encryption processing unit 305, a CSI storage unit 308, an ID storage unit 311, a drive unit 312, an input unit 313, an input/output (IO) unit 316, decryption units 317, 318 and 320, a playback unit 321, a monitor 322 and a speaker 323.

On-vehicle device 300 is a computer system similar to AD server 100, and a computer program is stored on the RAM or the hard disk unit. On-vehicle device 300 carries out functions as a result of the microprocessor operating in accordance with the computer program.

(1) Drive Unit 312, IO Unit 316

Drive Unit 312 reads encrypted content key c from DVD 500, and outputs encrypted content key c to decryption unit 318. Also, drive unit 312 reads an encrypted content and outputs the encrypted content to decryption unit 320.

IO unit 316 conducts transmission/reception of data with IC card 400, under the control of control unit 301.

(2) Secret-Key Storage Unit 302, Public-Key-Certificate Storage Unit 303, CRL Storage Unit 304, CSI Storage Unit 308, ID Storage Unit 311

CRL storage unit 304 stores the most recent CRL.

ID storage unit 311 stores ID_3, which is the ID that is unique to on-vehicle device 300.

CSI storage unit 308 is a tamper-resistant area, and stores "0" showing on-vehicle device 300 to be unregistered. Upon receipt from IC card 400 of CSI generated by AD server 100, CSI storage unit 308 stores the received CSI.

Public-key-certificate storage unit 303 stores a PKC Cert_3 issued by the CA. PKC Cert_3 includes a public key PK_3 and ID_3 of on-vehicle device 300, and signature data Sig_CA3 generated by the CA performing signature algorithm S on public key PK_3 and ID_3.

Secret-key storage unit 302 is a tamper-resistant area, and stores a secret key SK_3 corresponding to public key PK_3.

(3) Public-Key-Encryption Processing Unit 305

Public-key-encryption processing unit 305 conducts authentication with IC card 400, under the control of control unit 301, and establishes a SAC by the SAC establishment method to be described later. Also, public-key-encryption processing unit 305 outputs session key SK shared at this time to decryption unit 317.

(4) Decryption Units 317, 318, 320

Decryption unit 317, upon receipt of encrypted CSI from IC card 400 and under the control of control unit 301, performs decryption algorithm D on the encrypted CSI by using session key SK received from public-key-encryption processing unit 305 to obtain CSI, and outputs the obtained CSI to CSI storage unit 308.

At a time of playing a content, decryption unit 318, upon receipt of encrypted content key c from drive unit 312, reads ID_3 from ID storage unit 311 and reads CSI from CSI storage unit 308. Decryption unit 318 concatenates the read ID_3 and CSI in the stated order to generate decryption key c. Decryption unit 318 performs decryption algorithm D on encrypted content key c by using decryption key c to obtain a content key, and outputs the obtained content key to decryption unit 320.

Decryption unit 320 receives an encrypted content from drive unit 312 and a content key from decryption unit 318. Decryption unit 320 performs decryption algorithm D on the encrypted content by using the received content key to obtain a content, and outputs the obtained content to playback unit 321.

(5) Control Unit 301, Input Unit 313

Control unit 301, when IC card 400 is connected to on-vehicle device 300, controls public-key-encryption processing unit 305 to establish a SAC. At this time, control unit 301 uses the "0" stored in CSI storage unit 308 as CSI. If device authentication is unsuccessful, control unit 301 ends the processing. Also, when a registered notification is received from IC card 400, control unit 301 displays the fact that on-vehicle device 300 is registered on monitor 322, and ends the processing. Control unit 301, upon receipt of encrypted CSI from IC card 400 via IO unit 316, controls decryption unit 317 to decrypt the encrypted CSI to obtain CSI, and stores the obtained CSI in CSI storage unit 308. Also, control unit 301 transmits a receipt notification to IC card 400 showing that the CSI has been received.

Moreover, copying of CSI from on-vehicle device 300 to other devices is not conducted.

Control unit 301, upon receipt of an input from input unit 313 indicating to view a content recorded on DVD 500, controls drive unit 312 to read encrypted content key c and an encrypted content from DVD 500. Control unit 301 has encrypted content key c decrypted by decryption unit 318 to obtain a content key, and has the encrypted content decrypted by decryption unit 320 to obtain a content. Also, control unit 301 controls playback unit 321 to play the obtained content.

(6) Playback Unit 321, Monitor 322, Speaker 323

Playback unit 321 generates video signals and audio signals from received contents, outputs the generated video and audio signals to monitor 322 and speaker 323, respectively, and plays the contents.

1.3 Structure of IC Card 400

Figure 6:
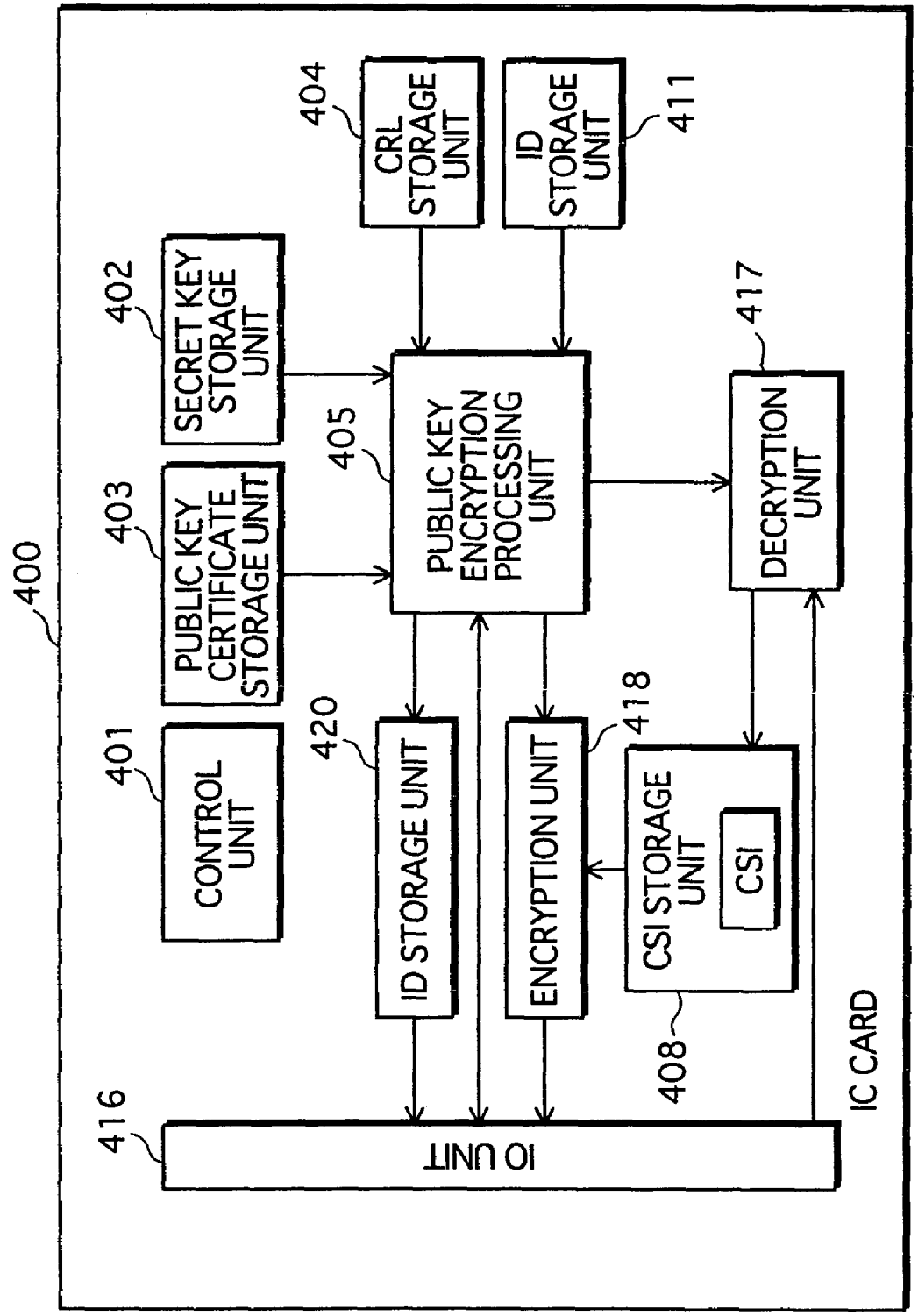
FIG. 6 is a block diagram showing a structure of an IC card 400.

As shown in FIG. 6, IC card 400 is structured from a control unit 401, a secret-key storage unit 402, a public-key-certificate storage unit 403, a CRL storage unit 404, a public-key-encryption processing unit 405, a CSI storage unit 408, an ID storage unit 411, an input/output (IO) unit 416, a decryption unit 417, an encryption unit 418, and an ID storage unit 420.

IC card 400 is connectable to AD server 100 and on-vehicle device 300. IC card 400 is used as a device within the authorized domain at a time of registering devices such as on-vehicle device 300 that are not connectable with AD server 100.

(1) Secret-Key Storage Unit 402, Public-Key-Certificate Storage Unit 403, CRL Storage Unit 404, CSI Storage Unit 408, ID Storage Unit 411, ID Storage Unit 420

CRL storage unit 404 stores the most recent CRL.

ID storage unit 411 stores an ID_4, which is an ID that is unique to IC card 400.

CSI storage unit 408 is a tamper-resistant area and, when a client device has not been registered in AD server 100, stores "0" showing that a client device has yet to be registered. When CSI is generated by AD server 100, CSI storage unit 408 stores CSI obtained from AD server 100 in correspondence with "0", which is the copy frequency. Here, the copy frequency is the number of times that copying of CSI to other client devices is permitted.

Public-key-certificate storage unit 403 stores a PKC Cert_4 issued by the CA. PKC Cert_4 includes a public key PK_4 and ID_4 of IC card 400, and signature data Sig_CA4 generated by the CA performing signature algorithm S on public key PK_4 and ID_4.

Secret-key storage unit 402 is a tamper-resistant area, and stores a secret key SK_4 corresponding to public key PK_4.

ID storage unit 420 is an area storing the ID of a CSI copy target.

(2) Public-Key-Encryption Processing Unit 405

Public-key-encryption processing unit 405, under the control of control unit 401, establishes a SAC with AD server 100, shares session key SK, and outputs the shared session key SK to decryption unit 417.

Also, public-key-encryption processing unit 405 establishes a SAC with on-vehicle device 300 and shares session key SK, and outputs the shared session key SK to encryption unit 418.

(3) Decryption Unit 417

Decryption unit 417, upon receipt of encrypted CSI via IO unit 416 and under the control of control unit 401, performs decryption algorithm D on the encrypted CSI by using session key SK received from public-key-encryption processing unit 405 to obtain CSI, and stores the obtained CSI in CSI storage unit 408.

(4) Encryption Unit 418

Encryption unit 418, under the control of control unit 401, reads CSI from CSI storage unit 408, receives session key SK from public-key-encryption processing unit 405, performs encryption algorithm E on the CSI by using session key SK to generate encrypted CSI, and transmits the encrypted CSI to on-vehicle device 300.

(5) Control Unit 401, 416

When IC card 400 is connected to AD server 100, control unit 401 reads ID_4 from ID storage unit 411, and transmits the read ID_4 to AD server 100.

At a time of receiving CSI from AD server 100, control unit 401 controls public-key-encryption processing unit 405 to establish a SAC with AD server 100 and share session key SK, and upon receipt of encrypted CSI, control unit 401 has the encrypted CSI decrypted by decryption unit 417 to obtain CSI, and stores the obtained CSI in CSI storage unit 408.

At a time of registering on-vehicle device 300, control unit 401, upon receipt of a permission right from AD server 100, adds "1" to the copy frequency stored in correspondence with the CSI, and transmits a receipt notification to AD server 100.

When IC card 400 is connected to on-vehicle device 300, control unit 401 controls public-key-encryption processing unit 405 to establish a SAC, and shares session key SK. At this time, control unit 401 conducts authentication by using the initial value "0" as CSI, and from the authentication result, judges whether or not on-vehicle device 300 is unregistered. If authentication is unsuccessful, control unit 401 judges on-vehicle device 300 to be registered, transmits a registered notification to on-vehicle device 300, and ends the processing. When authentication is successful, control unit 401 judges on-vehicle device 300 to be unregistered, and stores ID_3 of on-vehicle device 300 received at the time of authentication in ID storage unit 420. Control unit 401 reads CSI stored in CSI storage unit 408, has the read CSI encrypted by encryption unit 418 to generate encrypted CSI, and transmits the encrypted CSI to on-vehicle device 300. Control unit 401, upon receipt of a receipt notification from on-vehicle device 300, subtracts "1" from the copy frequency and ends the processing. Control unit 401, when IC unit 400 is connected to AD server 100, reads ID_4 from ID storage unit 411, and transmits the read ID_4 to AD server 100. Also, control unit 401 reads the ID of the CSI copy target from ID storage unit 420, and sends a copy notification that includes the read ID to AD server 100. Upon receipt from AD server 100 of a receipt notification, control unit 401 ends the processing.

<Operations of Group Formation/Management System 1>

2.1 SAC Operations

Figure 7:
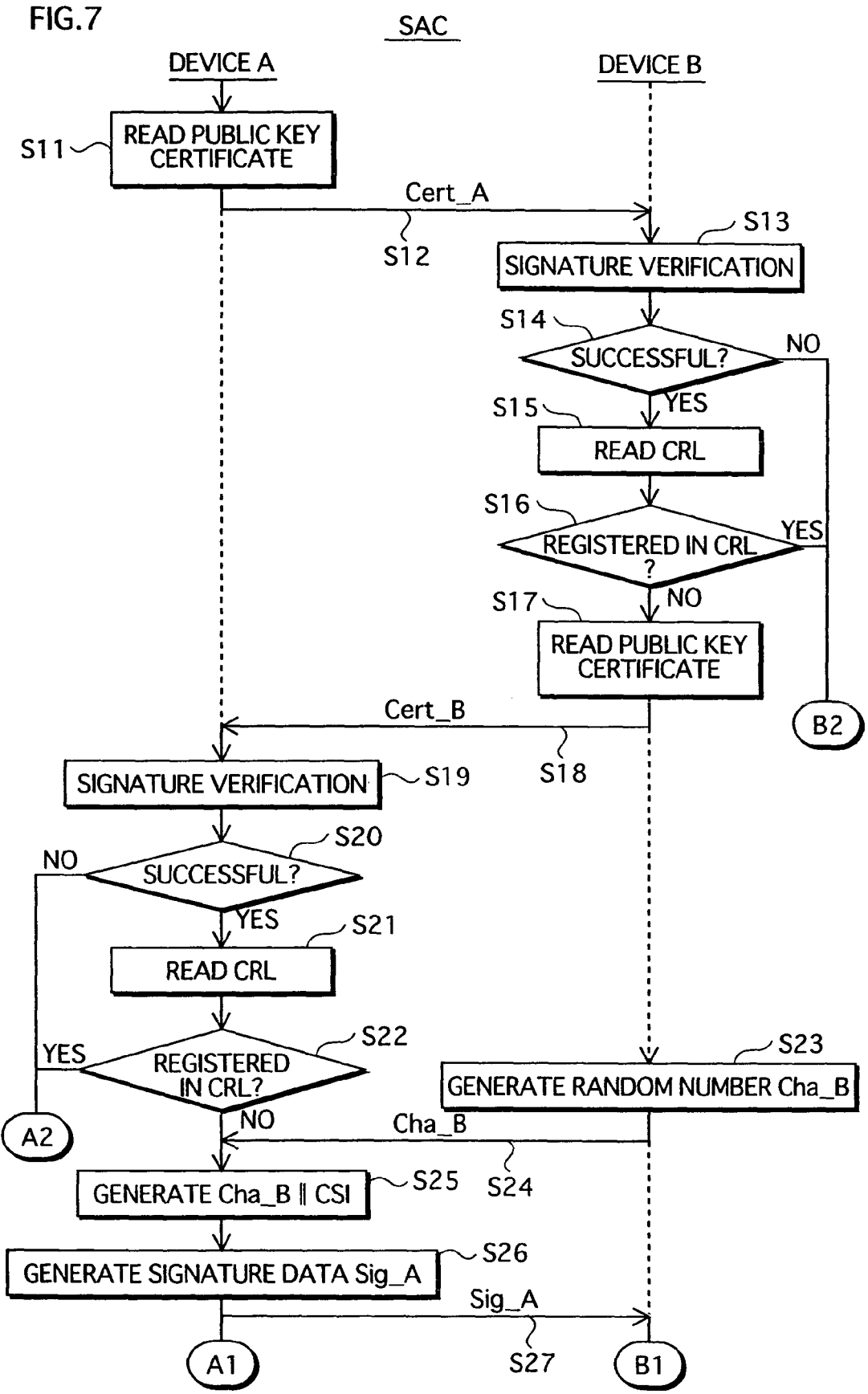
FIG. 7 is a flowchart showing SAC establishment processing (continued in FIG. 8)
Figure 8:
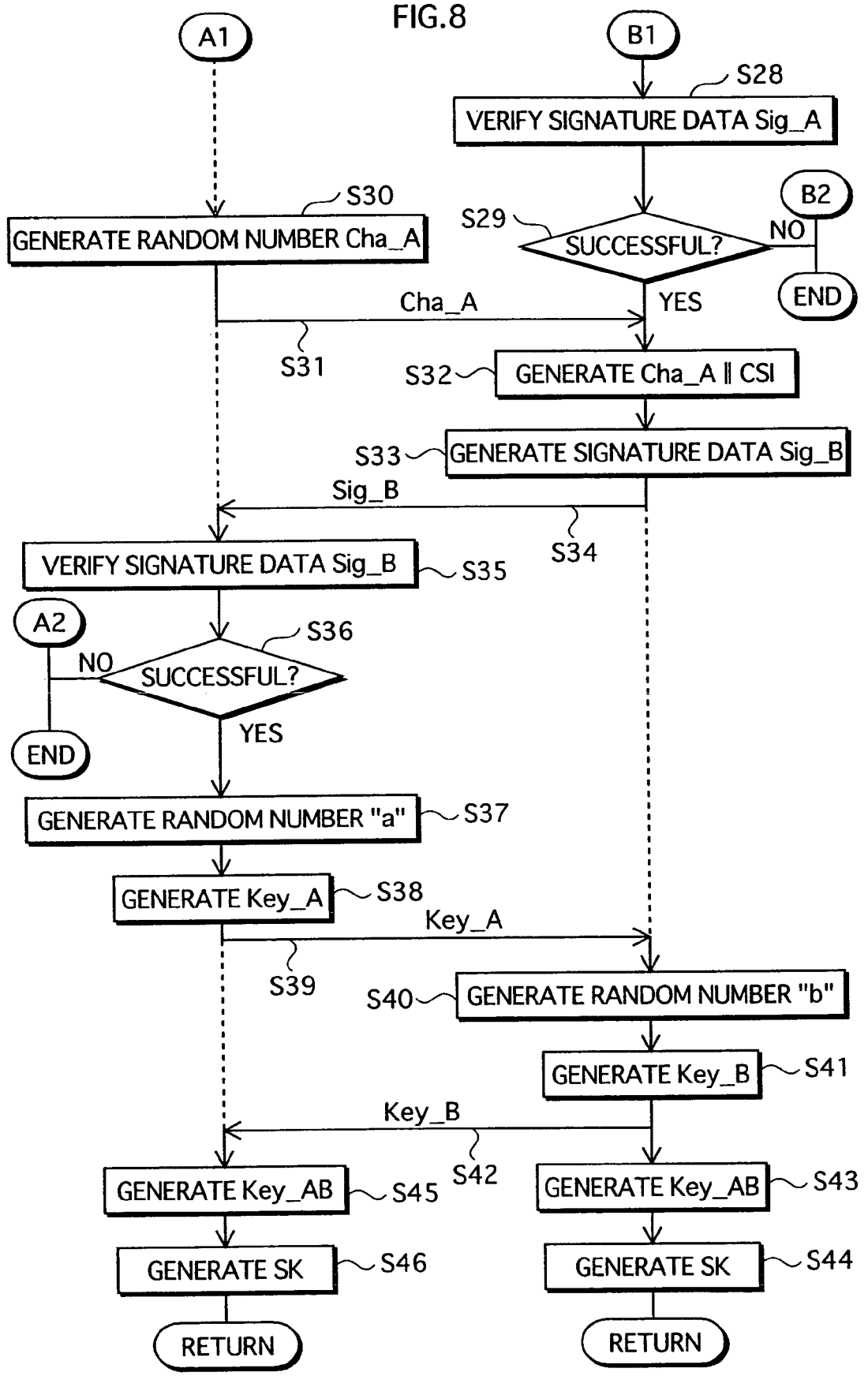
FIG. 8 is a flowchart showing SAC establishment processing (continued from FIG. 7)

Operations at a time of establishing a SAC will be described with reference to FIGS. 7 and 8.

Moreover, since this SAC establishment method is used in the mutual authentication of any of AD server 100, playback apparatus 200, on-vehicle device 300, and IC card 400, the devices conducting authentication here are referred to simply as device A and device B. Also, although CSI used in authentication can be "0" showing unregistered or values generated by AD server 100, here it is described simply as "CSI".

Here, Gen( ) is a key generation function and Y is a system-unique parameter. Also, key generation function Gen( ) is a function that satisfies a relation Gen(x,Gen(Y, z))=Gen(Y,Gen(x,z)). Moreover, since key generation functions are realizable by arbitrary known technology, the details of such functions will not be referred to here. As one example, a Diffie-Hellman (DH) public key delivery method is disclosed in Nobuichi IKENO, Kenji KOYAMA, Modern Cryptosystems, IEICE.

Device A reads PKC Cert_A (step S11), and transmits the read PKC Cert_A to device B (step S12).

Device B, having received PKC Cert_A, conducts signature verification by performing a signature verification algorithm V on signature data Sig_CA included in the PKC Cert_A, by using a public key PK_CA of the CA (step S13). If verification is unsuccessful (step S14=NO), device B ends the processing. If verification is successful (step S14=YES), device B reads a CRL (step S15), and judges whether or not ID_A included in the received PKC Cert_A is registered in the CRL (step S16). If judged to be registered (step S16=YES), device B ends the processing. If judged not to be registered (step S16=NO), device B reads PKC Cert_B of device B (step S17), and transmits the read PKC Cert_B to device A (step S18).

Device A, upon receipt of PKC Cert_B, conducts signature verification by performing signature verification algorithm V on signature data Sig_CA included in the PKC Cert_B, by using public key PK_CA (step S19). If verification is unsuccessful (step S20=NO), device A ends the processing. If verification is successful (step S20=YES), device A reads a CRL (step S21), and judges whether ID_B included in the received PKC Cert_B is registered in the CRL (step S22). If judged to be registered (step S22=YES), device A ends the processing. If judged to not be registered (step S22=NO), device A continues the processing.

Device B generates a random number Cha_B (step S23), and transmits generated random number Cha_B to device A (step S24).

Device A, upon receipt of random number Cha_B, concatenates Cha_B and CSI in the stated order to generate Cha_B||CSI (step S25), performs signature algorithm S on the generated Cha_B||CSI by using a secret key SK_A of device A to generate signature data Sig_A (step S26), and transmits the generated signature data Sig_A to device B (step S27).

Device B, upon receipt of signature data Sig_A, conducts signature verification by performing signature verification algorithm V on the received signature data Sig_A by using PK_A included in Cert_A received at step S12 (step S28). If verification is unsuccessful (step S29=NO), device B ends the processing. If successful (step S29=YES), device B continues the processing.

Device A generates a random number Cha_A (step S30), and transmits the generated random number Cha_A to device B (step S31).

Device B concatenates the received Cha_A and CSI in the stated order to generate Cha_A‖CSI (step S32), performs signature algorithm S on the generated Cha_A‖CSI by using a secret key SK B of device B to generate signature data Sig_B (step S33), and transmits the generated signature data Sig_B to device A (step S34).

Device A, upon receipt of signature data Sig_B, conducts signature verification by performing signature verification algorithm V on signature data Sig_B by using PK_B included in Cert_B received at step S18 (step S35), and if verification is unsuccessful (step S36=NO), device A ends the processing. If verification is successful (step S36=YES), device A generates a random number "a" (step S37), generates Key_A=Gen(a,Y) by using generated random number "a" (step S38), and transmits the generated Key_A to device B (step S39).

Device B, upon receipt of Key_A, generates a random number "b" (step S40), and generates Key_B=Gen (b,Y) by using generated random number "b" (step S41). Device B transmits the generated Key_B to device A (step S42). Also, device B generates Key_AB=Gen(b,Key_A)=Gen(b,Gen(a, Y)) by using generated random number "b" and the received Key_A by (step S43), and generates session key SK=Gen (CSI,Key_AB) using Key_AB and the CSI (step S44).

Device A, upon receipt of Key_B, generates Key_AB=Gen(a,Key_B)=Gen(a,Gen(b,Y)) by using generated random number "a" and the received Key_B (step S45), and generates session key SK=Gen (CSI,Key_AB) by using the generated Key_AB and the CSI (step S46).

2.2 Operations for Playback Apparatus 200 Registration

Figure 9:
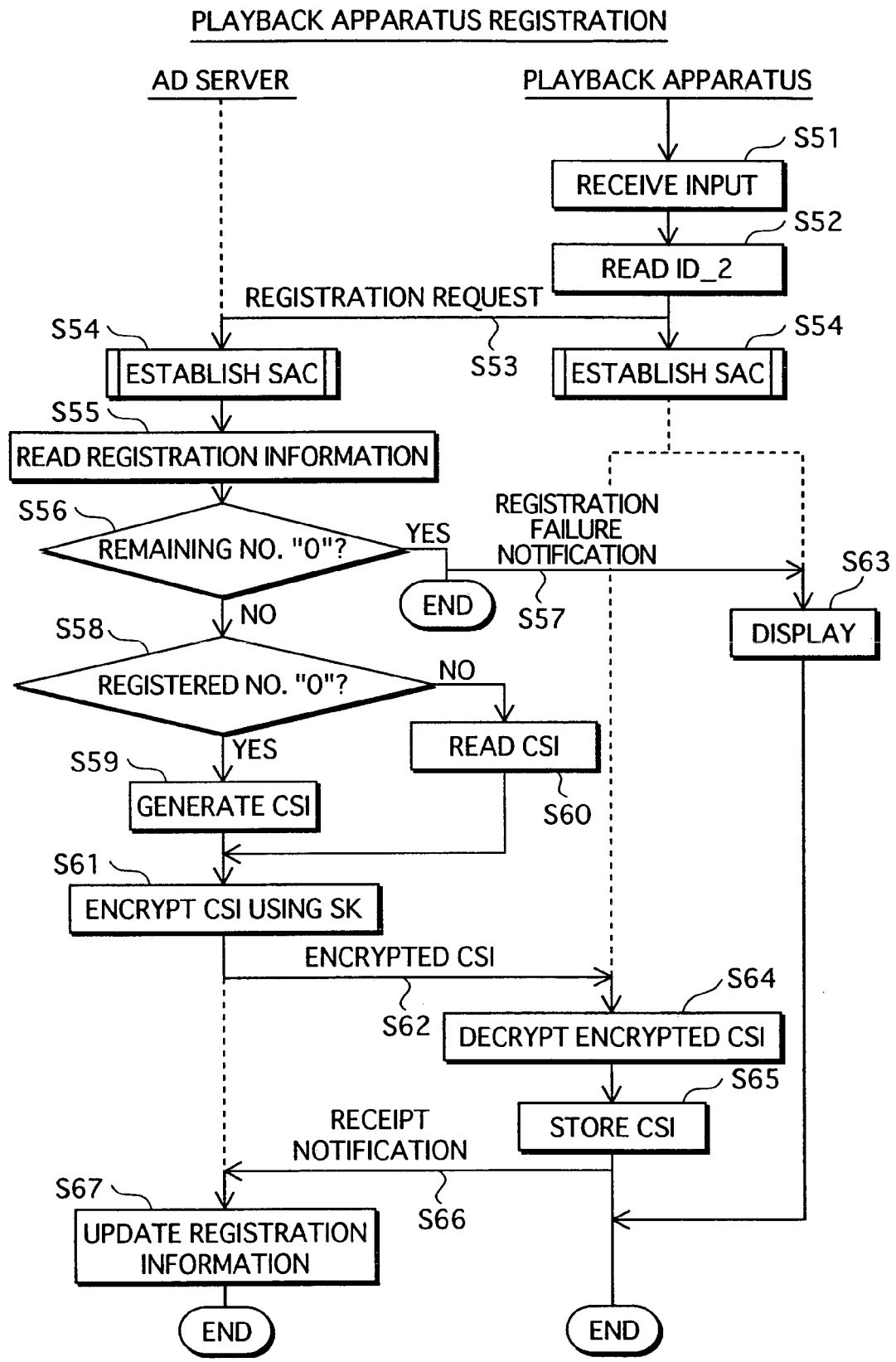
FIG. 9 is a flowchart showing operations by which AD server 100 registers playback apparatus 200.

Operations at a time of AD server 100 registering playback apparatus 200 will now be described with reference to FIG. 9.

Moreover, AD server 100 has IC card 400 connected thereto, and has already confirmed that IC card 400 is an IC card affiliated with AD server 100.

Playback apparatus 200, upon receipt of an input from input unit 213 indicating to start the registration processing (step S51), reads ID_2 from ID storage unit 211 (step S52), and transmits a registration request that includes ID_2 to AD server 100 (step S53).

Given that AD server 100 is device A and playback apparatus 200 is device B, a SAC is established by the above-described method (step S54). At this time, AD server 100 uses "0" as CSI and playback apparatus 200 uses CSI stored in CSI storage unit 208.

AD server 100 conducts the signature verification at step S35 using "0" as CSI, and thus judges playback apparatus 200 to be unregistered if verification is successful, and to be registered if verification is unsuccessful. If playback apparatus 200 is judged to be unregistered, AD server 100 reads registration information (step S55), and judges whether or not the remaining number is "0" (step S56). If "0" (step S56=YES), AD server 100 transmits a registration failure notification to playback apparatus 200 (step S57). If the remaining number is not "0" (step S56=NO), AD server 100 judges whether or not the registered number is "0" (step S58). If "0" (step S58=YES), CSI is generated by CSI generation unit 107 (step S59). If the registered number is not "0" (step S58=NO), AD server 100 reads CSI from CSI storage unit 108 (step S60). Encryption algorithm E is performed on the generated or read CSI by encryption unit 119 using session key SK, to generate encrypted CSI (step S61), and AD server 100 transmits the encrypted CSI to playback apparatus 200 (step S62).

Playback apparatus 200, if a registration failure notification is received, displays the fact that registration is not possible on monitor 251 (step S63), and ends the processing. If encrypted CSI is received, the encrypted CSI is decrypted by decryption unit 217 to obtain CSI (step S64), and playback apparatus 200 stores the CSI in CSI storage unit 208 (step S65). Also, playback apparatus 200 transmits a receipt notification to AD server 100 (step S66).

Upon receipt of the receipt notification from playback apparatus 200, AD server 100 writes ID_2 into DEVICE ID in the registration information, adds "1" to the registered number, and subtracts "1" from the remaining number (step S67).

Figure 10:
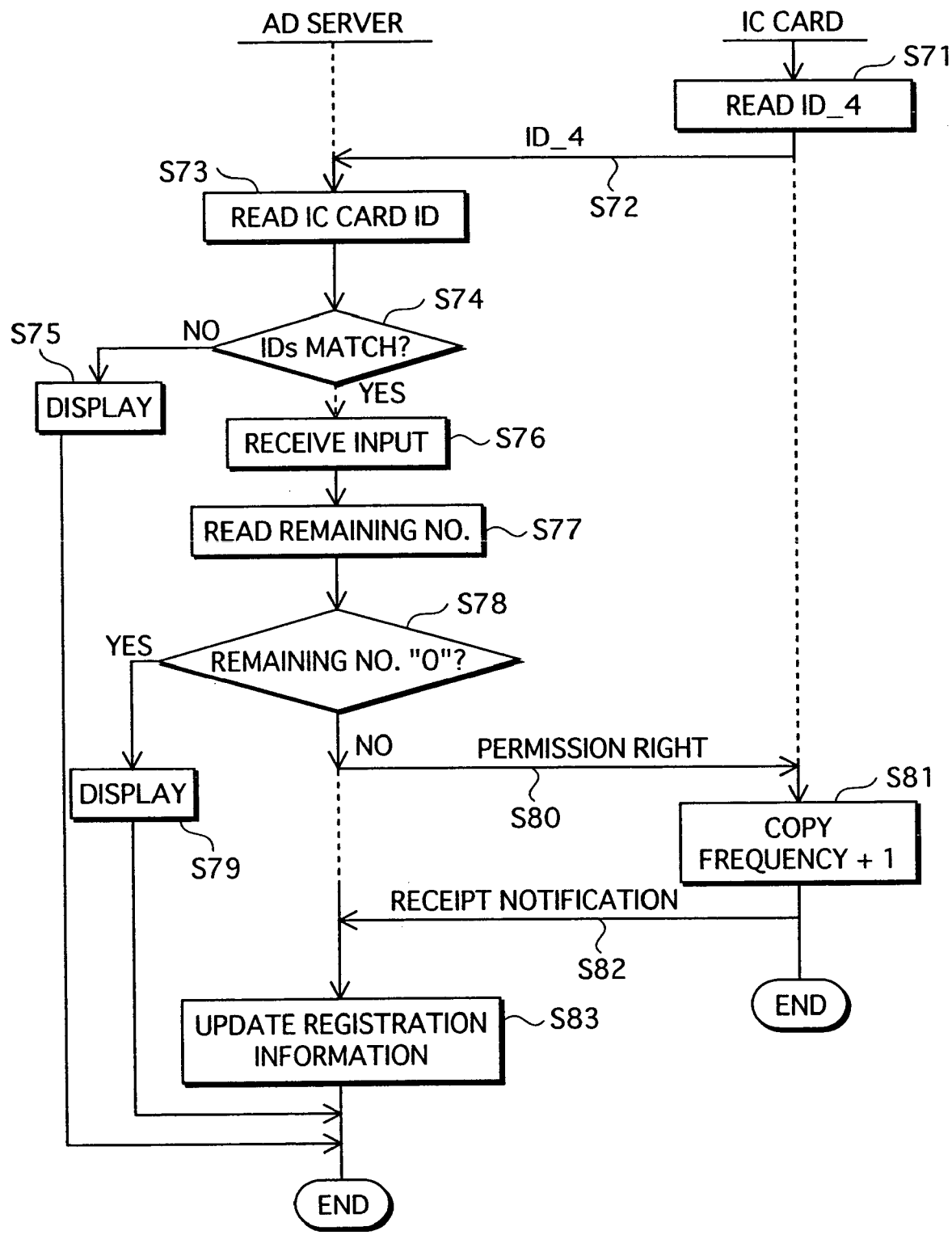
FIG. 10 is a flowchart showing operations by which AD server 100 registers on-vehicle device 300.

2.3 Operations for On-vehicle Device 300 Registration (1) Operations at a time of permitting the copying of CSI from AD server 100 to IC card 400 will now be described with reference to FIG. 10.

When IC card 400 is connected to AD server 100, IC card 400 reads ID_4 from ID storage unit 411 (step S71), and transmits the read ID_4 to AD server 100 (step S72).

AD server 100, upon receipt of ID_4, reads an IC card ID from the registration information (step S73), and judges whether or not the received ID matches the read ID (step S74). If the IDs do not match (step S74=NO), AD server 100 displays on display unit 114 the fact that the connected IC card is not an IC card affiliated with AD server 100 (step S75) and ends the processing. If the IDs match (step S74=YES), AD server 100 continues the processing. In this way, AD server 100 confirms whether or not the connected IC card is an affiliated IC card, and stands by until an input is received once confirmation is completed.

Upon receipt by input unit 113 of an input indicating to permit a copying of CSI to IC card 400 (step S76), control unit 101 reads the remaining number from registration-information storage unit 106 (step S77), judges whether or not the remaining number is "0" (step S78), and if "0" (step S78=YES), displays on display unit 114 the fact that registration is not possible (step S79). If the remaining number is not "0" (step S78=NO), control unit 101 transmits a permission right to IC card 400 permitting a once-only copying of CSI (step S80).

IC card 400, upon receipt of the permission right from AD server 100, adds "1" to the copy frequency (step S81), and transmits a receipt notification to AD server 100 (step S82).

AD server 100, upon receipt of the receipt notification, adds "1" to the registered number in the registration information, subtracts "1" from the remaining number (step S83), and ends the processing.

Figure 11:
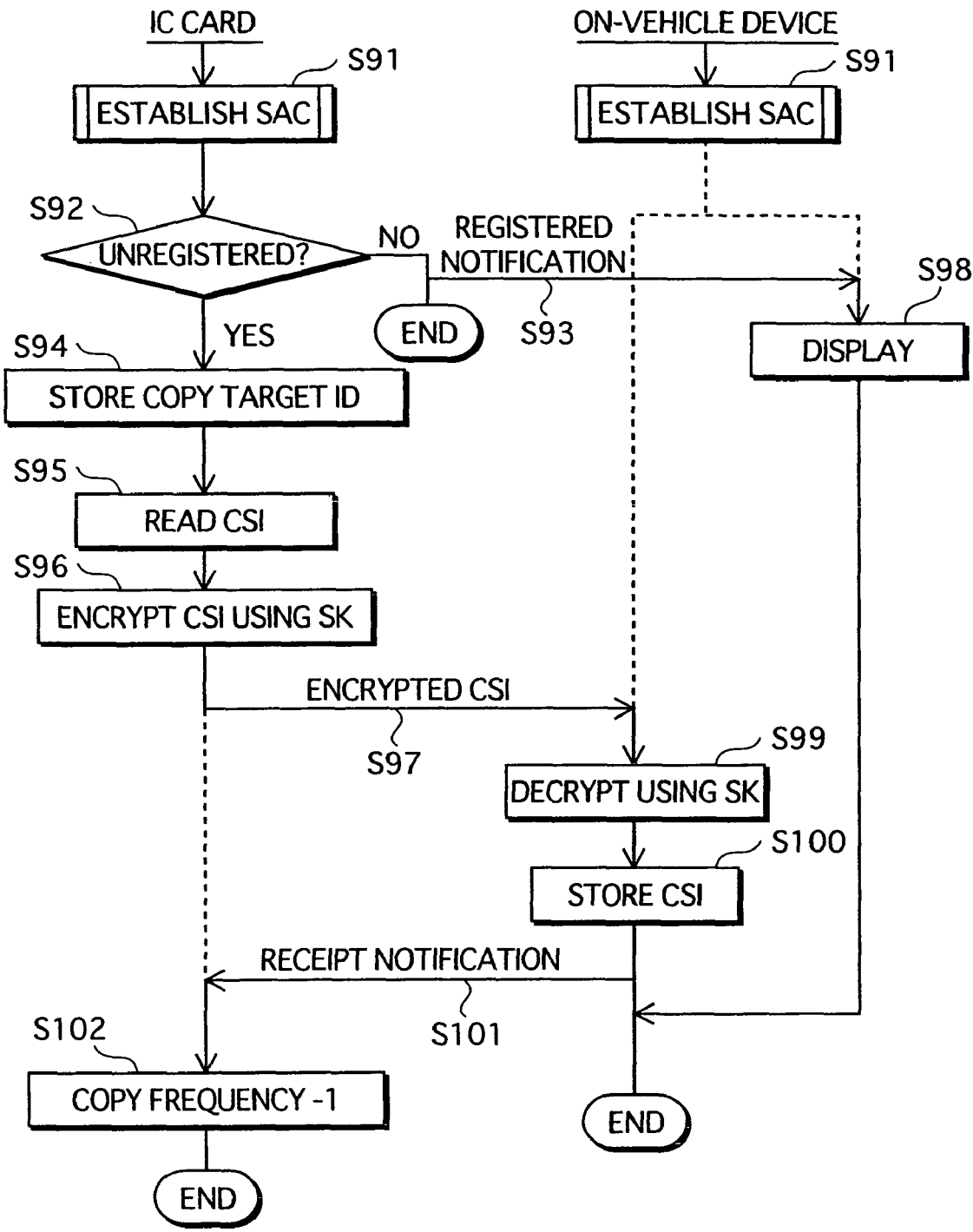
FIG. 11 is a flowchart showing operations by which AD server 100 registers on-vehicle device 300.

(2) Operations at a Time of Copying CSI from IC Card 400 to On-Vehicle 300 Will Now be Described with Reference to FIG. 11.

When IC card 400 is connected to on-vehicle device 300, steps S71 to S75 of the processing are conducted, and IC card 400 is ascertained. Also, IC card 400 and on-vehicle device 300 conduct SAC establishment processing as device A and device B, respectively, and share session key SK (step S91). At this time, IC card 400 conducts authentication using "0", which is the initial value of CSI, and on-vehicle device 300 conducts authentication by using a value stored in CSI storage unit 308.

Control unit 401 in IC card 400 conducts the signature verification at step S35 using "0" as CSI, and thus judges on-vehicle device 300 to be unregistered if verification is successful, and to be registered if verification is unsuccessful. If judged to be registered (step S92=NO), IC card 400 transmits a registration failure notification to on-vehicle device 300 (step S93), and ends the processing. If judged to be unregistered (step S92=YES), IC card 400 stores ID_3 of on-vehicle device 300 received at step S18 in ID storage unit 420 (step S94). Encryption unit 418, upon receipt of session key SK from public-key-encryption processing unit 405, reads CSI from CSI storage unit 408 (step S95). Encryption unit 418 encrypts the CSI by using session key SK to generate encrypted CSI (step S96), and transmits the encrypted CSI to on-vehicle device 300 via IO unit 416 (step S97).

Control unit 301 in on-vehicle device 300, if a registration failure notification is received from IC card 400, displays the fact that registration is not possible on monitor 322 (step S98), and ends the processing. If encrypted CSI is received from IC card 400, decryption unit 317 receives session key SK from public-key-encryption processing unit 305, decrypts the encrypted CSI by using session key SK to obtain CSI (step S99), and stores the obtained CSI in CSI storage unit 308 (step S100). Also, control unit 301 transmits a receipt notification to IC card 400 (step S101).

IC card 400, upon receipt of the receipt notification from on-vehicle device 300, subtracts "1" from the copy frequency (step S102) and ends the processing.

(3) Operations at a Time of Notifying AD Server 100 of the Copying of CSI Will Now be described.

When IC card 400 is connected to AD server 100, AD server 100 confirms the ID of IC card 400 to confirm that IC card 400 is an affiliated IC card, and stands by until an input is received once confirmation is completed.

IC card 400 reads ID_3, which is the ID of the copy target, from ID storage unit 420, and transmits a copy notification that includes ID_3 to AD server 100.

AD server 100, upon receipt of the copy notification, stores ID_3 included in the copy notification in the registration information as a device ID. Also, AD server 100 transmits a receipt notification to IC card 400 and ends the processing.

IC card 400, upon receipt of the receipt notification from AD server 100, ends the processing.

2.4 Content Delivery Operation 1

Figure 12:
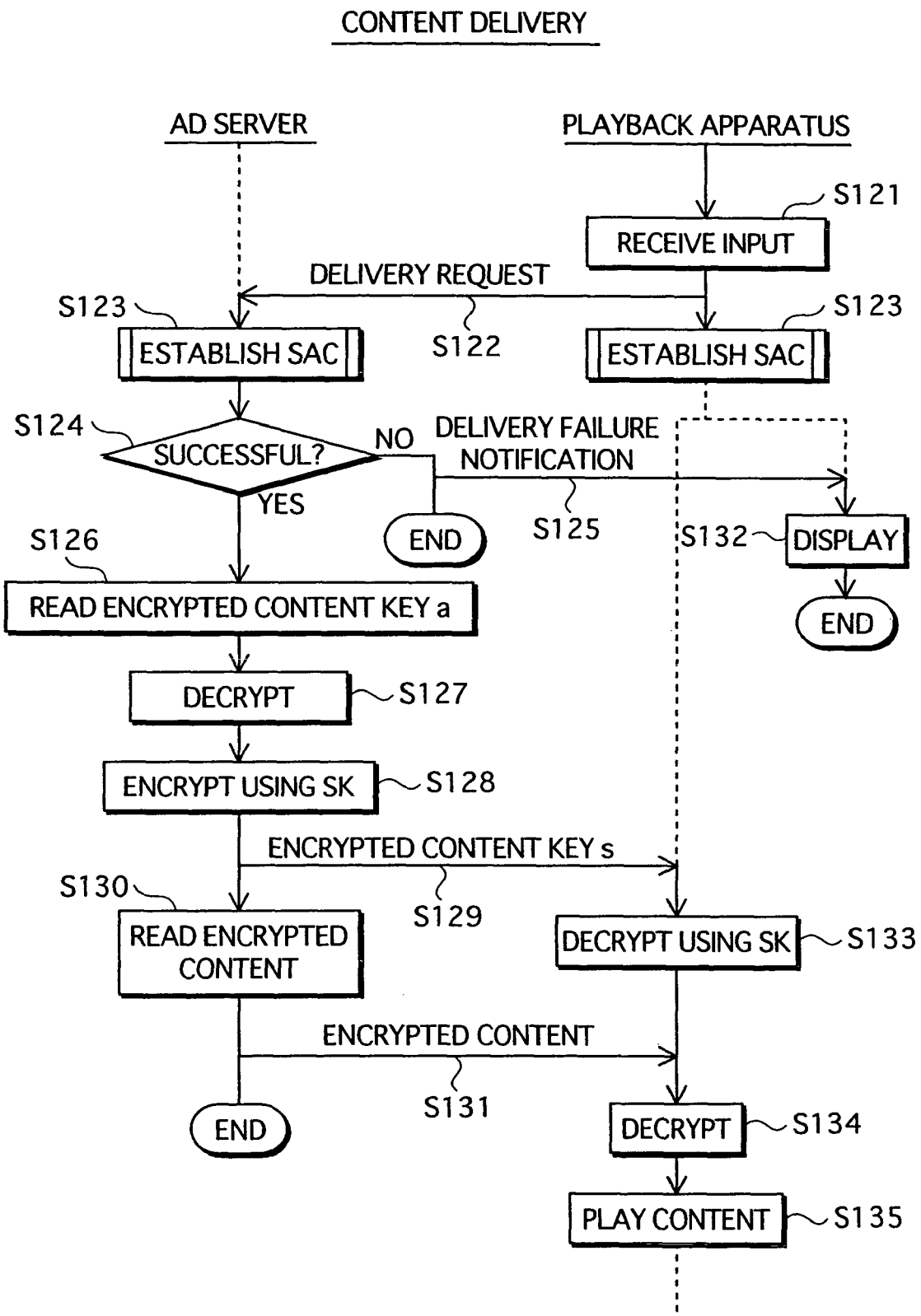
FIG. 12 is a flowchart showing operations to deliver a content.

Operations at a time of delivering a content from AD server 100 to playback apparatus 200 and playing the delivered content will now be described with reference to FIG. 12.

Playback apparatus 200, upon receipt of an input indicating to acquire a content from input unit 213 (step S121), transmits a delivery request for a content to AD server 100 (step S122).

AD server 100 and playback apparatus 200 establish a SAC (step S123). At this time, server 100 and device 200 conduct authentication by using CSI stored in the respective CSI storage units.

AD server 100 confirms that playback apparatus 200 is within the same authorized domain by the processing at step S35.

If authentication is unsuccessful (step S124=NO), AD server 100 transmits a delivery failure notification to playback apparatus 200 (step S125) and ends the processing. If authentication is successful (step S124=YES), AD server 100 reads encrypted content key a from content-key storage unit 118 (step S126), encrypted content key a is decrypted by decryption unit 117 (step S127), and furthermore, the content key is encrypted in encryption unit 110 by using session key SK that is shared at a time of authentication, to generate encrypted content keys (step S128), and AD server 100 transmits encrypted content key s to playback apparatus 200 (step S129). Also, AD server 100 reads an encrypted content from content storage unit 109 (step S130), and transmits the encrypted content to playback apparatus 200 (step S131).

Playback apparatus 200, in the case of a delivery failure notification being received, displays the fact that delivery is not possible on monitor 251 (step S132) and ends the processing. In the case of encrypted content key s being received, encrypted content key s is decrypted in decryption unit 217 by using session key SK to obtain a content key (step S133), and the obtained content key is outputted to decryption unit 220. Decryption unit 220 performs decryption algorithm D on the encrypted content received from AD server 100, by using the content key received from decryption unit 217, to obtain a content (step S134), and outputs the obtained content to playback unit 221. Playback unit 221 generates video and audio signals from the received content and outputs the generated video and audio signals to monitor 251 and speaker 252, respectively, and plays the content (step S135).

2.5 Content Delivery Operation 2

Figure 13:
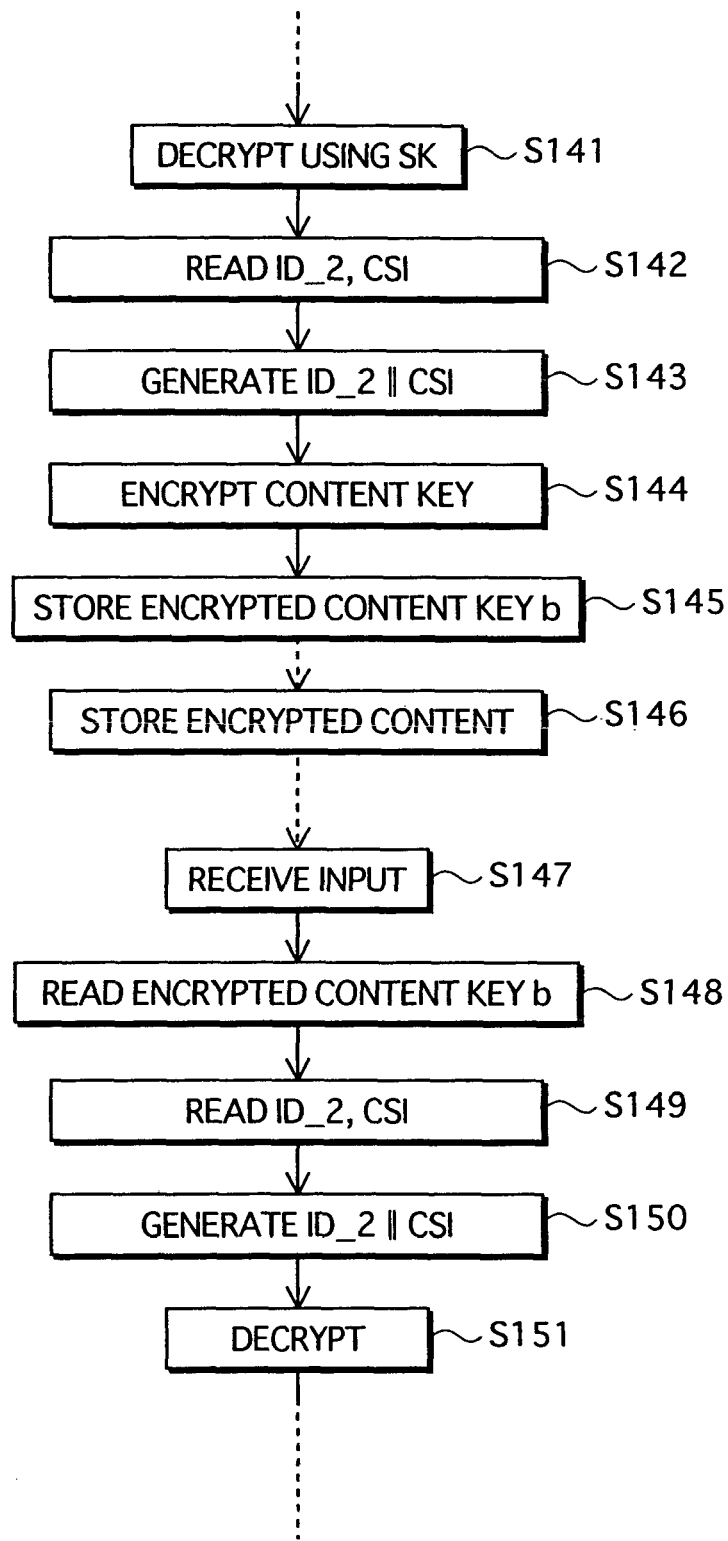
FIG. 13 is a flowchart showing part of the operations to deliver a content.

Operations at a time of playing contents received from AD server 100 once they have been accumulated will now be described with reference to FIG. 13.

The same processing as in steps S121 to S130 is conducted.

Decryption unit 217 decrypts encrypted content key s to obtain a content key (step S141), and outputs the obtained content key to encryption unit 218. Encryption unit 218 reads CSI from CSI storage unit 208 and ID_2 from ID storage unit 211 (step S142). Encryption unit 218 concatenates the read ID_2 and CSI in the stated order to generate ID_2∥CSI (step S143), and sets ID_2∥CSI as encryption key b. Encryption unit 218 encrypts the content key by using the generated encryption key b to generate encrypted content key b (step S144), and stores encrypted content key b in content-key storage unit 219 (step S145). Also, upon receipt of an encrypted content from AD server 100, control unit 201 stores the received encrypted content in content storage unit 209 (step S146).

Upon receipt from input unit 213 of an input indicating to play a stored content, decryption unit 217 reads encrypted content key b from content-key storage unit 219 (step S148). Also, decryption unit 217 reads CSI from CSI storage unit 208 and ID_2 from ID storage unit 211 (step 149), concatenates the read ID_2 and CSI to generate ID_2∥CSI (step S150), and sets ID_2∥CSI as a decryption key. Decryption unit 217 performs decryption algorithm D on encrypted content key b by using the generated decryption key to obtain a content key (step S151), and outputs the obtained content key to decryption unit 220. Decryption unit 220 and playback unit 221 conduct the processing of steps S133 to S135 to play the content.

2.6 Operations at a Time of Recording onto DVD

Figure 14:
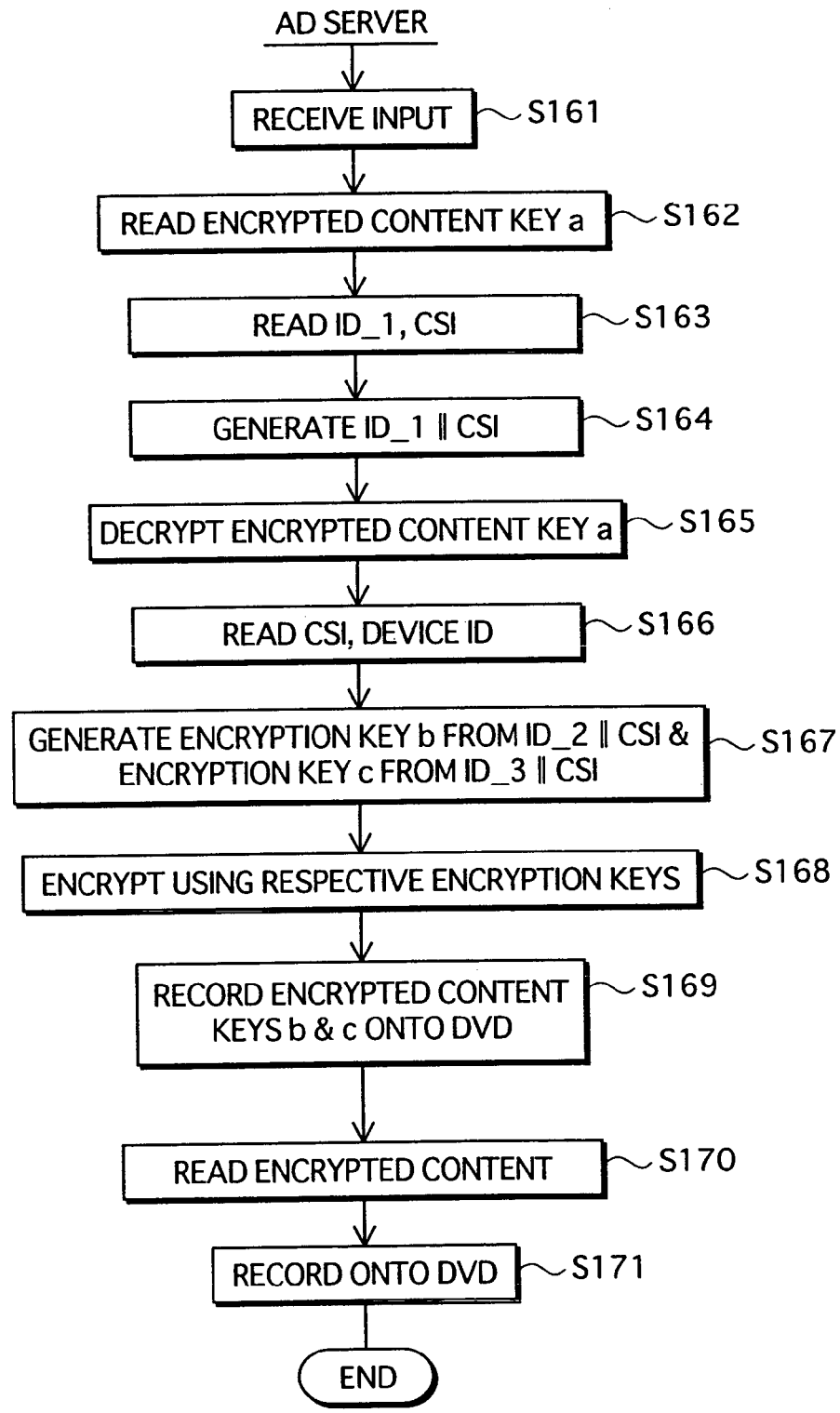
FIG. 14 is a flowchart showing operations to record a content onto a DVD.

Operation at a time of a content being written to DVD 500 by AD server 100 will now be described with reference to FIG. 14.

AD server 100, upon receipt from input unit 113 of an input instructing to record a content onto a DVD (step S161), reads encrypted content key a from content-key storage unit 118 (step S162), and reads ID_1 from ID storage unit 111 and CSI from CSI storage unit 108 (step S163). Decryption unit 117 concatenates the read ID_1 and CSI to generate a decryption key (step S164), decrypts encrypted content key a by using the generated decryption key to obtain a content key (step S165), and outputs the obtained content key to encryption unit 110. Encryption unit 110, upon receipt of the content key, reads the device IDs from registration-information storage unit 106 and CSI from CSI storage unit 108 (step S166). Encryption unit 110 concatenates the read ID_2 and CSI to generate encryption key b and concatenates the read ID_3 and CSI to generate encryption key c (step S167). Encryption unit 110 encrypts the content key by respectively using generated encryption keys b and c to generate encrypted content keys b and c (step S168). Control unit 101 writes encrypted content keys b and c to DVD 500 (step S169). Also, control unit 101 reads an encrypted content from content storage unit 109 (step S170), and writes the encrypted content to DVD 500 (step S171).

2.7 Operations for Playback Apparatus 200 Withdrawal

Figure 15:
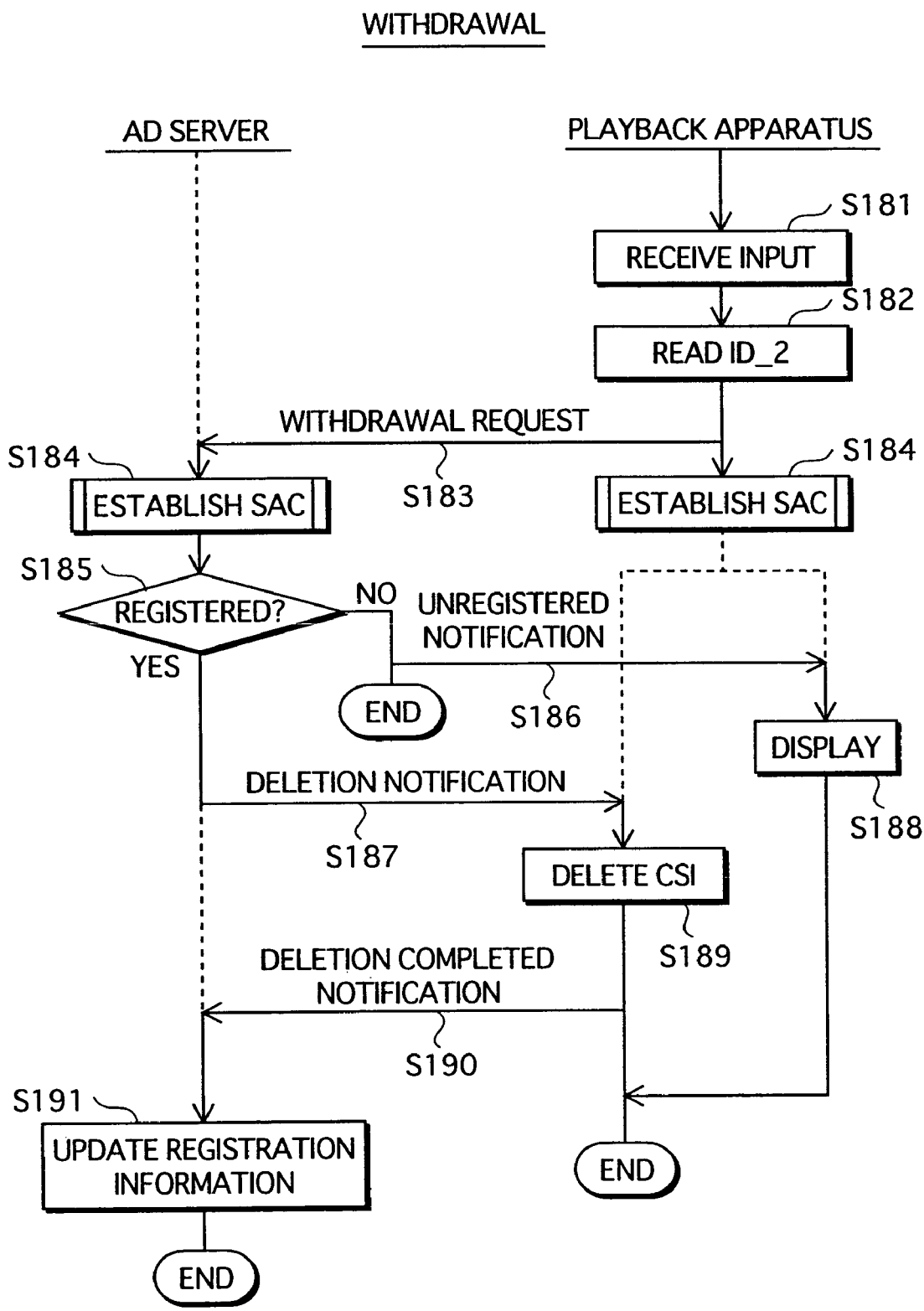
FIG. 15 is a flowchart showing operations to withdraw from AD server 100.

Operations at a time of playback apparatus 200 withdrawing from AD server 100 will now be described with reference to FIG. 15.

Moreover, AD server 100 has IC card 400 connected thereto, and has already confirmed IC card 400.

Playback apparatus 200, upon receipt from input unit 213 of an input indicating the withdrawal of playback apparatus 200 (step S181), reads ID_2 from ID storage unit 211 (step S182), and transmits a withdrawal request that includes ID_2 to AD server 100 (step S183).

AD server 100 and playback apparatus 200 conduct authentication and establish a SAC (step S184). At this time, authentication is conducted by using CSI stored in the respective CSI storage units.

AD server 100 judges whether or not playback apparatus 200 is registered as a device in the authorized domain of AD server 100 by the processing of step S35, and if unregistered (step S185=NO), transmits an unregistered notification to playback apparatus 200 (step S186). If registered (step S185=YES), AD server 100 transmits a CSI deletion notification to playback apparatus 200 (step S187).

Playback apparatus 200, upon receipt of an unregistered notification, displays the fact that playback apparatus 200 is unregistered on monitor 322 (step S188) and ends the processing. Upon receipt of a deletion notification, playback apparatus 200 deletes CSI from CSI storage unit 208 (step S189). Also, playback apparatus 200 transmits a deletion-completed notification to AD server 100 (step S190).

AD server 100, upon receipt of the deletion-completed notification, deletes ID_2 from DEVICE ID in the registration information, subtracts "1" from the registered number, and adds "1" to the remaining number (step S191).

<Modifications of Group Formation/Management System 1>

While the present invention has been described above based on the above embodiment directed to the group formation/management system 1, the present invention is, of course, not limited to this embodiment. Modifications such as those described below are also included in the present invention.

(1) Although CSI is copied using IC card 400 at a time of registering a device that is not connected to AD server 100 in the above embodiment, CSI may be transferred from client device to client device directly without using IC card 400.

The transfer of CSI from playback apparatus 200 to a playback apparatus 200n, and the registration of playback apparatus 200n as a device within the authorized domain managed by AD server 100 will now be described as an example.

Playback apparatus 200 and playback apparatus 200n are connected, and playback apparatus 200n is operated to transmit a transfer request to playback apparatus 200. Playback apparatus 200 and playback apparatus 200n establish a SAC and generate session key SK. Playback apparatus 200 encrypts CSI with the session key SK and transmits the encrypted CSI to playback apparatus 200n. Playback apparatus 200n decrypts the encrypted CSI by using the session key, stores the CSI, and stores the ID of playback apparatus 200, which is the transfer source, received at a time of establishing the SAC. Also, playback apparatus 200n transmits a receipt notification to playback apparatus 200. Playback apparatus 200, upon receipt of the receipt notification, deletes the CSI in CSI storage unit 208 and stores "0" in CSI storage unit 208.

Playback apparatus 200n, when connected to AD server 100 and when a SAC is established, notifies AD server 100 of the CSI transfer, and transmits the ID of the transfer source and the ID of playback apparatus 200n to AD server 100, and AD server 100 rewrites DEVICE ID in the registration information.

(2) Although IC card 400 is affiliated with AD server 100 in the above embodiment, IC card 400 need not be affiliated.

In this case, as with other client devices, IC card 400 establishes a SAC when connected to AD server 100, registers ID_4 as a device ID, and acquires CSI.

AD server 100, at a time of recording a content key onto DVD 500, encrypts the content key by using an encryption key generated by concatenating ID_4 of IC card 400 and CSI.

On-vehicle device 300, when DVD 500 is mounted therein and when IC card 400 is connected, establishes a SAC with IC card 400 and shares session key SK.

IC card 400 concatenates ID_4 and CSI stored in IC card 400 to generate a decryption key, encrypts the decryption key by using session key SK to generate an encrypted decryption key, and transmits the encrypted decryption key to on-vehicle device 300.

On-vehicle device 300 decrypts the encrypted decryption key by using session key SK to obtain a decryption key, decrypts the encrypted content key read from DVD 500 by using the decryption key to obtain a content key, decrypts an encrypted content using the content key to obtain a content, and plays the content.

Also, the same processing as in (1) above to transfer CSI between client devices may be conducted to transfer CSI from an IC card to on-vehicle device 300. In this case, an IC card that is not affiliated with AD server 100 may, as with IC card 400 in embodiment 1 described above, be provided with the function of notifying AD server 100 of a transfer. In this case, an IC card that transfers CSI to on-vehicle device 300 prohibits the transfer of CSI without immediately deleting the CSI, and deletes the CSI after notifying AD server 100 of the transfer.

(3) When registering a device that is not connected to AD server 100 by using IC card 400, a permission right or CSI may be transmitted from AD server 100 to IC card 400 via a network.

As one example, when IC card 400 is connected to a client device such as a PC or the like that is connected to a network and has a communication function, IC card 400 conducts SAC establishment processing and receives a permission right or CSI by using the communication function of the PC.

The client device having the communication function is not limited to being a PC, and may be a personal digital assistant (PDA), a mobile telephone or the like.

(4) In the above embodiment, contents are either delivered from AD server 100 to a client device or recorded onto a DVD and distributed from AD server 100 to a client device. However, a SAC may be established between client devices and session key SK may be generated, and contents may be delivered from one client device to another client device.

(5) In the above embodiment, on-vehicle device 300 is registered by using IC card 400. However, withdrawal processing may be conducted in the same way by using IC card 400.

In this case, on-vehicle device 300, which has IC card 400 connected thereto, is operated to transmit a withdrawal request to IC card 400. IC card 400 establishes a SAC to confirm that on-vehicle device 300 is registered, and transmits a deletion notification to on-vehicle device 300. On-vehicle device 300 deletes the CSI, and transmits a deletion-completed notification to IC card 400. IC card 400, upon receipt of the deletion-completed notification, stores the ID of the withdrawn on-vehicle device 300. IC card 400, when connected to AD server 100, notifies AD server 100 that on-vehicle device 300 has withdrawn and the ID of on-vehicle device 300. AD server 100 deletes the ID of on-vehicle device 300 from DEVICE ID in the registration information, subtracts "1" from the registered number, and adds "1" to the remaining number.

(6) In the above embodiment, AD server 100 confirms whether a target device is registered or unregistered by a value of CSI stored by the target device, by using signature verification at a time of establishing a SAC. However, AD server 100 may confirm that a target device is registered or unregistered by receiving an ID from the device to be authenticated, and judging whether or not the received ID is stored in DEVICE ID in the registration information. Also, all of the client devices registered as devices within the authorized domain of AD server 100 may store the registered IDs, and confirm whether other client devices are registered or unregistered by using the IDs in the same way as described above.

(7) In the above embodiment, IC card 400 is used at a time of registering a device that is not connected to AD server 100. However, AD server 100 may display CSI on display unit 114, and a user may manually input the CSI into a client device. In this case, a code to be inputted may be a value obtained by encrypting CSI, depending on the device, the session, and so forth.

(8) In the above embodiment, at a time of establishing a SAC and encrypting and transmitting CSI, signature data of the device transmitting the encrypted CSI may be appended to the cipher text.

(9) In the above embodiment, registration information and CSI is stored internally in respective devices. However, registration information and CSI may be stored in a removable memory area that cannot be read, written or copied without permission.

(10) In the above embodiment, the ID of a device and CSI or a random number and CSI are concatenated for use as an encryption key at a time of encrypting a content, and as a decryption key at a time of decrypting the encrypted content key. However, the present invention is not limited to this, and an operation may be conducted using the ID of a device and CSI or a random number and CSI, and the resulting value may be used.

(11) Although a maximum number, a registered number and a remaining number are managed as registration information in the above embodiment, the present invention is not limited thereto.

The maximum number may be set as the initial value of the remaining number and "1" may be subtracted from the remaining number every time a device is registered, and a client device may be registered if the remaining number is not "0". Also, the maximum number and the registered number may be managed, and a client device may be registered if the registered number is less than the maximum number.

(12) The maximum number, the registered number, and the like may be managed after dividing the number of devices in the registration information into devices that are connected online to AD server 100 and devices that are registered by using IC card 400.

(13) Although AD server 100 conducts management based on stored registration information in the above embodiment, a separate management authority may be provided and structured as in (a) to (c) below.

(a) The management authority sets the maximum number of registerable devices, appends signature data of the management authority to the maximum number, and either records the maximum number onto a portable recording medium such as a DVD for distribution or distributes the maximum number via a communication channel. AD server 100 verifies the signature data, and if verification is successful, stores the maximum number as MAXIMUM in the registration information.

(b) AD server 100 requests the management authority for the number of devices that AD server 100 seeks to register. The management authority conducts accounting in response to the number of devices, and if the accounting is successful, transmits information to AD server 100 permitting registration of the requested number of devices, and AD server 100, upon receipt of the information, accepts the registration of client devices within the permitted number.

(c) AD server 100 sends out a request to the management authority every time a registration is received from a client device, and the management authority conducts accounting in response to the request and permits the registration if the accounting is successful. AD server 100, when registration is permitted, registers the client device and transmits CSI to the client device.

(14) In the above embodiment, playback apparatus 200 plays contents delivered from AD server 100. However, playback apparatus 200 may have a DVD playback function, and play contents recorded onto DVD 500 by AD server 100.

Also, in the above embodiment, AD server 100 joins each of the device IDs stored in the registration information with CSI and uses the result in the encryption of content keys. However, AD server 100 may prestore the ID of devices having a DVD playback function, extract the ID of the devices capable of playing DVD, and concatenate each of these IDs with CSI for use in the encryption of content keys.

(15) Although AD server 100 records contents onto a DVD in the above embodiment, contents may be recorded onto a memory card, an MD, an MO, a CD, a BD (blu-ray disk) or the like, or onto an IC card.

Also, apart from a playback apparatus, a client device may be a recording device or a combination of a playback apparatus and a recording device. Also, a client device may, apart from being installed in a user's home or mounted in a vehicle, be a portable device capable of being carried by a user.

(16) IC card 400, because of being connected directly to AD server 100 or on-vehicle device 300, need not conduct SAC establishment processing.

(17) In the above embodiment, signature data, at a time of establishing a SAC, is generated with respect to data in which CSI is concatenated to random numbers Cha_B or Cha_A. However, a hash value of data that is to be a signature target may be calculated, and signature data may be generated with respect to this hash value.

(18) In the above embodiment, at a time of establishing a SAC, CSI is used when judging whether a device targeted for authentication is registered or unregistered and when sharing keys. However, CSI need only be used in one of these cases.

Also, although authentication is conducted in both directions (i.e. mutually) in the above embodiment, authentication may be only unidirectional.

(19) Registration of client devices may be restricted by time.

In this case, the time between AD server 100 and a client device is synchronized. AD server 100 sets a time period within which use of CSI is permitted as valid period information, transmits the valid period information and CSI to the client device, and adds "1" to the registered number.

The client device receives and stores the valid period information and the CSI. When the period shown by the valid period information ends, the client device deletes the CSI.

AD server 100, once the period shown by the valid period information has ended, subtracts "1" from the registered number. If storing the device ID, AD server 100 deletes the ID of the device whose valid period has expired.

Moreover, the usage period information may show a date-time of the start/end of a usage period, or only the end date-time. Also, the usage period information may be information that sets restrictions on a period from the start of CSI usage, or may set restrictions on a period of operations by a client device using the CSI.

(20) Although there is a single AD server per each authorized domain in the above embodiment, there may be a plurality of AD servers in a single authorized domain.

In this case, a client device is able to select which of the AD servers to communicate with. As a selection method, a user may make a setting, or a client device may select the AD server closest in the authorized domain to the client device in terms of distance. Also, a client device may select the AD server having the highest processing capacity or a low number of other tasks.

Also, as described below, an AD server requested for registration by a client device may, when unable to register the client device and the like, search for another AD server that is able to register the client device.

Specifically, the client device transmits a registration request to an AD server. When the registered number in the requested AD server matches the maximum number, the requested AD server makes inquires with another AD server as to whether or not the other AD server can register the client device. The other AD server, when able to register the client device, registers the client device that requested registration and notifies the requested AD server that registration is possible, and the requested AD server, upon receipt of the notification, transmits CSI to the client device.

Also, if the other AD server replies that registration of the client device is not possible, the AD server makes inquiries with yet another AD server.

Also, one AD server may be selected to represent a plurality of AD servers, and the representative server may manage all of the in-group devices. In this case, when an AD server other than the representative server receives a registration request from a client device, the AD server inquires as to whether or not the client device is registerable in the representative server. If registerable, the client device is registered in the representative server, and receives CSI from the representative server via the AD server that received the request.

Moreover, if the representative server is currently conducting other operations, or the like, the AD server may inquire with the other AD servers as to whether or not any of these other AD servers are able to register the client device.

Also, as shown in (a) and (b) below, since a registered number of devices is managed among a plurality of AD servers, the AD servers may share a list relating to registered devices.

(a) When AD servers R and S within the same authorized domain each register client devices, the IDs of registered devices are stored as a device list. Also, whenever a list is updated by writing in IDs, the IDs are stored in the device list in correspondence with a version number.

AD servers R and S exchanges device lists regularly or irregularly. AD server R compares the version number of the device list stored therein with the version number of the device list stored by AD server S, and stores the device list having the latest version number. AD server S conducts the same processing. In this way, it is possible for AD servers to always share the latest device list.

Moreover, device lists may be exchanged every time the device list of one of the AD servers is updated. Also, registration in formation such as registered numbers and maximum numbers may be shared in the same way as above.

(b) AD servers T and U within the same authorized domain hold device lists T and U, respectively, and at a time of registering a client device, store the device IDs of the client devices in correspondence with a registration time. AD servers T and U exchange device lists regularly or irregularly.

AD server T, if the registered number stored therein as registration information is less than the maximum number, writes client devices newly registered in device list U received from AD server U into device list T stored therein, in the order of registration. Also, AD server U, in the same way, receives device list T, and updates device list U in the order in which new client devices were registered.

Moreover, client devices may be provided in advance with a priority level, and priority can be given to the registration of devices having a high priority level. Also, when the combined number of client devices newly registered in AD servers T and U exceeds the maximum number, priority may be given to the registration of devices having a high priority level, or a user may be selected devices to be registered.

According to this method, even if the requested AD server is in a power-OFF state, a client device can be registered in another AD server, and consistency maintained by exchanging device lists when the other server is updated, thus making it possible for AD servers to share the same device list.

(21) In order to avoid duplication of CSI among different authorized domains, information exchange may be conducted between AD servers managing the different authorized domains, and confirmation made as to whether or not there is duplication.

Also, in order to improve safety, the AD servers may input respective CSI into a hash function to calculate a hash value, and exchange the hash values to confirm whether or not there is duplication.

Also, instead of AD servers generating CSI, a management authority may be provided. The management authority may generate the CSI of all of the authorized domains so as to avoid duplication, and send respective CSI to the AD servers in a safe manner.

(22) Client devices may belong to a plurality of authorized domains.

The number of authorized domains in which a client device can register may be restricted by restricting the number of pieces of CSI that the client device is able to store. Also, the present invention may be structured such that the number of authorized domains in which a client device can register is restricted by AD servers exchanging list information that shows registered client devices. Also, exchanging list information makes it is possible to confirm the number of authorized domains to which client devices belong.

Otherwise, a management authority may be provided for managing the number of authorized domains in which a client device registers.

Also, a single AD server may manage a plurality of authorized domains. In this case, the number of pieces of different CSI that an AD server can store is restricted, and the AD server can manage authorized domains within this number. Also, the AD server may store the registerable number of client devices for each piece of CSI, or may store pieces of CSI in correspondence with group IDs.

(23) Authorized domains may each be allotted an identifier, and at a time of delivering a content, the device delivering the content may embed the identifier of the authorized domain in which the device is registered in the content as an electronic watermark.

In this way, it is possible to specify which authorized domain the content issued from, in the event of a content decrypted by a client device being improperly distributed outside of the authorized domain within which it originated. Furthermore, when a server that delivered the content manages the ID of client devices registered in various authorized domains, the ID of the client device that issued the content may be included in the CRL.

(24) Although contents are delivered to a device after successfully authenticating the device in the above embodiment, the present invention is not limited thereto.

Authentication does not need to be conducted at a time of content delivery in the following cases.

A device on the content transmission end generates an encryption key based on CSI, encrypts a content key by using the generated encryption key, and transmits the encrypted content key and an encrypted content that was encrypted by using the content key.

A device on the receiving end, upon acquiring the encrypted content and encrypted content key, generates, based on the CSI, a decryption key that is the same as the encryption key, decrypts the encrypted content key by using the decryption key to obtain a content key, and decrypts the encrypted content by using the content key to obtain a content.

In this way, only a device that holds the CSI can generate the decryption key and decrypt the encrypted content.

Also, when an encrypted content is delivered first without authentication being conducted, and then authentication, as in the above embodiment, is conducted later to share a session key, and the authentication is successful, the content key may be encrypted by using the session key and delivered.

Moreover, the delivery of an encrypted content may be conducted by communication, or by recording the encrypted content onto a portable recording medium.

Also, even when there is no content delivery request or the like from a device on the receiving end, a device on the transmitting end may judge to conduct content delivery or the like, or may conduct content delivery or the like in accordance with an input from outside.

(25) In the above embodiment, a CSI storage unit stores "0" as an initial value, and upon receipt of CSI generated by AD server 100, overwrites the initial value with the acquired CSI. However, the initial value and the CSI may be stored in separate areas. Also, when the acquired CSI is stored in a separate area to the initial value, the initial value may be deactivated.

Moreover, the deactivated initial value may be reactivated at a time of deleting CSI due to a transfer, withdrawal, or the like.

Moreover, although the above was described in terms of "0" being stored as a value showing "unregistered", this value need not be "0", and may be any value that differs from the value generated as CSI.

(26) Although AD server 100 permits IC card 400 to copy CSI one time in the above embodiment, AD server 100 may permit a plurality of copies.

Also, IC card 400 may prevent CSI from being copied to the same client device more than once by, in addition to authenticating client devices using the CSI, storing the ID of client devices to which the CSI has been copied, and confirming the ID of client devices at a time of copying.

Also, an IC card may be implemented with the function of registering client devices, and a device connected to the IC card may operate as an AD server.

Figure 16:
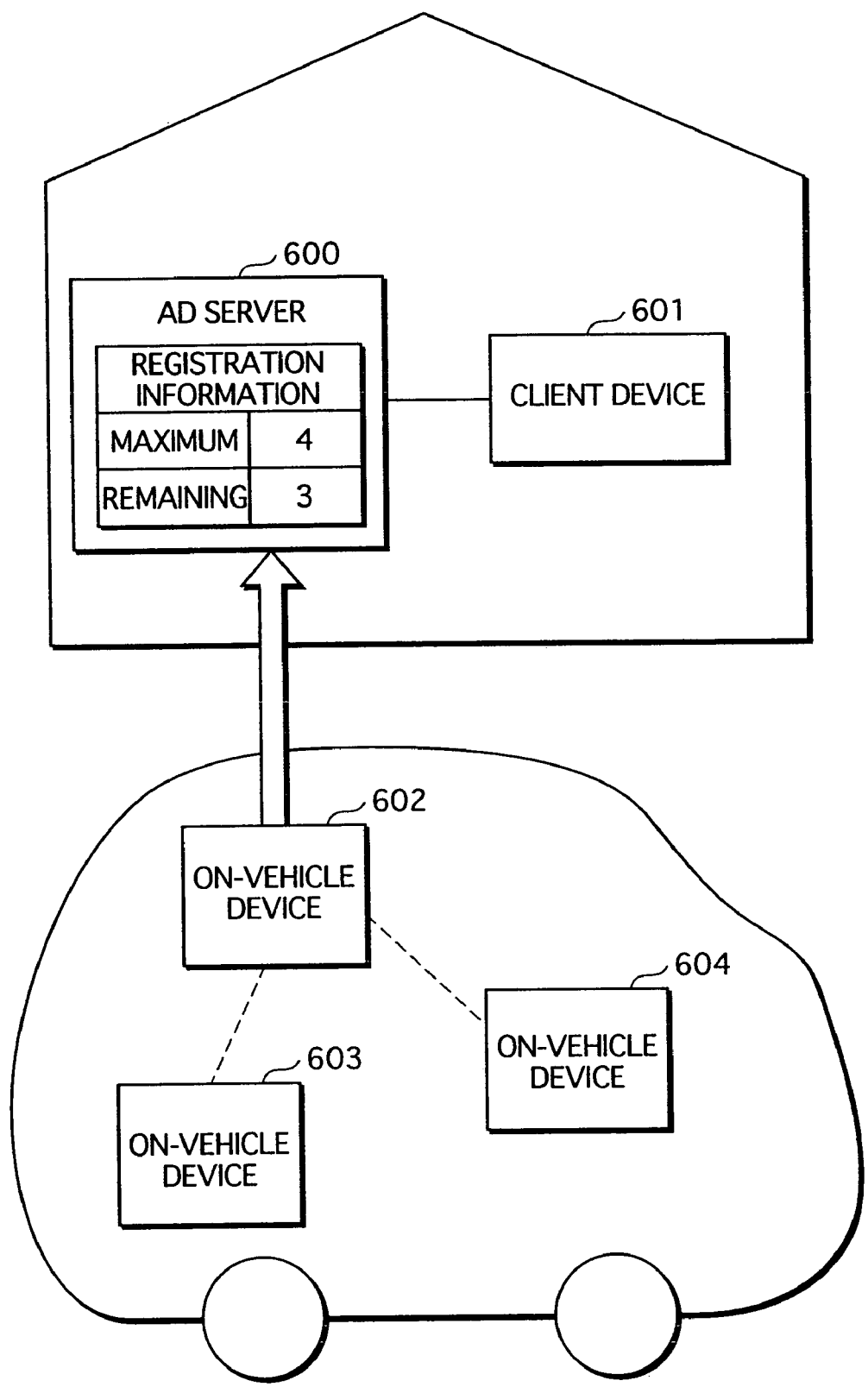
FIG. 16 is a block diagram showing a structure in which a representative device representing a plurality of client devices registers in an AD server 600.

Also, a client device may be registered in an AD server as representing a plurality of client devices, and receive the right to copy CSI to the plurality of client devices. An example of this is shown with reference to FIG. 16.

An AD server 600 and a client device 601 are disposed in the home of a user, and client device 601 is already registered in AD server 600. AD server 600 stores a maximum number and a remaining number as registration information, the maximum number and remaining number in the given example being 4 and 3, respectively.

On-vehicle devices 602, 603 and 604, which are not registered in AD server 600, are mounted in a vehicle owned by the user. On-vehicle devices 603 and 604 do not function to communicate directly with AD server 600. On-vehicle device 602 is portable and does function to communicate directly with AD server 600. Also, on-vehicle devices 602, 603 and 604 are connected to and can communicate with each other.

On-vehicle device 602, when connected to AD server 600 as a representative on-vehicle device, transmits a registration request to AD server 600 that includes a desired number "3", which is the number of client devices on-vehicle device 602 seeks to register.

AD server 600, upon receipt of the registration request, authenticates on-vehicle device 602 and shares a session key, the same as in the above embodiment. If authentication is successful, AD server 600 judges whether the desired number in the registration request is less than or equal to the remaining number stored as registration information. If judged to be less than or equal to the remaining number, AD server 600 reads the stored CSI, encrypts the read CSI and permission right permitting the registration of three devices, by using the session key, and transmits the encrypted CSI and the encrypted permission right to on-vehicle device 602 as encrypted rights information.

On-vehicle device 602, upon receipt of the encrypted rights information, decrypts the encrypted CSI and permission right by using the session key to obtain CSI and a permission right. Also, because 1-device worth of the permission right is used in storing the obtained CSI, the permission right stored shows two devices to be registerable. Also, on-vehicle device 602 conducts authentication with on-vehicle devices 603 and 604, and if successful, transmits the CSI to on-vehicle devices 603 and 604 and reduces the number of registerable devices shown in the permission right.

In this way, on-vehicle devices 603 and 604 can be registered as client devices.

Moreover, if the remaining number is less than the desired number, AD server 600 transmits a permission right permitting the registration of devices equal to the remaining number. As an example, when a permission right permitting the registration of two devices is transmitted, on-vehicle device 602 uses the permission right for 1 device in storing the obtained CSI, and uses the remaining permission right for 1 device by transmitting the CSI to one of on-vehicle devices 603 and 604. The device to which the CSI is transmitted may be selected by the user, or each device may have a priority level, and the CSI is transmitted to the device having the higher priority level.

Also, at a time of registering on-vehicle devices 602, 603 and 604 in AD server 600, the following processing is conducted when registering an ID of each on-vehicle device in AD server 600.

On-vehicle device 602, before registering, acquires the IDs of on-vehicle devices 603 and 604. On-vehicle device 602, at a time of registering, transmits the acquired IDs and the ID of on-vehicle device 602 to AD server 600. AD server 600 stores the received IDs as device IDs. Also, if the remaining number is less than the desired number, AD server 600 stores, from the received IDs, IDs for how ever many devices are shown by the remaining number. In this case, the user may select which IDs to register, or each ID may have a priority level, with IDs being stored in a descending order of priority.

Also, when there is an excess of a permission right, it is possible for on-vehicle device 602 to return the excess to AD server 600.

Moreover, although on-vehicle device 602 is described above as acquiring a permission right that includes the right of on-vehicle device 602, on-vehicle device 602 may register with AD server 600 as described in the above embodiment, and then acquire the right to notify CSI to on-vehicle devices 603 and 604.

(27) A plurality of authorized domains may be combined to form a single authorized domain.

Figure 17:
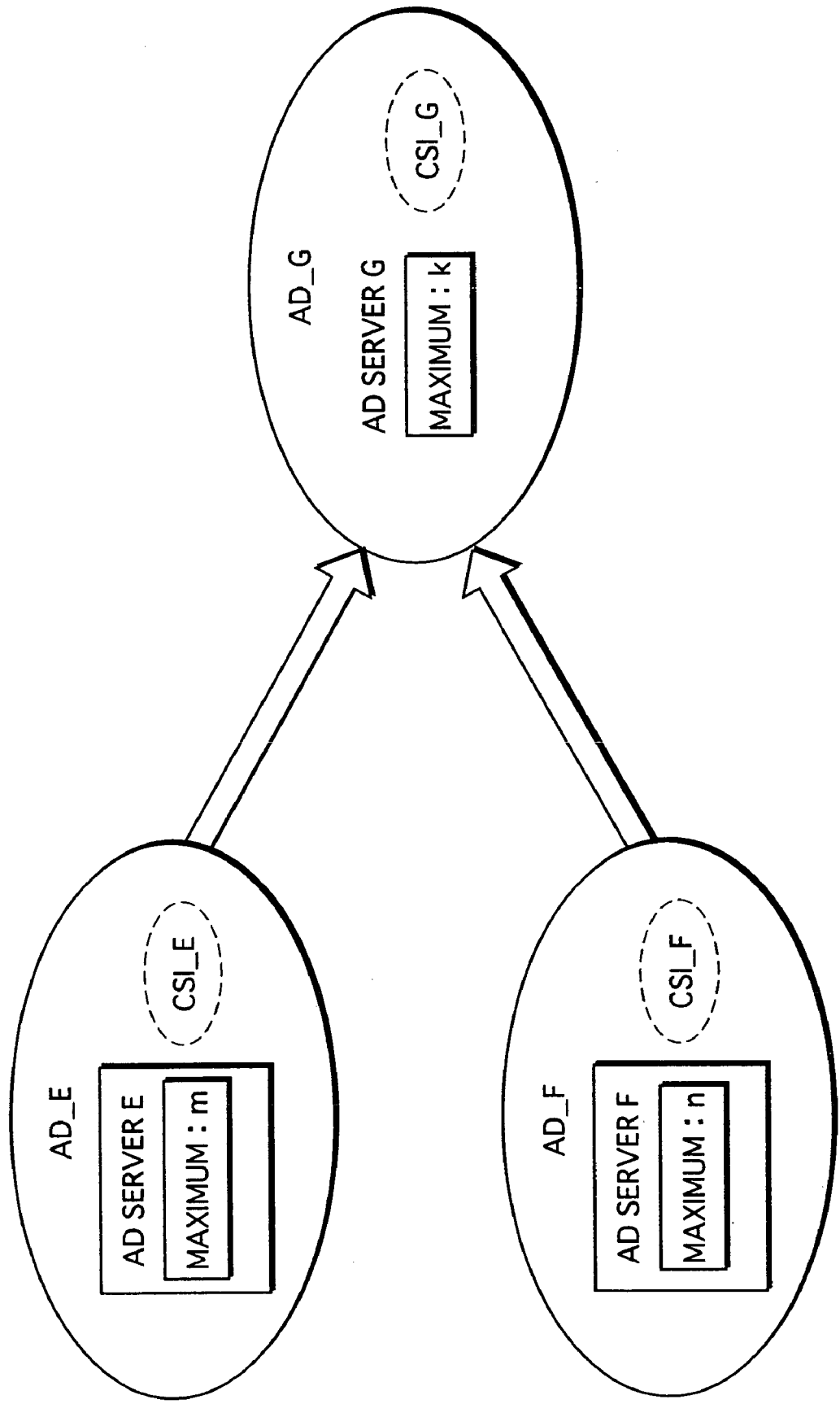
FIG. 17 shows conceptually the formation of a single group from a plurality of groups.

As an example, the combining of AD_E and AD_F to form AD_G is described below with reference to FIG. 17.

AD_E and AD_F are each structured from a single AD server and a plurality of client devices (not depicted). A maximum of "m" number of client devices is registerable in an AD server E in AD_E, and devices registered in AD_E each hold CSI_E. Also, a maximum of "n" number of client devices is registerable in an AD server F in AD_F, and devices registered in AD_F each hold CSI_F.

AD_G is formed from these two authorized domains. First, a device to be AD server G managing AD_G is determined from out of AD servers E and F. At this time, the device to be AD server G may be determined based on processing capacity, priority levels and the like, or may be determined by a user. The AD server that is not AD server G is registered in AD_G as a client device.

A maximum of "k" number of devices registerable in AD server G is set as "m", "n" or the mean of "m" and "n". Also, AD server G newly generates CSI_G, authenticates each of the client devices, and transmits CSI_G to devices that are successfully authenticated.

If the aggregate number of devices forming AD_E and AD_F exceeds the maximum "k", devices for registration are selected. In this case, AD server G may make the selection based on predetermined priority levels, or the user may make the selection.

Moreover, apart from newly forming a single authorized domain from two existing authorized domains, one authorized domain may be added to the other authorized domain. When AD_F is added to AD_E, devices within AD_F are registered in AD server E as AD_E client devices, and hold CSI_E. In this case, if the number of client devices for registration exceeds maximum "m", devices for registration may be selected as described above.

Moreover, "m", "n" and "k" are positive integers.

(28) A single authorized domain may be divided into a plurality of authorized domains.

Figure 18:
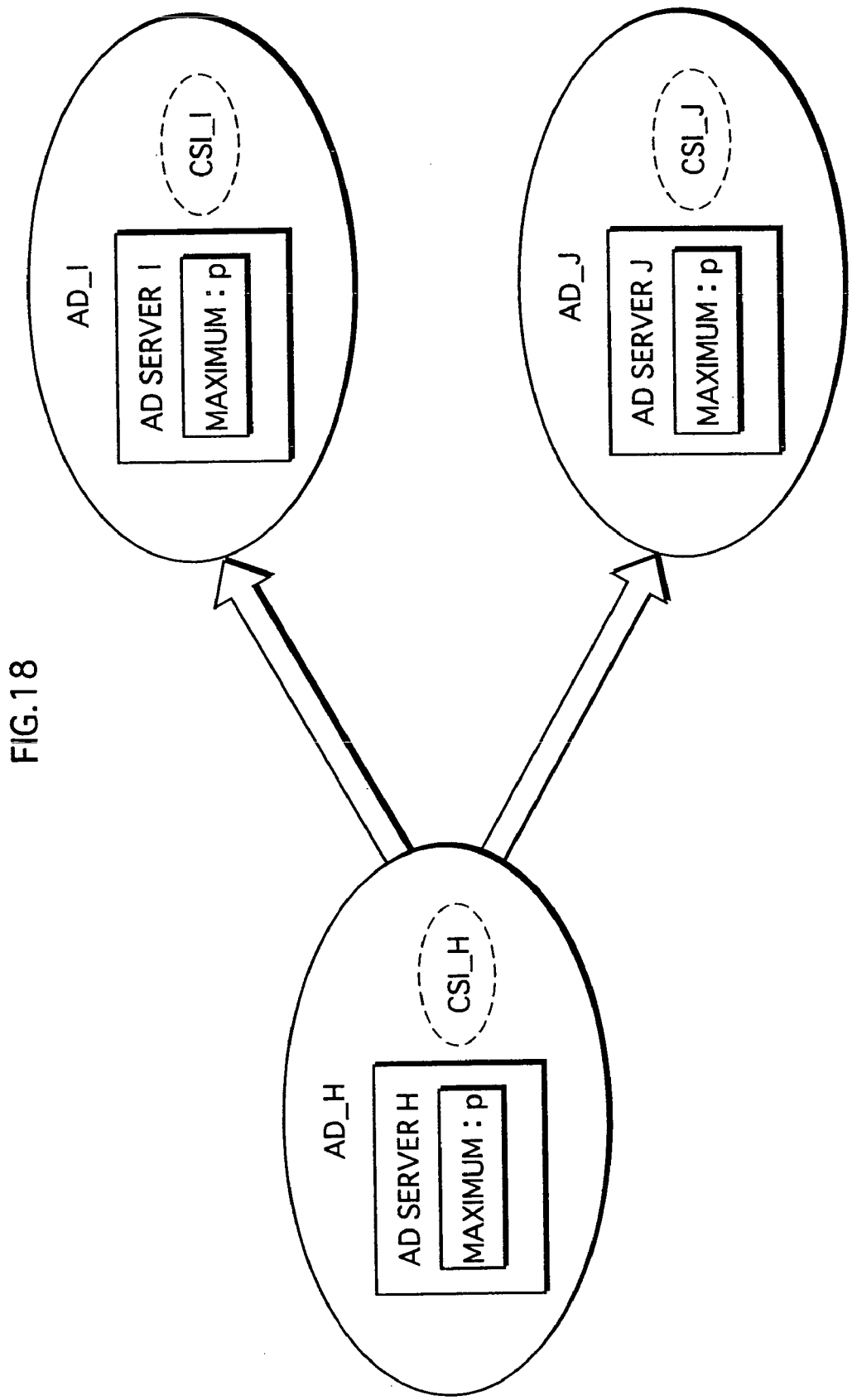
FIG. 18 shows conceptually the division of a single group to form a plurality of groups.

As an example, the forming of AD_I and AD_J from AD_H is described below with reference to FIG. 18.

AD_H is structured from an AD server H and a plurality of client devices (not depicted).

AD server H is able to register "p" (positive integer) number of client devices, and devices registered in AD_H each store CSI_H.

AD server H, at a time of forming AD_I and AD_J, selects devices to be new AD servers I and J from client devices in AD_H. At this time, devices having a high processing capability may be selected as AD servers, or the selection may be made based on the predetermined priority levels of devices. Also, a user may make the selection, or the selection may be made among client devices based on processing capability, priority levels and the like. Moreover, AD server H may form a new authorized domain as AD server I or AD server J.

After the division, client devices to belong to each authorized domain are selected. At this time, AD servers I and J may make respective selections based on priority levels, or the user may make the selection.

AD servers I and J can each register a maximum of "p" number of client devices. Also, once the client devices of each authorized domain have been selected, AD server I generates CSI_I and transmits the generated CSI_I to selected client devices. Also, AD server J, in the same way, generates CSI_J and transmits the generated CSI_J to selected client devices.

Moreover, AD servers I and J may conduct authentication every time a client device is selected or at a time of transmitting newly generated CSI.

Also, apart from newly forming two authorized domains from a single authorized domain as described above, one new authorized domain may be formed from AD_H, and client devices may be divided between the original AD_H and the new authorized domain.

(29) When a client device cuts a power supply, the client device may remain registered in an AD server, and CSI may be temporality deleted.

In this case, once a client device is registered in an AD server, the AD server stores an ID of the client device, and transmits CSI.

The client device, having stored the received CSI, is able to use contents as a device within the authorized domain managed by the AD server. The client device, upon receipt of a power-OFF instruction, deletes the CSI and sets its power off. At this time, the ID of the client device stored in the AD server is not deleted.

When the power supply of the client device is again set "on", the client device transmits the ID to the AD server. The AD server judges whether or not an ID matching the received ID exists among IDs stored therein, and again transmits the CSI to the client device without updating the registration information if a matching ID is judged to exist.

Moreover, the CSI may also be temporarily deleted in the event of cable or radio communication being interrupted, and when communication is reestablished, the ID may again be transmitted and the CSI acquired again.

(30) Although authentication is conducted by using CSI in the above embodiment, the following authentication processing (a) to (c) may be supplemented.

(a) Authenticate that a client device is connected to the same in-house LAN as an AD server, by using a code uniformly provided by a system, or a MAC address, an IP address or the like. In this way, it becomes difficult to register the client device of another user/entity.

Also, when an AD server and a client device conduct radio communication, it may be authenticated that the client device is within range of the radio waves.

Also, when communication is possible between an AD server and a client device, authentication data may be transmitted from the AD server to the client device, and response data may be transmitted from the client device to the AD server. The AD server may clock the time period from transmission of the authentication data to reception of the response data, and if the clocked time is within a preset threshold, the client device may be authenticated as being located in-house.

Also, time-to-live (TTL) values may be set to be within the number of in-house routers, thus preventing the AD server from being able to communicate with out-house devices.

Also, it may be authenticated whether a client device is located in-house by judging whether or not the client device is connected to the same power source as the AD server.

(b) Preset a password in an AD server, and at a time of registering a client device, the user manually inputs a password into the client device. The client device transmits a registration request to the AD server that includes the inputted password, and the AD server judges whether or not the received password included in the registration request matches the preset password.

Also, a plurality of passwords may be set, an example of which is each member of a family setting their own password. Also, an ID identifying a user may be combined with a password.

(c) Instead of a password as in (b) above, biomatrix information such as fingerprints, the iris, and the like may be used. In this way, it becomes possible for only a preset user to register a client device.

(31) An initial value held by a client device may be applied as described in (a) to (c) below.

(a) A client device holds a single initial value showing "not registered in AD server". When the client device registers with the AD server, the initial value is deactivated.

(b) A client device holds a plurality of initial values corresponding one-to-one with a plurality of AD servers. At a time of registering with one of the AD servers, authentication is conducted by using an initial value corresponding to the AD server, and if successful and the client device is registered, the corresponding initial value is deactivated. Likewise, if the client device registers in another of the AD servers, an initial value corresponding to the other AD server is deactivated.

Moreover, each initial value may be identified in correspondence with an identifier of a group.

(c) A client device holds a single initial value showing "not registered in any AD server". When the client device registers with an AD server, the initial value is deactivated.

(32) The present invention may be a method showing the above. Also, this method may be computer program realized by a computer, or a digital signal formed from the computer program.

Also, the present invention may be a flexible disk, a hard disk, a CD-ROM, an MO, a DVD, a DVD-ROM, a DVD-RAM, a BD (blu-ray disk), a semiconductor memory or similar computer-readable recording medium that stores the computer program or the digital signal. Also, the present invention may be the computer program or digital signal recorded onto such a recording medium.

Also, the present invention may be the computer program or the digital signal transmitted via a network or the like, representative examples of which include a telecommunication circuit, a radio or cable communication circuit, and the Internet.

Also, the present invention may be a computer system that includes a microprocessor and a memory, the memory storing the computer program and the microprocessor operating in accordance with the computer program.

Also, by transferring the computer program or the digital signal, either recorded on the recording medium or via a network or the like, the present invention may be implemented by another independent computer system.

(33) The present invention may be any combination of the above embodiment and modifications.

Content Duplication Management System 1000

Group formation/management system 1 described above is constructed so as to allow contents to be freely transmitted among devices within a group that is formed by AD server 100. Hereinafter, a description is given of a modification of the transmission of contents of which duplication is restricted. To this end, a description is first given of a content duplication management system 1000 that manages content transmission in compliance with duplication restriction of each content.

Content duplication management system 1000 is a system for receiving contents that are broadcast from a broadcast station or transmitted over a network, and for allowing the member devices of a group formed by AD server 100 to use the received contents. Hereinafter, a description is given of an example in which content duplication management system 1000 receives contents from a broadcast station.

<Structure>

First, a description is given of a structure of content duplication management system 1000.

Figure 19:
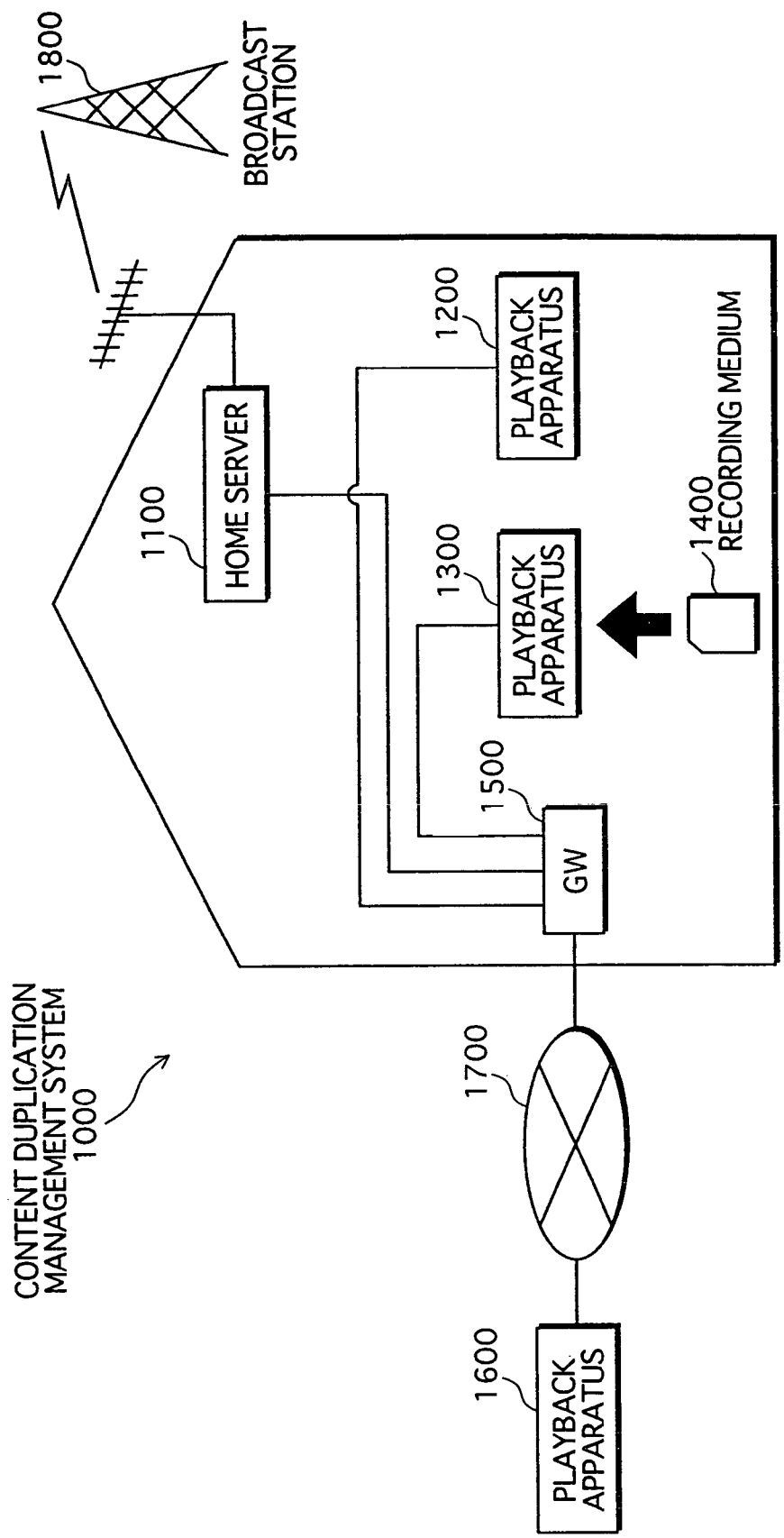
FIG. 19 is a view showing a structure of a content duplication management system 1000.

FIG. 19 is a view showing the structure of content duplication management system 1000. As shown in FIG. 19, content duplication management system 1000 is structured from a home server 1100, a playback apparatus 1200, a playback apparatus 1300, a recording medium 1400, a gateway (GW) 1500, a playback apparatus 1600, and a broadcast station 1800.

In FIG. 19, a solid line enclosing some of the components represents that those components are located within a household. Further, home server 1100, playback apparatus 1200, playback apparatus 1300, and gateway 1500 are mutually connected via an Ethernet. Recording medium 1400 is a portable recording medium that is mounted onto playback apparatus 1300 when put to use. Here, the network that is inside gateway 1500 (i.e. within the household) is referred to as a home network. The home network is connected to playback apparatus 1600, which is located outside the household, via gateway 1500 and Internet 1700. In the system, home server 1100, playback apparatus 1200, playback apparatus 1300, and recording medium 1400 are members of a group formed by AD server 100, and thus share common secret information. Hereinafter, home server 1100, playback apparatus 1200, playback apparatus 1300, and recording medium 1400 may also be referred to as "in-group devices", while playback apparatus 1600 may also be referred to as an "out-group device".

1. Home Server 1100

Figure 20:
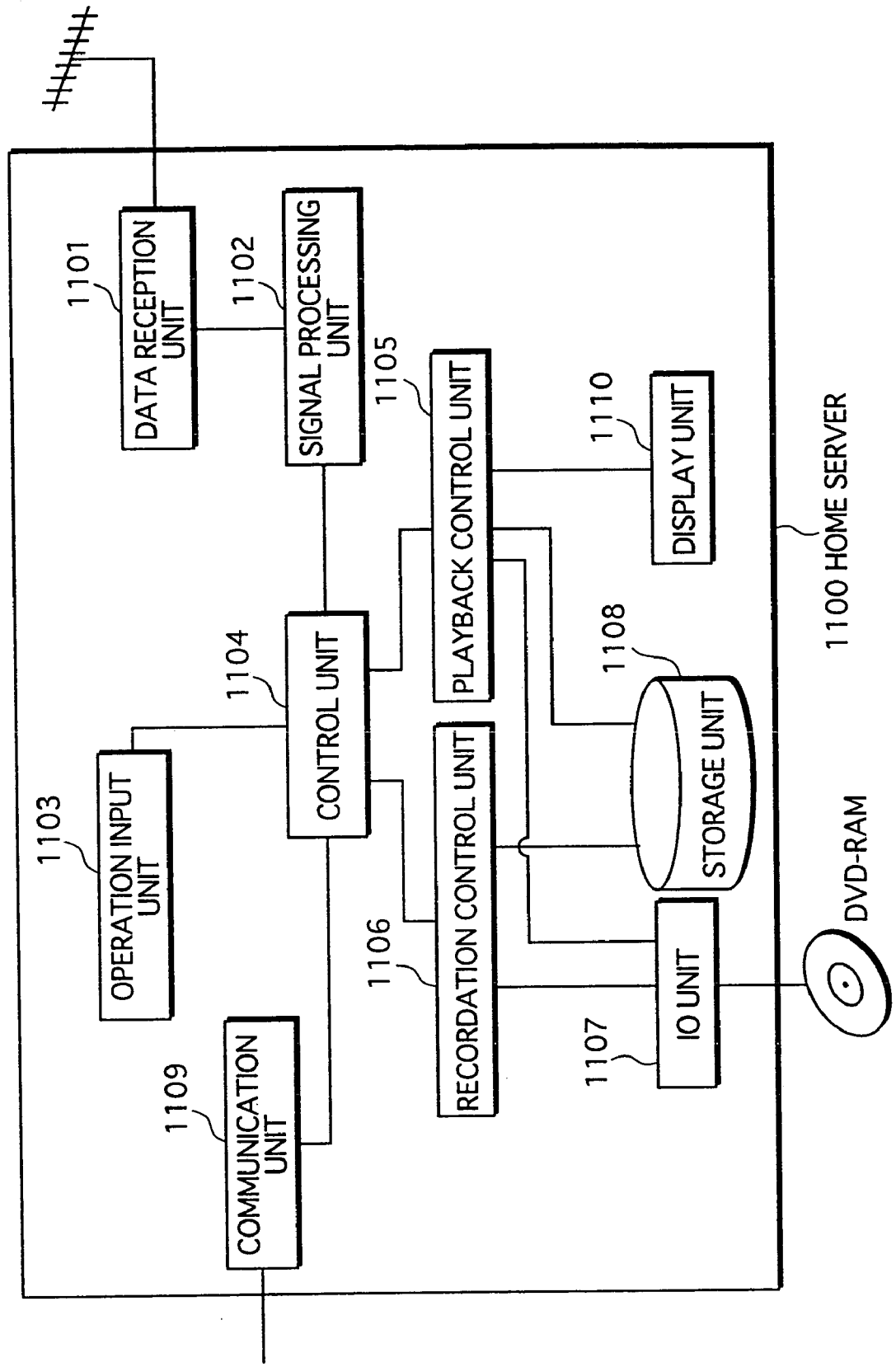
FIG. 20 is a block diagram showing a structure of a home server 1100.

FIG. 20 is a block diagram showing a structure of home server 1100. As shown in FIG. 20, home server 1100 is structured from a data reception unit 1101, a signal processing unit 1102, an operation input unit 1103, a control unit 1104, a playback control unit 1105, a recordation control unit 1106, an IO (input/output) unit 1107, a storage unit 1108, a communication unit 1109, and a display unit 1110.

Home server 1100 is specifically a computer system structured from a CPU, a ROM, a RAM, a hard disk drive, a network interface, and the like. Home server 1100 carries out its functions by the CPU executing a computer program.

In this example, home server 1100 is assumed to be a DVD recorder, and is thus structured to receive contents via terrestrial broadcasting. Yet, it is naturally appreciated that home server 1100 according to the present invention is not limited to a DVD recorder, and may be a personal computer. Home server 1100 may be structured to receive contents via Internet 1700.

(1) Data Reception Unit 1101

Data reception unit 1101 receives, with an antenna, a broadcast wave that is broadcast from broadcast station 1800.

(2) Signal Processing Unit 1102

Signal processing unit 1102 generates content information 1121 from the broadcast wave received by data reception unit 1101, and outputs the generated content information 1121 to control unit 1104. To be more specific, signal processing unit 1102 extracts transport streams from the received broadcast wave, and accumulates the extracted transport streams to generate content information 1121.

Figure 21:
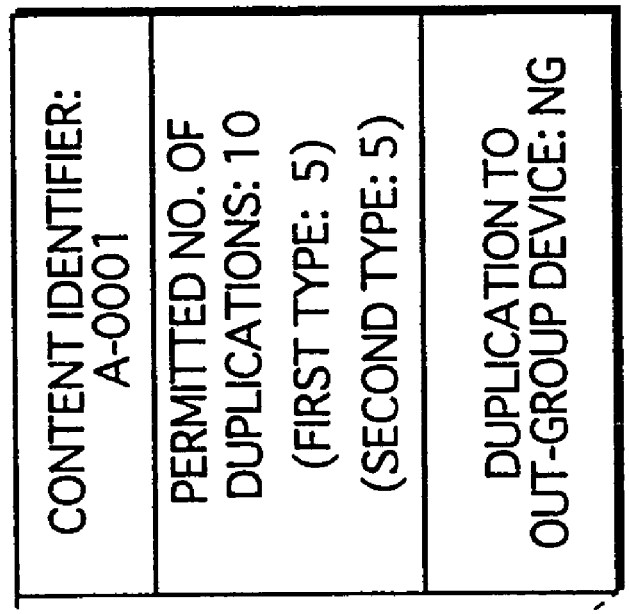
FIG. 21 is a view showing a data structure of content information 1121.

FIG. 21 is a view showing a data structure of content information 1121. As shown in FIG. 21, content information 1121 is composed of a content 1122 and duplication restricting information 1123.

Content 1122 is digital data representing a movie, for example. Duplication restricting information 1123 is metadata about the duplication of content 1122. Duplication restricting information 1123 is composed of a content identifier, a permitted number of duplications, and a flag indicting whether or not content duplication to an out-group device is permitted.

The content identifier is a series of symbols that uniquely identity the content. As shown in FIG. 21, the content identifier of content 1122 is "A-0001".

The permitted number of duplications represents the right to duplicate the content to another device up to that number of times. Note that the permitted number of duplications is a sum of two numbers that are permitted separately for duplications to a first type device and to a second type device. The first type device refers to a device that duplicates a content to a non-portable recording medium, and the second type device refers to a device that duplicates a content to a portable recording medium. As shown in FIG. 21, the permitted number of duplications in content information 1121 is "10 (first type: 5, and second type: 5)", which means that it is permitted to duplicate the content to a first type device up to five times, and to a second type device up to another five times.

The flag indicating whether or not content duplication to an out-group device is permitted is set to either "OK" or "NG". When set to "OK", the flag indicates that duplication of the content to an out-group device is permitted. When set to "NG", on the other hand, the flag indicates that duplication of the content to an out-group device is prohibited. As shown in FIG. 21, the flag in this embodiment is set to "NG", which means that duplication of content 1122 to an out-group device is prohibited.

(3) Operation Input Unit 1103

Operation input unit 1103 is provided with a remote controller and an infrared photoreceiver. At a push of one of the buttons on the remote controller by a user, operation input unit 1103 generates an input signal corresponding to the pushed button, and outputs the generated input signal to control unit 1104.

Examples of an input signal that relates to a content duplication request are a content identifier identifying a content requested to be duplicated, and a requested number of duplications.

(4) Control Unit 1104

Control unit 1104 is structured from a CPU, a ROM, a RAM, and the like, and performs overall control of home server 1100 by the CPU executing a computer program. When receiving an input signal from operation input unit 1103, control unit 1104 performs various types of processing, such as recordation processing, playback processing, duplication request processing, and duplication processing, according to the received input signal.

When performing the recordation processing, control unit 1104 receives, a content from signal processing unit 1102, and outputs the received content to recordation control unit 1106.

When performing the playback processing to play a content that is received by data reception unit 1101, control unit 1104 receives the content from signal processing unit 1102, and outputs the received content to playback control unit 1105. When performing the playback processing to play a content that is stored in storage unit 1108 or that is recorded on a DVD-RAM mounted to IO unit 1107, control unit 1104 receives the content from storage unit 1108 or IO unit 1107, and outputs the received content to playback control unit 1105.

When performing the duplication request processing, control unit 1104 receives from operation input unit 1103, user input, such as a content identifier, a device identifier to which the duplication request is to be made, and a requested number of duplications. Note that the device identifier includes information representing whether a corresponding device is a first type device of a second type device.

Control unit 1104 transmits a duplication request to the request destination device via communication unit 1109. The duplication request is composed of the requested number of duplications, the content identifier, and the device identifier of the request destination device, and additionally of common secret information 1133 and a device identifier 1134 both stored in control unit 1104.

Figure 22:
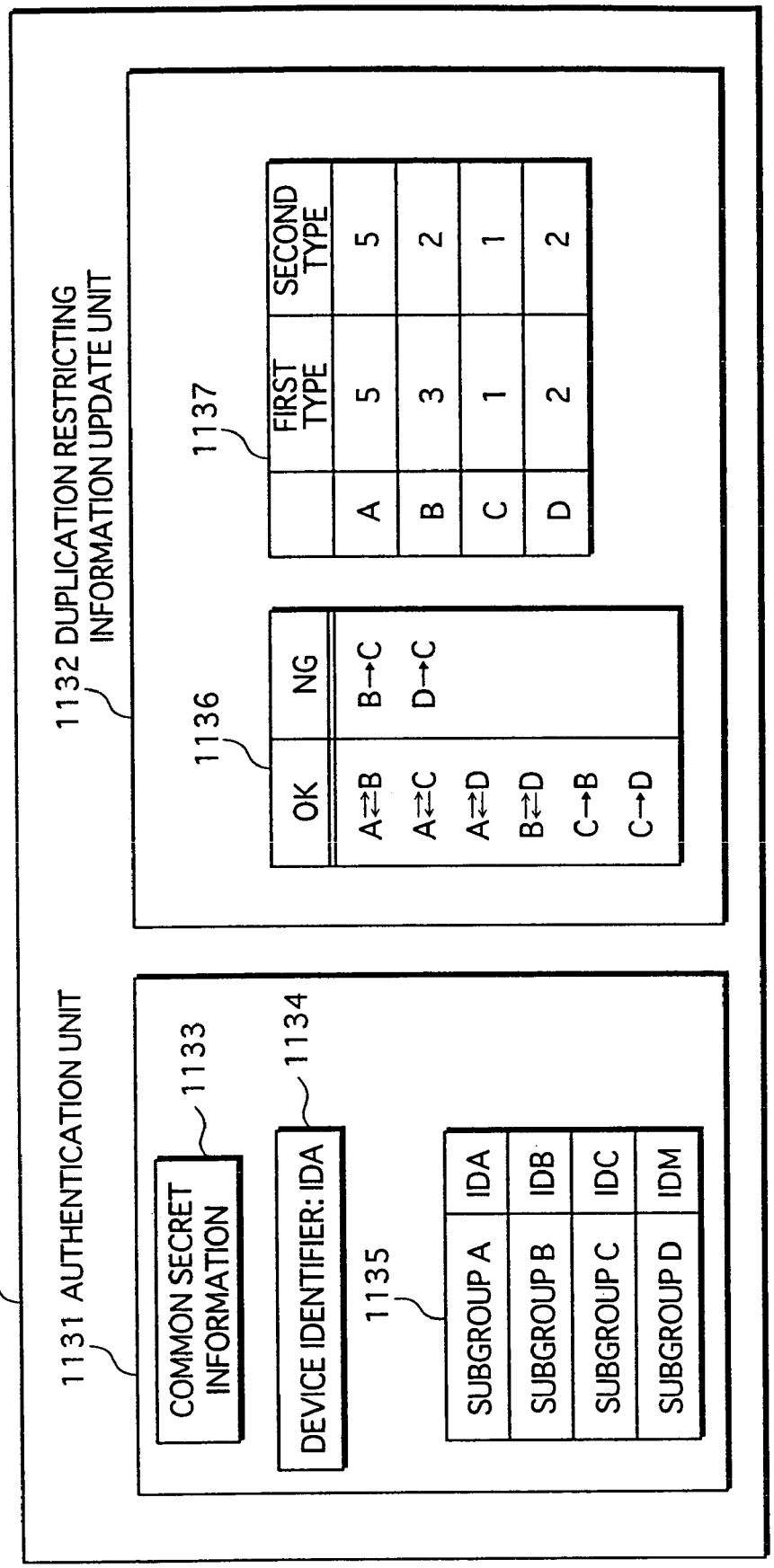
FIG. 22 is a view showing functional blocks of a control unit 1104.

Next, a description is given of the duplication processing. As shown in FIG. 22, control unit 1104 is structured from an authentication unit 1131 and a duplication restricting information update unit 1132 (hereinafter, simply referred to as update unit 1132). As shown in FIG. 22, authentication unit 1131 stores therein common secret information 1133, device identifier 1134, and a table 1135. Update unit 1132 stores therein tables 1136 and 1137.

Common secret information 1133 is information commonly stored in advance in all the in-group devices (home server 1100, playback apparatus 1200, playback apparatus 1300, and recording medium 1400), and is used to perform mutual authentication with another in-group device.

Device identifier 1134 is a series of symbols that uniquely identify home server 1100. As shown in FIG. 22, the device identifier 1134 of home server 1100 is "IDA".

Table 1135 shows device identifiers correspondingly to subgroup identifiers. Each subgroup identifier identifies a subgroup to which a device identified by a corresponding device identifier belongs. As shown in FIG. 22, the device that is identified by the device identifier "IDA" (i.e. home server 1100) belongs to a "subgroup A". The device that is identified by the device identifier "IDB" belongs to a "subgroup B". The device that is identified by the device identifier "IDC" belongs to a "subgroup C". The device that is identified by the device identifier "IDM" belongs to a "subgroup D".

Table 1136 shows whether or not it is permitted to duplicate a content from a device in one subgroup to a device in another subgroup. In table 1136, the OK column on the left shows, for example, "A→B", which indicates that duplication of a content from a device in the subgroup A to a device in the subgroup B is permitted. Similarly, "A←B" in the OK column indicates that duplication of a content from a device in the subgroup B to a device in the subgroup A is permitted. On the other hand, the NG column on the right shows, for example, "B→C", which indicates that duplication of a content from a device in the subgroup B to a device in the subgroup C is prohibited. Similarly, "D→C" in the NG column indicates that duplication of a content from a device in the subgroup D to a device in the subgroup C is prohibited.

Table 1137 shows a maximum permissible number that is determined for a device in each subgroup. In other words, the table shows an upper limit to the permitted number of duplications that each device can possibly hold. As shown in FIG. 22, the maximum permissible number of duplications that a device in the subgroup A can hold is "first type: 5, and second type: 5". Similarly, the maximum permissible number of duplications that a device in the subgroup B can hold is "first type: 3, and second type: 2". The maximum permissible number of duplications that a device in the subgroup C can hold is "first type: 1, and second type: 1". The maximum permissible number of duplications that a device in the subgroup D can hold is "first type: 2, and second type: 2".

Note that tables 1135, 1136 and 1137 are commonly stored in advance in home server 1100, playback apparatus 1200, and playback apparatus 1300.

Authentication unit 1131 receives a duplication request from a request source device via communication unit 1109. The duplication request is composed of a content identifier, a device identifier identifying the request source device, the common secret information, and the requested number of duplications.

Authentication unit 1131 performs authentication by using the received common secret information. The authentication performed herein is, for example, challenge/response type handshaking based on zero-knowledge proof. To be more specific, authentication between home server 1100 and the request source device is performed by using a secret key that has been generated and shared according to secret-key sharing cryptography.

When it is judged through the authentication that the request source device is an out-group device, authentication unit 1131 transmits, to the request source device via communication unit 1109, an error message informing that the duplication request has been rejected.

On the other hand, when it is judged through the authentication that the request source device is an in-group device, authentication unit 1131 updates duplication restricting information as shown in the following examples.

In a first example, authentication unit 1131 has received from a request source device, a duplication request composed of the content identifier "A-0001", the device identifier "IDB", and the requested number of duplications "3 (first type: 2, and second type: 1)".

With reference to the received device identifier "IDB", authentication unit 1131 judges that the request source device is a "first type" device.

Next, authentication unit 1131 identifies, with reference to table 1135 stored therein, its own subgroup and the subgroup to which the request source device belongs. In this example, authentication unit 1131 storing the device identifier "IDA" is judged to be a member device of the "subgroup A", and the request source device of which device identifier is "IDB" is judged to be a member of the "subgroup B". Accordingly, authentication unit 1131 passes, to update unit 1132, the request destination subgroup identifier "subgroup A", the request source subgroup identifier "subgroup B", and the requested number of duplications "3 (first type: 2, and second type: 1)".

Update unit 1132 receives the request destination subgroup identifier "subgroup A", the request source subgroup identifier "subgroup B", and the requested number of duplications "3 (first type: 2, and second type: 1)" from authentication unit 1131. Update unit 1132 then judges, with reference to table 1136, whether or not content duplication from a device in the "subgroup A" to a device in the "subgroup B"is permitted. Since table 1136 shows "A→B" in the OK column, update unit 1132 accordingly judges that such duplication is permitted.

Update unit 1132 then judges, with reference to table 1137, whether or not the requested number of duplications "3 (first type: 2, and second type: 1)" falls within the maximum permissible number of duplications determined for the request source device. Since table 1137 shows that the maximum permissible number of duplications determined for a device in the subgroup B is "first type: 3, and second type: 2", update unit 1132 judges that the requested number of duplications falls within the maximum permissible number.

Update unit 1132 then identifies, via recordation control unit 1106, a requested content by the content identifier "A-0001" from among contents stored in storage unit 1108, and reads duplication restricting information 1123 included in the identified content information 1121.

Update unit 1132 compares the permitted number of duplications shown by the read duplication restricting information 1123 with the requested number of duplications to see which is greater. Here, the permitted number of duplications shown by duplication restricting information 1123 is "10 (first type: 5, and second type: 5)", so it is judged that the requested number of duplications "3 (first type: 2, and second type: 1)" is not greater than the permitted number.

Figure 23A:
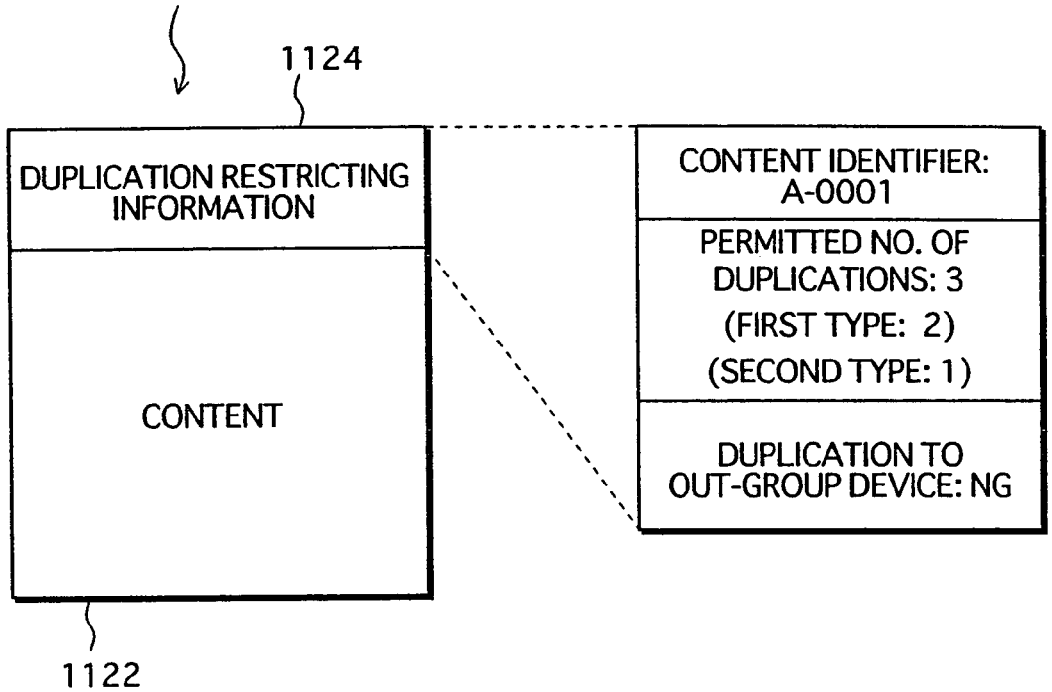
FIGS. 23A and 23B are views showing data structures of content information 1125 and 1127, respectively.

When judging that the requested number of duplications is within the permitted number, update unit 1132 generates duplication restricting information 1124 to be transmitted to the request source device together with content 1122. As shown in FIG. 23A, duplication restricting information 1124 is composed of the content identifier "A-0001", the permitted number of duplications "3 (first type: 2, and second type: 1)", and the flag set to "NG", which indicates that content duplication to an out-group device is prohibited.

Update unit 1132 transmits content information 1125, which is composed of the generated duplication restricting information 1124 and the requested content 1122, to the request source device via communication unit 1109.

Figure 23B:
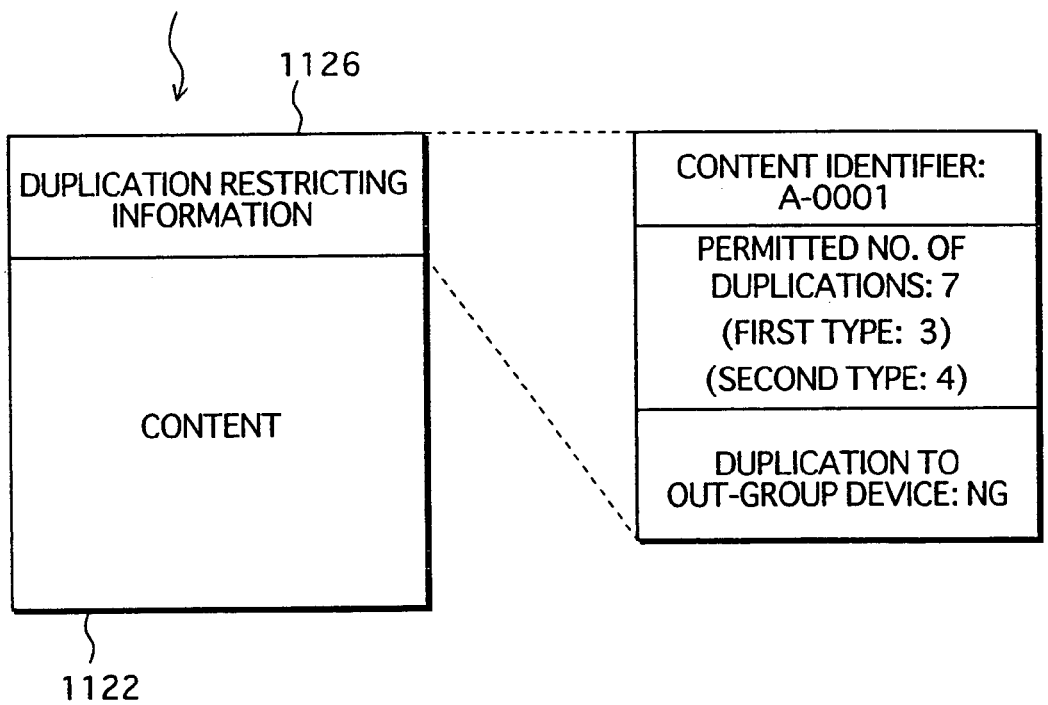

Upon receiving, from the request source device via communication unit 1109, information notifying that content information 1125 has been fully received, update unit 1132 updates the duplication restricting information, so that duplication restricting information 1123 as shown in FIG. 21 is altered to duplication restricting information 1126 as shown in FIG. 23B.

To be more specific, update unit 1132 first subtracts, from the permitted number of duplications "10 (first type: 5, and second type: 5)" shown by duplication restricting information 1123, the permitted number of duplications "3 (first type: 2, and second type: 1)" that has been transferred, as the duplication restricting information 1124, to the request source device. Update unit 1132 then generates duplication restricting information 1126 with the subtraction result "7(first type: 3, and second type: 4)".

Update unit 1132 then attaches, via recordation control unit 1106, the thus generated duplication restricting information 1126 to content 1122 that is stored in storage unit 1108, thereby replacing the duplication restricting information 1123 with the duplication restricting information 1126.

Note that the description hereinafter is given on the supposition that home server 1100 stores content information 1127 (shown in FIG. 23B) that is composed of duplication restricting information 1126 and content 1122.

Now, a description is given of a second example in which authentication unit 1131 has received, from a request source device, a duplication request that is composed of the content identifier "A-0001", the device identifier "IDC", and the requested number of duplications "2 (first type: 1, and second type: 1)".

By the received device identifier "IDC", authentication unit 1131 judges that the request source device is a "first type" device.

Authentication unit 1131 judges, with reference to table 1135 stored therein, that the device which includes authentication unit 1131 belongs to the "subgroup A", and the request source device belongs to the "subgroup C". Authentication unit 1131 then passes the request destination subgroup identifier "subgroup A", the request source subgroup identifier "subgroup C", and the requested number of duplications "2 (first type: 1, and second type: 1)" to update unit 1132.

When receiving the request destination subgroup identifier "subgroup A", the request source subgroup identifier "subgroup C", and the requested number of duplications "2 (first type: 1, and second type: 1)" from authentication unit 1131, update unit 1132 judges, with reference to table 1136, that content duplication from a device in the "subgroup A" to a device in the "subgroup C" is permitted.

Update unit 1132 then judges, with reference to table 1137, that the requested number of duplications "2 (first type: 1, and second type: 1)" falls within the maximum permissible number of duplications determined for a device in the "subgroup C".

Update unit 1132 identifies, via recordation control unit 1106, content information that includes the content identifier "A-0001" from among pieces of content information stored in storage unit 1108, and reads duplication restricting information 1123 from the thus identified content information 1121.

Figure 24A:
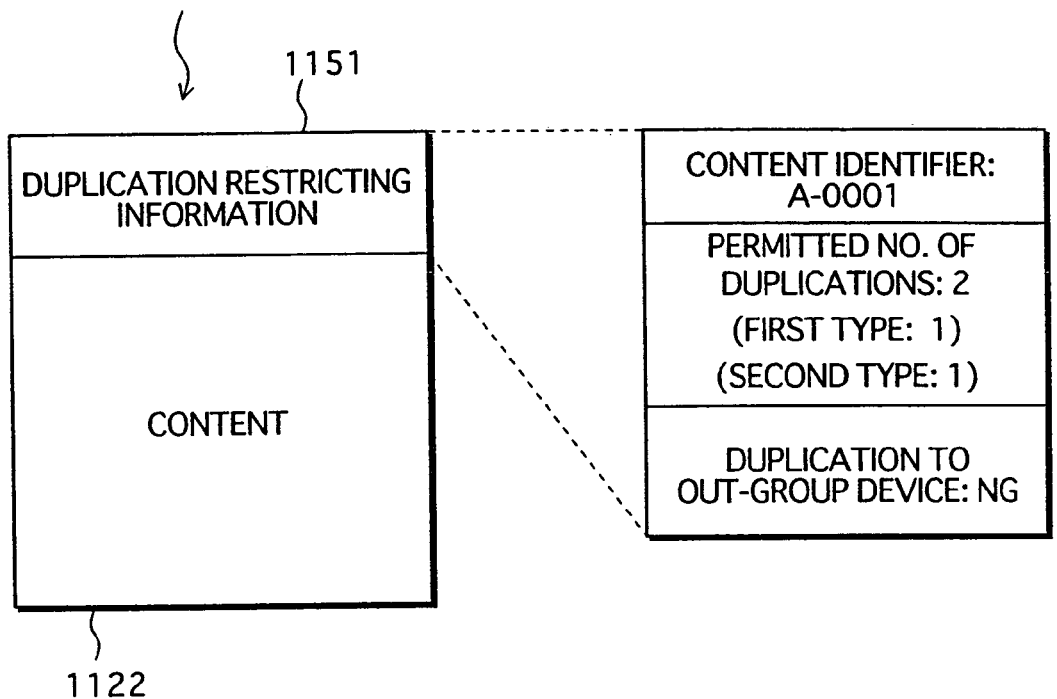
FIGS. 24A and 24B are views showing data structures of content information 1150 and 1153, respectively.

Update unit 1132 compares the permitted number of duplications shown by the read duplication restricting information 1123 and the requested number of duplications to see which is greater. As a result, update unit 1132 judges that the requested number of duplications "2 (first type: 1, and second type: 1)" is not greater than the permitted number. Update unit 1132 then generates duplication restricting information 1151 that is to be transmitted to the request source device together with content 1122. As shown in FIG. 24A, duplication restricting information 1151 is composed of the content identifier "A-0001", the permitted number of duplications "2 (first type: 1, and second type: 1)", and the flag set to "NG" indicating that content duplication to an out-group device is prohibited.

Update unit 1132 transmits, to the request source device via communication unit 1109, content information 1150 that is composed of the generated duplication restricting information 1151 and the requested content 1122.

Figure 24B:
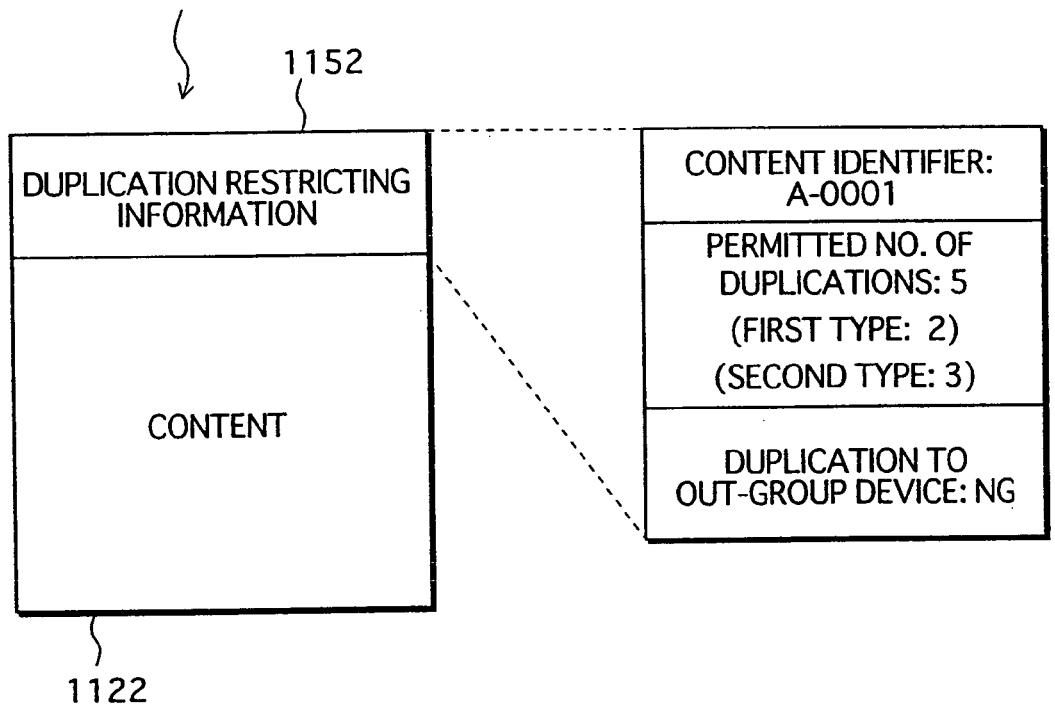

Upon receiving, from the request source device via communication unit 1109, information notifying that content information 1150 has been fully received, update unit 1132 updates the duplication restricting information, so that duplication restricting information 1126 as shown in FIG. 23B is altered to duplication restricting information 1152 as shown in FIG. 24B. To be more specific, update unit 1132 first subtracts, from the permitted number of duplications "7 (first type: 3, and second type: 4)" shown by the duplication restricting information 1126, the permitted number of duplications "2 (first type: 1, and second type: 2)" that has been transferred, as duplication restricting information 1151, to the request source device. Update unit 1132 then generates duplication restricting information 1152 with the subtraction result "5 (first type: 2, and second type: 3)".

Update unit 1132 attaches, via recordation control unit 1106, the generated duplication restricting information 1152 to content 1122 stored in storage unit 1108, thereby replacing the duplication restricting information 1126 with the duplication restricting information 1152.

(5) Playback Control Unit 1105

Playback control unit 1105 receives a content generated by signal processing unit 1102 from control unit 1104, and outputs the received content to display unit 1110. In addition, playback control unit 1105 reads a content stored in storage unit 1108, and decodes the read content to output to display unit 1110. Further, playback control unit 1105 reads, via IO unit 1107, a content recorded on a DVD-RAM that is mounted to IO unit 1107, and decodes the read content to output to display unit 1110.

(6) Recordation Control Unit 1106

Recordation control unit 1106 reads information from or writes information to storage unit 1108 under instructions from control unit 1104. To be more specific, recordation control unit 1106 receives instructions from update unit 1132 included in control unit 1104. According to the instructions, recordation control unit 1106 accesses storage unit 1108 to read duplication restricting information that is included in a content, and outputs the read duplication restricting information to update unit 1132. Further, recordation control unit 1106 receives duplication restricting information from update unit 1132, and attaches the received duplication restricting information to a corresponding piece of content information stored in storage unit 1108.

Further, recordation control unit 1106 reads information from, or writes information to a DVD-RAM via IO unit 1107 under instructions from control unit 1104.

(7) IO Unit 1107

IO unit 1107 is specifically a DVD-RAM drive unit that writes information received from control unit 1104 via recordation control unit 1106 to a DVD-RAM being mounted thereto. Further, IO unit 1107 reads information from a DVD-RAM being mounted thereto, and outputs the read information to playback control unit 1105 or to recordation control unit 1106.

(8) Storage Unit 1108

Storage unit 1108 is specifically a hard disk drive unit, and stores contents that are broadcast from the broadcast station or transmitted from another device via communication unit 1109.

(9) Communication Unit 1109

Communication unit 1109 is separately connected to each in-group device via the Ethernet, and performs transmission of duplication requests and requested contents between control unit 1104 and an in-group device.

When transmitting a content to an in-group device, communication unit 1109 encrypts the content with a secret key that is generated at the time of authentication. When receiving, from an in-group device, a content that is encrypted using a secrete key that is generated at the time of authentication, communication unit 1109 decrypts the encrypted content by using the secret key and then outputs the decrypted content to control unit 1104.

(10) Display Unit 1110

Display Unit 1110 is specifically a display device, and displays a content outputted from playback control unit 1105.

2. Playback Apparatus 1200

FIG. 25 is a block diagram showing a structure of playback apparatus 1200. As shown in FIG. 25, playback apparatus 1200 is structured from an operation input unit 1201, a control unit 1202, a playback control unit 1203, a recordation control unit 1204, a communication unit 1205, a display unit 1206, and a storage unit 1207.

Playback apparatus 1200 is specifically a computer system structured from a CPU, a ROM, a RAM, a hard disk unit, a network interface, and the like. Playback apparatus 1200 carries out its functions by the CPU executing a computer program. In this description, playback apparatus 1200 is assumed to be a hard disk recorder. Yet, it is naturally appreciated that playback apparatus 1200 according to the present invention is not limited to a hard disk recorder, and may be a DVD recorder or a personal computer.

(1) Operation Input Unit 1201

Operation input unit 1201 is provided with a remote controller and an infrared photoreceiver. At a push of one of the buttons on the remote controller by a user, operation input unit 1201 generates an input signal corresponding to the pushed button, and outputs the generated input signal to control unit 1202.

(2) Control Unit 1202

Control unit 1202 is structured from a CPU, a ROM, a RAM, and the like, and performs overall control of playback apparatus 1200 by the CPU executing a computer program. When receiving an input signal from operation input unit 1201, control unit 1202 performs various types of processing, such as recordation processing, playback processing, duplication request processing, and duplication processing, according to the received input signal.

Figure 26:
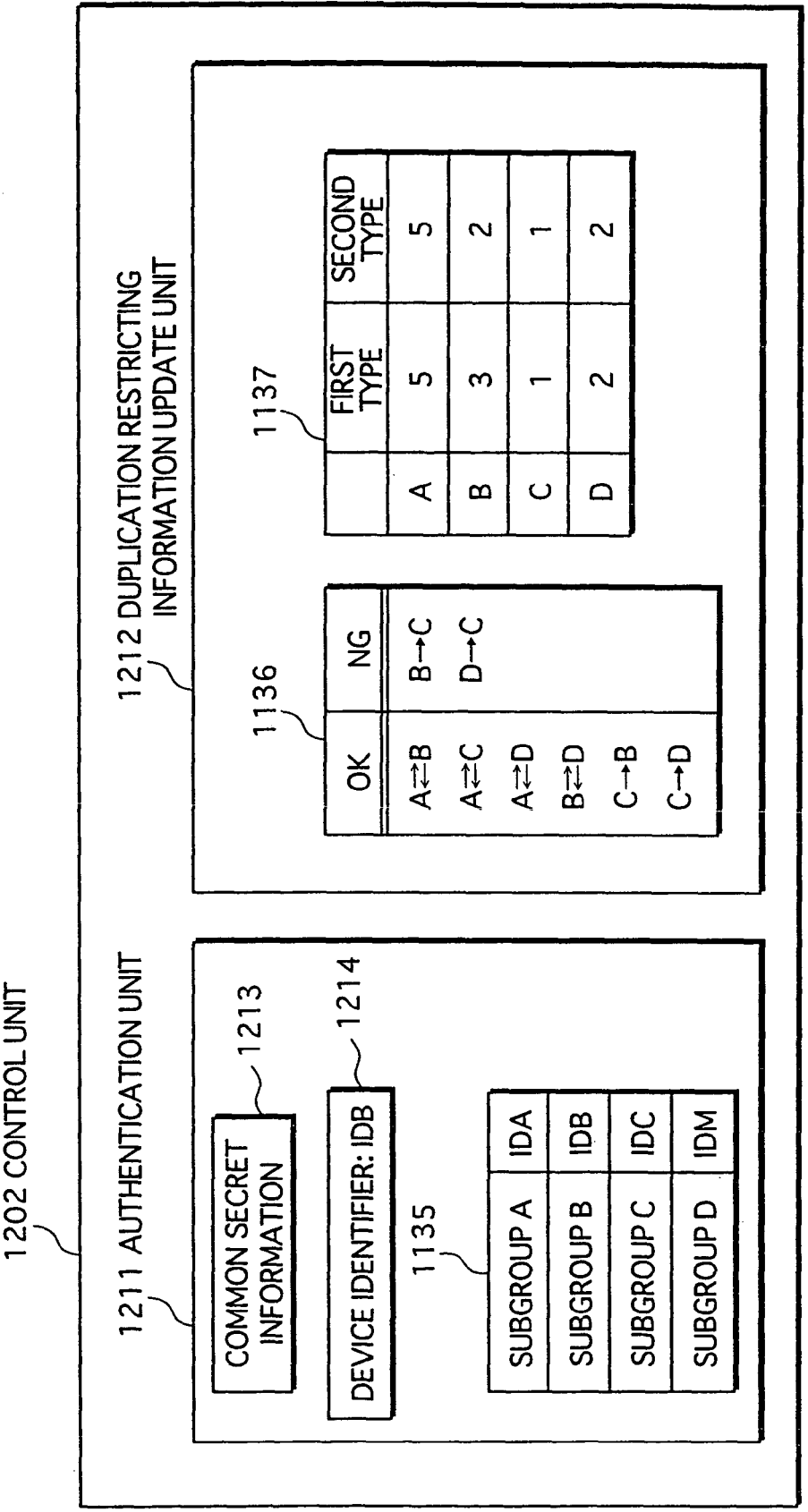
FIG. 26 is a view showing functional blocks of a control unit 1202.

As shown in FIG. 26, control unit 1202 is structured from an authentication unit 1211 and a duplication restricting information update unit 1212 (hereinafter, simply referred to as update unit 1212). Authentication unit 1211 stores therein common secret information 1213, a device identifier 1214, and table 1135. Update unit 1212 stores therein tables 1136 and 1137.

Common secret information 1213 is information commonly stored in advance in all the in-group devices, and is used to perform mutual authentication with another in-group device.

Device identifier 1214 is a series of symbols that uniquely identify playback apparatus 1200. As shown in FIG. 26, the device identifier 1214 of playback apparatus 1200 is "IDB".

Tables 1135, 1136, and 1137 are similar to the corresponding ones stored in control unit 1104 of home server 1100, and are thus denoted by the similar reference numerals and the description thereof is omitted.

When performing the recordation processing, control unit 1202 receives a content from communication unit 1205, and outputs the received content to recordation control unit 1204.

When performing the playback processing, control unit 1202 outputs an instruction to playback control unit 1203, so that playback control unit 1203 reads a content from storage unit 1207 and decodes the read content.

When performing the duplication request processing, control unit 1202 receives, from operation input unit 1201, a user input, such as a content identifier, a device identifier of a request destination device, and a requested number of duplications. Control unit 1202 transmits a duplication request to the request destination device via communication unit 1205. The duplication request is composed of the content identifier, the device identifier of the request destination device, and the requested number of duplications, and additionally of common secret information 1213 and device identifier 1214 both are stored in control unit 1202.

When performing duplication processing, authentication unit 1211 receives a duplication request from a request source device via communication unit 1205. The duplication request is composed of a content identifier, a device identifier, common secret information, and a requested number of duplications. Authentication unit 1211 then performs challenge/response type handshaking based on zero-knowledge proof by using the received common secret information in order to judge whether or not the request source device is an in-group device.

When it is judged through the authentication that the request source device is an out-group device, authentication unit 1211 transmits, to the request source device via communication unit 1205, an error message informing that the duplication request has been rejected.

On the other hand, when it is judged through the authentication that the request source device is an in-group device, authentication unit 1211 updates duplication restricting information in the following manner.

The description hereinafter is given on the supposition that playback apparatus 1200 has received content information 1125 shown in FIG. 23A from home server 1100 and stores the received content 1125 in storage unit 1207.

In a first example, authentication unit 1211 has received a duplication request composed of the content identifier "A-0001", the device identifier "IDC", common secret information 1313, and the requested number of duplications "2 (first type: 1, and second type: 1)".

With reference to the received device identifier "IDC", authentication unit 1211 judges that the request source device is a "first type" device.

Authentication unit 1211 identifies, with reference to table 1135, its own subgroup and the subgroup to which the request source device belongs. In this example, authentication unit 1211 storing the device identifier "IDB" is judged to be included in a member device of the "subgroup B", and the request source device of which device identifier is "IDC" is judged to be a member of the "subgroup C". Accordingly, authentication unit 1211 passes, the request destination subgroup identifier "subgroup B", the request source subgroup identifier "subgroup C", and the requested number of duplications "2 (first type: 1, and second type: 1)" to update unit 1212.

Update unit 1212 receives, from authentication unit 1211, the request destination subgroup identifier "subgroup B", the request source subgroup identifier "subgroup C", and the requested number of duplications "2 (first type: 1, and second type: 1)". Update unit 1212 then judges, with reference to table 1136, whether or not content duplication from a device in the "subgroup B" to a device in the "subgroup C" is permitted. Since table 1136 shows "B→C" in the NG column, update unit 1212 accordingly judges that such duplication is prohibited. In this case, update unit 1212 outputs to the request source device an error message informing that the duplication request has been rejected.

In a second example, authentication unit 1211 has received a duplication request composed of the content identifier "A-0001", the device identifier "IDM", common secret information 1411, and the requested number of duplications "3 (first type: 2, and second type: 1)".

With reference to the received device identifier "IDM", authentication unit 1211 judges that the request source device is a "second type" device.

Authentication unit 1211 identifies, with reference to table 1135, its own subgroup and the subgroup to which the request source device belongs. In this example, authentication unit 1211 storing the device identifier "IDB" is judged to be included in a member device of the "subgroup B", and the request source device of which device identifier is "IDM" is judged to be a member of the "subgroup D". Accordingly, authentication unit 1211 passes, the request destination subgroup identifier "subgroup B", the request source subgroup identifier "subgroup D", and the requested number of duplications "3 (first type: 2, and second type: 1)" to update unit 1212.

Update unit 1212 receives, from authentication unit 1211, the request destination subgroup identifier "subgroup B", the request source subgroup identifier "subgroup D", and the requested number of duplications "3 (first type: 2, and second type: 1)". Update unit 1212 then judges, with reference to table 1136, whether or not content duplication from a device in the "subgroup B" to a device in the "subgroup D" is permitted. Since table 1136 shows "B→D" in the OK column, update unit 1212 judges that such duplication is permitted.

Update unit 1212 then judges, with reference to table 1137, whether the requested number of duplications "3 (first type: 2, and second type: 1)" falls within the maximum permissible number of duplications that are determined for the request source device. Since table 1137 shows that the maximum permissible number of duplications determined for a device in the subgroup B is "first type: 3, and second type: 2", update unit 1212 judges that the requested number of duplications falls within the maximum permissible number.

Update unit 1212 then identifies, via recordation control unit 1204, a requested content by the content identifier "A-0001" from among contents stored in storage unit 1207, and reads the duplication restricting information 1124 included in the identified content information 1125.

Update unit 1212 compares the permitted number of duplications shown by the read duplication restricting information 1124 with the requested number of duplications to see which is greater. Here, the permitted number of duplications shown by duplication restricting information 1124 is "3 (first type: 2, and second type: 1)", so it is judged that the requested number of duplications "3 (first type: 2, and second type: 1)" is not greater than the permitted number.

Figure 27:
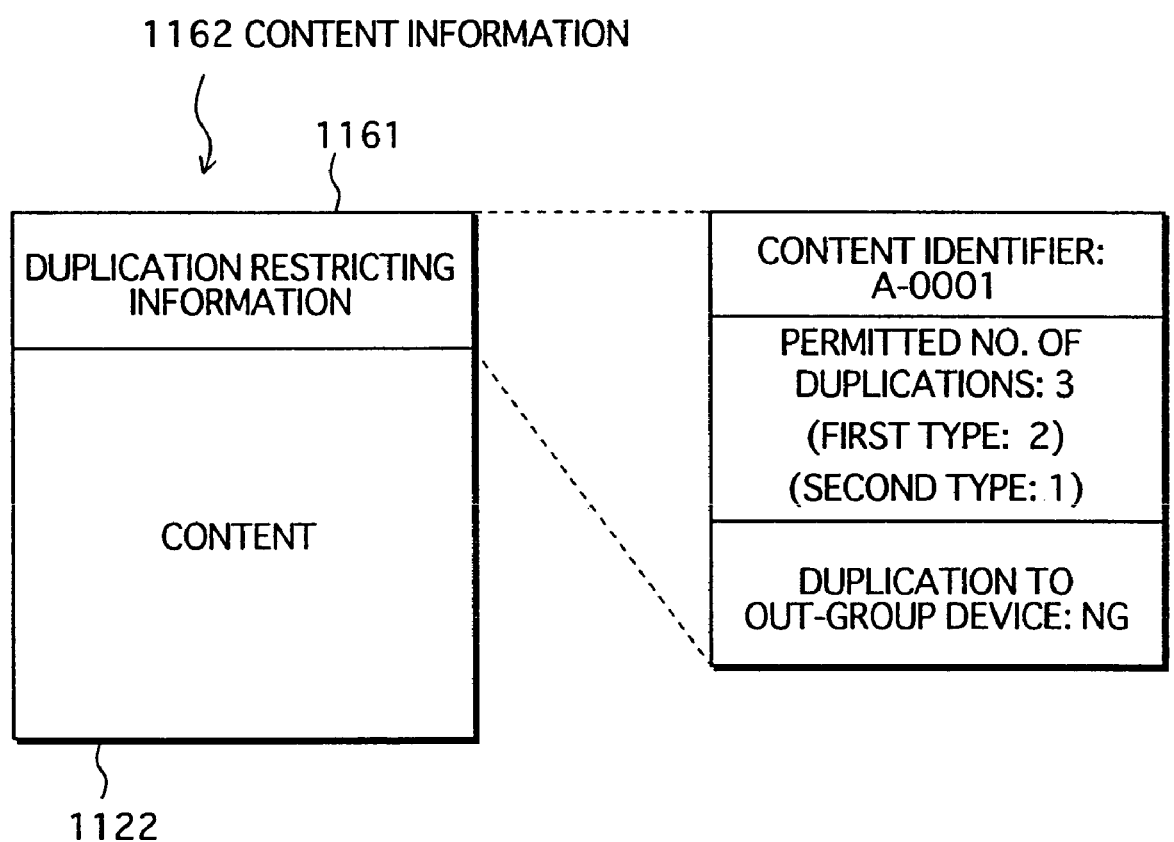
FIG. 27 is a view showing a data structure of content information 1162.

When judging that the requested number of duplications is within the permitted number, update unit 1212 generates duplication restricting information 1161 to be transmitted to the request source device together with content 1122. As shown in FIG. 27, duplication restricting information 1161 is composed of the content identifier "A-0001", the permitted number of duplications "3 (first type: 2, and second type: 1)", and the flag set to "NG", which indicates that content duplication to an out-group content is prohibited.

Update unit 1212 transmits content information 1162, which is composed of the generated duplication restricting information 1161 and content 1122, to the request source device via communication unit 1205.

Upon receiving, from the request source device via communication unit 1205, information notifying that content information 1162 has been fully received, update unit 1212 updates the duplication restricting information by subtracting, from the permitted number of duplication shown by duplication restricting information 1124, the permitted number of duplications "3 (first type: 2, and second type: 1)" that has been transferred, as the duplication restricting information 1161, to the request source device. In this case, the duplication restricting information 1124 generated with the subtraction result shows the permitted number of duplication "0(first type: 0, and second type: 0)". When the permitted number of duplications becomes "0", update unit 1212 erases, via recordation control unit 1204, content information 1125 stored in storage unit 1207.

(3) Playback Control Unit 1203

Under instructions from control unit 1202, playback control unit 1203 reads a content from storage unit 1207, decodes the read content, and outputs the decoded content to display unit 1206.

(4) Recordation Control Unit 1204

Recordation control unit 1204 reads information from and writes information to storage unit 1207 under instructions from control unit 1207.

To be more specific, recordation control unit 1204 receives instructions from update unit 1212 of control unit 1202. According to the instructions, recordation control unit 1204 accesses storage unit 1207 to read duplication restricting information that is included in a content, and outputs the read duplication restricting information to update unit 1212. Further, recordation control unit 1204 receives duplication restricting information from update unit 1212, and attaches the received duplication restricting information to a corresponding piece of content information stored in storage unit 1207.

(5) Communication Unit 1205

Communication unit 1205 is separately connected to each in-group device via the Ethernet, and performs transmission of duplication requests and requested contents between control unit 1202 and an in-group device.

When transmitting a content to an in-group device, communication unit 1205 encrypts the content with a secret key that is generated at the time of authentication. When receiving from, an in-group device, a content that is encrypted by using a secrete key that is generated at the time of authentication, communication unit 1205 decrypts the encrypted content by using the secret key and then outputs the decrypted content to control unit 1202.

(6) Display Unit 1206

Display Unit 1206 is specifically a display device, and displays a content outputted from playback control unit 1203.

(7) Storage Unit 1207

Storage unit 1207 is specifically a hard disk drive unit, and stores contents that are written by recordation control unit 1204.

3. Playback Apparatus 1300

Figure 28:
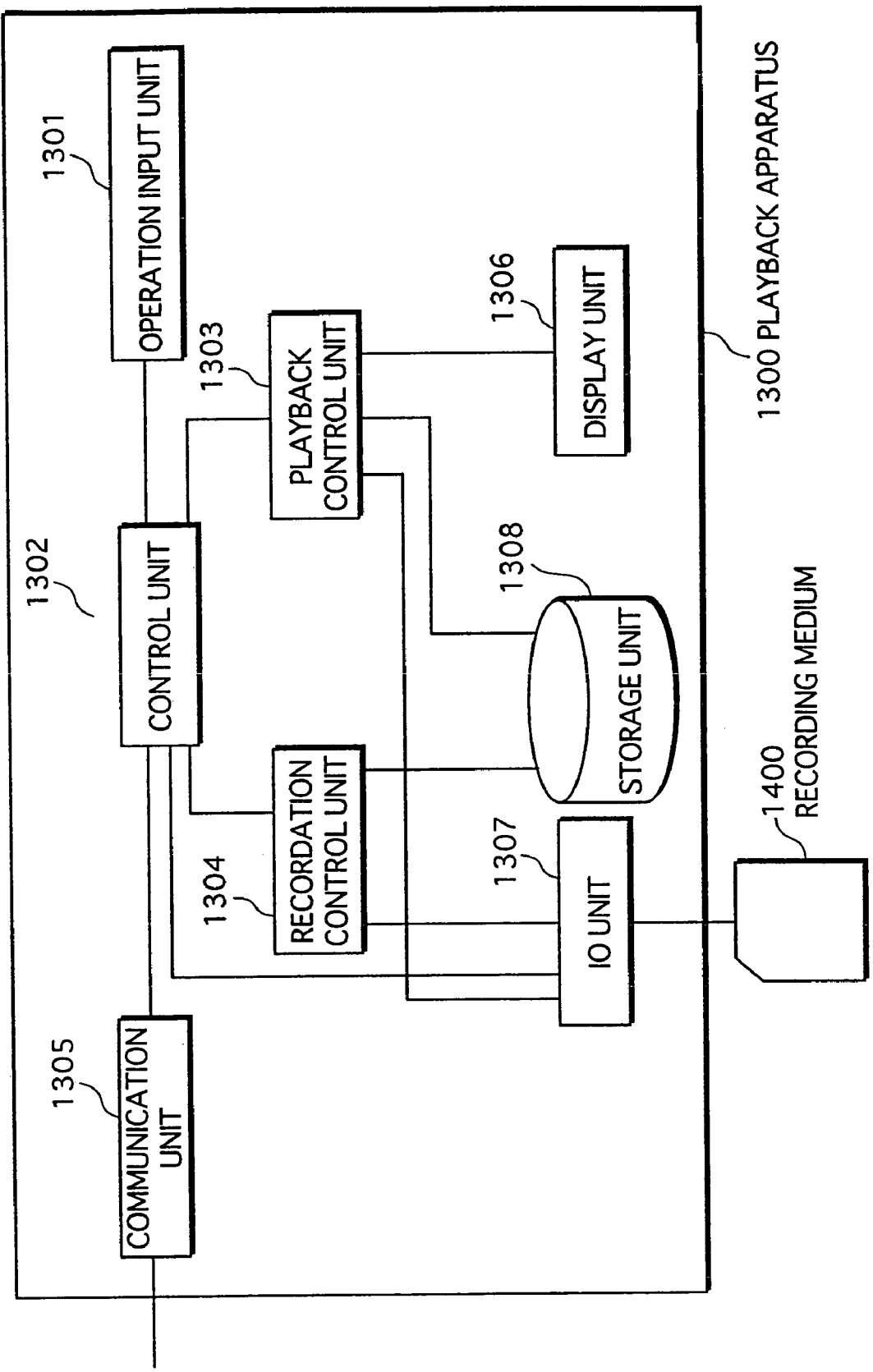
FIG. 28 is a block diagram showing a structure of a playback apparatus 1300.

FIG. 28 is a block diagram showing a structure of playback apparatus 1300. As shown in FIG. 28, playback apparatus 1300 is structured from an operation input unit 1301, a control unit 1302, a playback control unit 1303, a recordation control unit 1304, a communication unit 1305, a display unit 1306, an IO unit 1307, and a storage unit 1308.

Playback apparatus 1300 is specifically a computer system structured from a CPU, a ROM, a RAM, a hard disk unit, a network interface, a memory card slot, and the like. Playback apparatus 1300 carries out its functions by the CPU executing a computer program. In this description, playback apparatus 1300 is assumed to be a memory card recorder with a built-in HDD. Playback apparatus 1300 records a content to the hard disk, and plays the content recorded on the hard disk. In addition, with a portable recording medium, such as a memory card, being inserted into the memory card slot, playback apparatus 1300 records a content to the recording medium, and plays a content recorded on the recording medium. That is to say, playback apparatus 1300 acts as a first type device when recording a content to the built-in hard disk, and as a second type device when recording a content to a portable recording medium, such as a memory card.

Note that playback apparatus 1300 according to the present invention is not limited to a memory card recorder with a built-in HDD, and may be a DVD recorder or a personal computer as long as it is capable of inputting a content to, or outputting a content from a portable recording medium.

(1) Operation Input Unit 1301

Operation input unit 1301 is provided with a remote controller and an infrared photoreceiver. At a push of one of the buttons on the remote controller by a user, operation input unit 1301 generates an input signal corresponding to the pushed button, and outputs the generated input signal to control unit 1302.

(2) Control Unit 1302

Control unit 1302 is structured from a CPU, a ROM, a RAM, and the like, and performs overall control of playback apparatus 1300 by the CPU executing a computer program. When receiving an input signal from input operation input unit 1301, control unit 1302 performs various types of processing according to the received signal. The various types of processing include recordation processing, playback processing, duplication request processing, duplication processing, and processing to duplicate a content to recording medium 1400.

Figure 29:
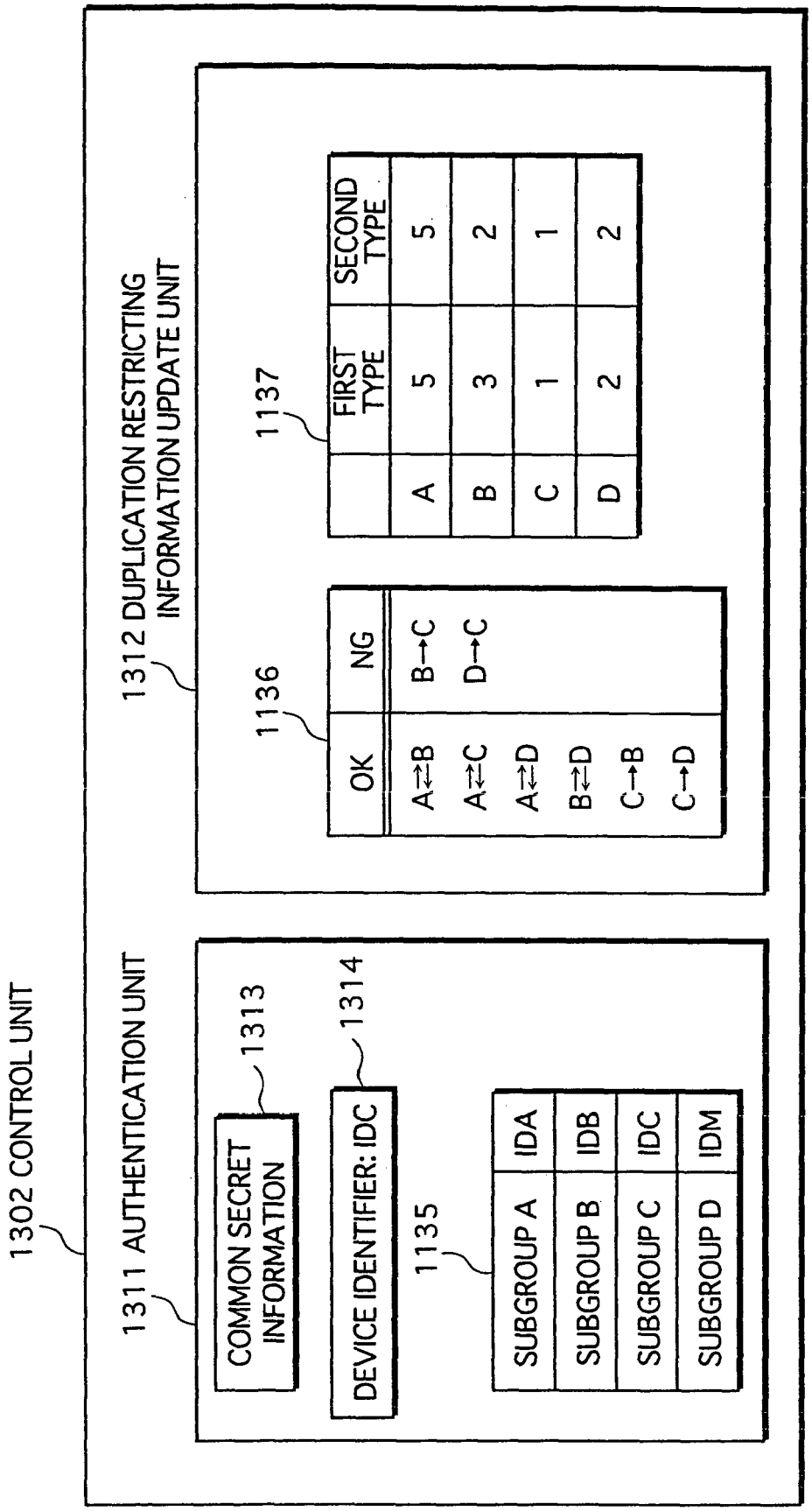
FIG. 29 is a view showing functional blocks of a control unit 1302.

As shown in FIG. 29, control unit 1302 is structured from an authentication unit 1311 and a duplication restricting information update unit 1312 (hereinafter, simply referred to as update unit 1312). Authentication unit 1311 stores therein common secret information 1313, a device identifier 1314, and a table 1135. Update unit 1312 stores therein tables 1136 and 1137.

Common secret information 1313 is information commonly stored in advance in all the in-group devices, and is used to perform mutual authentication with another in-group device.

Device identifier 1314 is a series of symbols that uniquely identify playback apparatus 1300. As shown in FIG. 29, the device identifier 1214 of playback apparatus 1300 is "IDC".

Tables 1135, 1136, and 1137 are similar to the corresponding ones stored in control unit 1104 that is included in home server 1100, and are thus denoted by the similar reference numerals and the description thereof is omitted.

When performing the recordation processing, control unit 1302 receives a content from communication unit 1305, and outputs the received content to recordation control unit 1204 or to IO unit 1307.

When performing the playback processing, control unit 1302 outputs an instruction to playback control unit 1303, so that playback control unit 1303 reads a content from recording medium 1400 via IO unit 1307 or from storage unit 1308, and decodes the read content.

When performing the duplication request processing, control unit 1302 transmits a duplication request to a request destination device via communication unit 1305. The duplication request is composed of common secret information 1313 and device identifier 1314, both of which are stored in control unit 1302, in addition to a content identifier, a device identifier of the request source device, and a requested number of duplications, each of which are received from operation input unit 1301.

For example, through the duplication request processing, control unit 1302 receives content information 1150 shown in FIG. 24A from home server 1100, via communication unit 1305. Content information 1150 is composed of duplication restricting information 1151 and content 1122. Duplication restricting information 1151 is composed of the content identifier "A-0001", the permitted number of duplications "2

(first type: 1, and second type: 1)", and the flag set to "NG", which indicates that content duplication to an out-group device is prohibited.

When performing duplication processing, authentication unit 1311 receives a duplication request from a request source device via communication unit 1305. The duplication request is composed of the content identifier, the device identifier, the common secret information, and the requested number of duplications. Authentication unit 1311 then performs challenge/response type handshaking based on zero-knowledge proof by using the received common secret information in order to judge whether or not the request source device is a device connected to the home network, i.e., an in-group device.

When it is judged through the authentication that the request source device is an out-group device, authentication unit 1311 transmits, to the request source device via communication unit 1305, an error message informing that the duplication request has been rejected.

On the other hand, when it is judged through the authentication that the request source device is an in-group device, authentication unit 1311 and update unit 1312 generate duplication restricting information with reference to tables 1135, 1136, and 1137 in a similar manner to home server 1100 and playback apparatus 1200. Authentication unit then transmits, to the request source device via communication unit 1305, content information that is composed of the generated duplication restricting information and the content.

Further, update unit 1312 updates duplication restricting information corresponding to the transmitted content stored in storage unit 1308. In the case where the updated duplication restricting information shows the permitted number of duplications "0", update unit 1312 erases the content.

Next, a description is given of operations performed by control unit 1302 in the case where recording medium 1400 is mounted to IO unit 1307.

Duplication Request Processing

The duplication request processing is performed when control unit 1302 receives, from operation input unit 1301, an instruction to duplicate a content to recording medium 1400. In response to the instruction, control unit 1302 reads both common secret information 1411 and device identifier 1412 from recording medium 1400 via IO unit 1307, and transmits a duplication request information to the request destination device via communication unit 1305. The duplication request is composed of the common secret information 1411 and device identifier 1412, both of which are read from the recording medium 1400, and the content identifier, the device identifier of the request destination device, and the requested number of duplications, each of which is received from operation input unit 1301.

In response to the request issued through the duplication request processing, playback apparatus 1200, for example, transmits content information 1162 shown in FIG. 27. As a result, control unit 1302 receives the transmitted content information 1162 via communication unit 1305, and outputs the received content information 1162 to recording medium 1400 via IO unit 1307.

Duplication Processing

Next, a description is given of the operations performed by control unit 1302 when receiving a duplication request for a content recorded on recording medium 1400.

Here, a description is given of an example in which authentication unit 1311 has received a duplication request that is composed of the content identifier "A-0001", the device identifier "IDA", common secret information 1133, and the requested number of duplications "2 (first type: 1, and second type: 1)".

Note that the duplication request received herein includes information showing that the request source device (home server 1100) already stores the content identified by the content identifier "A-0001", and the duplication restricting information attached to the content shows the permitted number of duplications "5 (first type: 2, and second type: 3)".

Authentication unit 1311 outputs the received common secret information 1133 to recording medium 1400 via IO unit 1307.

When receiving, from IO unit 1307, information indicating that authentication of the request source device has failed and thus the request source device has been identified as an out-group device, authentication unit 1311 transmits, to the request source device, an error message so as to inform that the duplication request has been rejected. On the other hand, when receiving from IO unit 1307 that the request source device has been successfully authenticated, and thus identified as an in-group device, authentication unit 1311 judges, with reference to table 1135, to which subgroup each of recording mediums 1400 and request source device belongs. In this example, the recording medium 1400 having the device identifier "IDM" is judged to be a member of the "subgroup D", and the request source device having the device identifier "IDA" is judged to be a member of the "subgroup A".

Note that authentication unit 1311 is structured so as to receive, when recording medium 1400 is mounted to IO unit 1307, the device identifier "IDM" from recording medium 1400.

Authentication unit 1311 then passes the request destination subgroup identifier "subgroup D", the request source subgroup identifier "subgroup A", and the requested number of duplications "2 (first type: 1, and second type: 1)" to update unit 1312.

Update unit 1312 receives the request destination subgroup identifier "subgroup D", the request source subgroup identifier "subgroup A", and the requested number of duplications "2 (first type: 1, and second type: 1)" from authentication unit 1311. Update unit 1312 then judges, with reference to table 1136, whether or not content duplication from a device in the "subgroup D" to a device in the "subgroup A" is permitted. Since table 1136 shows "D→A" in the OK column, update unit 1312 judges that such duplication is permitted.

Update unit 1132 then judges, with reference to table 1137, whether the sum of the requested number of duplications "2 (first type: 1, and second type: 1)" and the permitted number of duplications that is already held by the request source device (home server 1100) falls within the maximum permissible number of duplications determined for the request source device. Since table 1137 shows the maximum permissible number of duplications determined for devices in the subgroup A is "first type: 5, and second type: 5", update unit 1312 judges that the sum of the requested number of duplications and the already held permitted number of duplications falls within the maximum permissible number.

Update unit 1312 then identifies, by the content identifier "A-0001", content information including the requested content from among contents stored in recording medium 1400, and then reads, via IO unit 1307, duplication restricting information 1161 included in the identified content information 1162 (shown in FIG. 27).

Update unit 1312 compares the permitted number of duplications shown by duplication restricting information 1161 with the requested number of duplications to see which is greater. Here, the permitted number of duplications is "3: (first type: 2, and second type: 1)", so that it is judged that the requested number of duplications "2 (first type: 1, and second type: 1)" is not greater than the permitted number.

When judging that the requested number of duplications is within the permitted number, update unit 1312 outputs an instruction to home server 1100 via communication unit 1305. The instruction is to have home server 1100 add the requested number of duplications "2 (first type: 1, and second type: 1)" to the permitted number of duplications stored in home server 1100, correspondingly to the content identifier "A-0001".

Figure 30A:
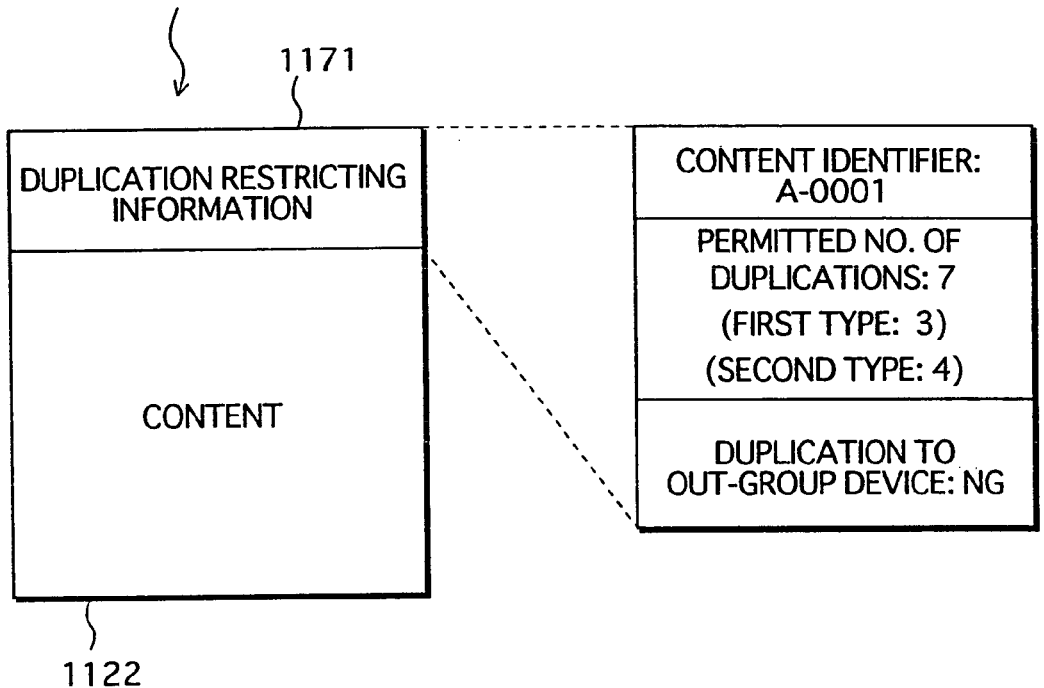
FIGS. 30A and 30B are views showing data structures of content information 1172 and 1182, respectively.

In response, home server 1100 updates the stored duplication restricting information 1152 included in content information 1153 (shown in FIG. 24B) by adding the requested number of duplications "2 (first type: 1, and second type: 1)" to the currently held permitted number of duplications. FIG. 30A shows the updated content information 1172 that includes duplication restricting information 1171.

Figure 30B:
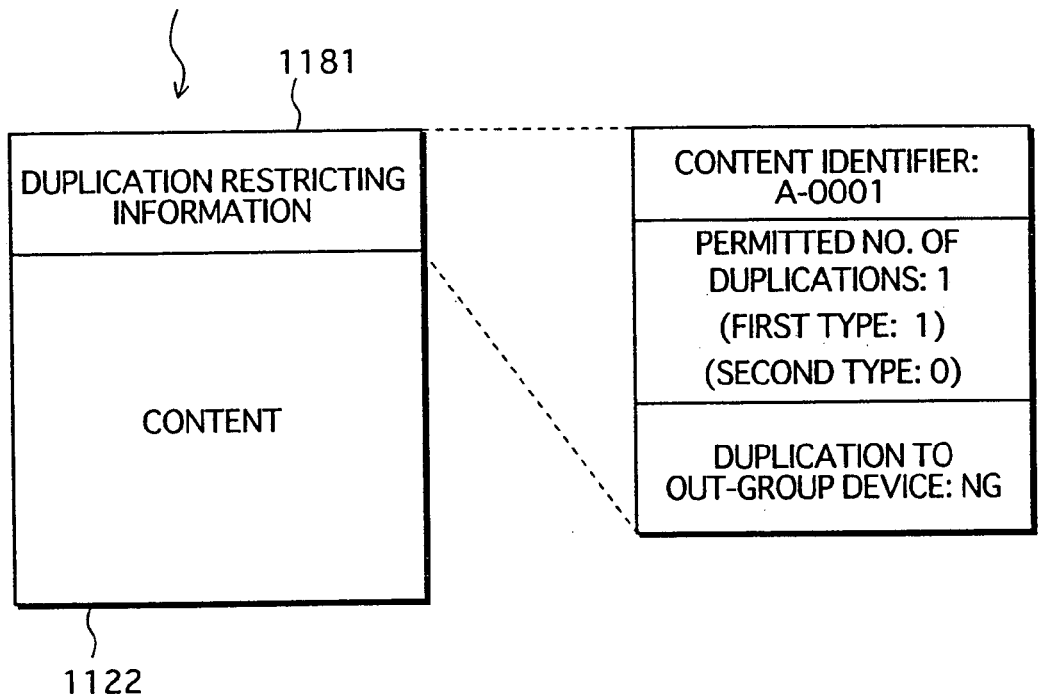

Next, update unit 1312 receives, from home server 1100 via communication unit 1305, information notifying that duplication restricting information has been updated. In response, update unit 1312 updates the duplication restricting information stored in recording medium 1400 by subtracting the requested and thus transferred permitted number of duplications "2 (first type: 1, and second 1)" from the permitted number of duplications shown by duplication restricting information in content information 1161. FIG. 30B shows the updated duplication restricting information 1181.

In the case where the permitted number of duplications after the subtraction becomes "0", update unit 1312 erases the content recorded on recording medium 1400.

(3) Playback Control Unit 1303

Under instructions from control unit 1302, playback control unit 1303 reads a content from storage unit 1308, and decodes the read content to output to display unit 1306.

(4) Recordation Control Unit 1304

Under instructions from control unit 1302, recordation control unit 1304 reads information from and writes information to storage unit 1308. Further, also under instruction from control unit 1302, recordation control unit 1304 reads information from and writes information to recording medium 1400 via IO unit 1307.

To be more specific, recordation control unit 1304 receives instructions from update unit 1312 of control unit 1302. According to the instructions, recordation control unit 1304 accesses storage unit 1308 to read duplication restricting information that is attached to a content, and outputs the read duplication restricting information to update unit 1312. Further, recordation control unit 1304 receives duplication restricting information from update unit 1312, and attaches the received duplication restricting information to a corresponding content stored in storage unit 1308.

(5) Communication Unit 1305

Communication unit 1305 is connected to each in-group device via the Ethernet, and performs transmission of duplication requests and requested contents between control unit 1302 and an in-group device.

When transmitting a content to an in-group device, communication unit 1305 encrypts the content with a secret key that is generated at the time of authentication. When receiving, from an in-group device, a content that is encrypted by using a secrete key that is generated at the time of authentication, communication unit 1305 decrypts the encrypted content by using the secret key and then outputs the decrypted content to control unit 1302.

(6) Display Unit 1306

Display Unit 1306 is specifically a display device, and displays a content outputted from playback control unit 1303.

(7) IO Unit 1307

IO unit 1307 is, for example, a memory card slot to which recording medium 1400, exemplified by a portable recording medium such as a memory card, is mountable. When recording medium 1400 is mounted thereto, IO unit 1307 writes information received from control unit 1302 to recording medium 1400 via recordation control unit 1304. Further, IO unit 1307 reads information from recording medium 1400, and outputs the read information to control unit 1302, playback control unit 1303, or to recordation control unit 1304.

(8) Storage Unit 1308

Storage unit 1308 is specifically a hard disk drive unit, and stores contents that are written by recordation control unit 1304.

4. Recording Medium 1400

Figure 31:
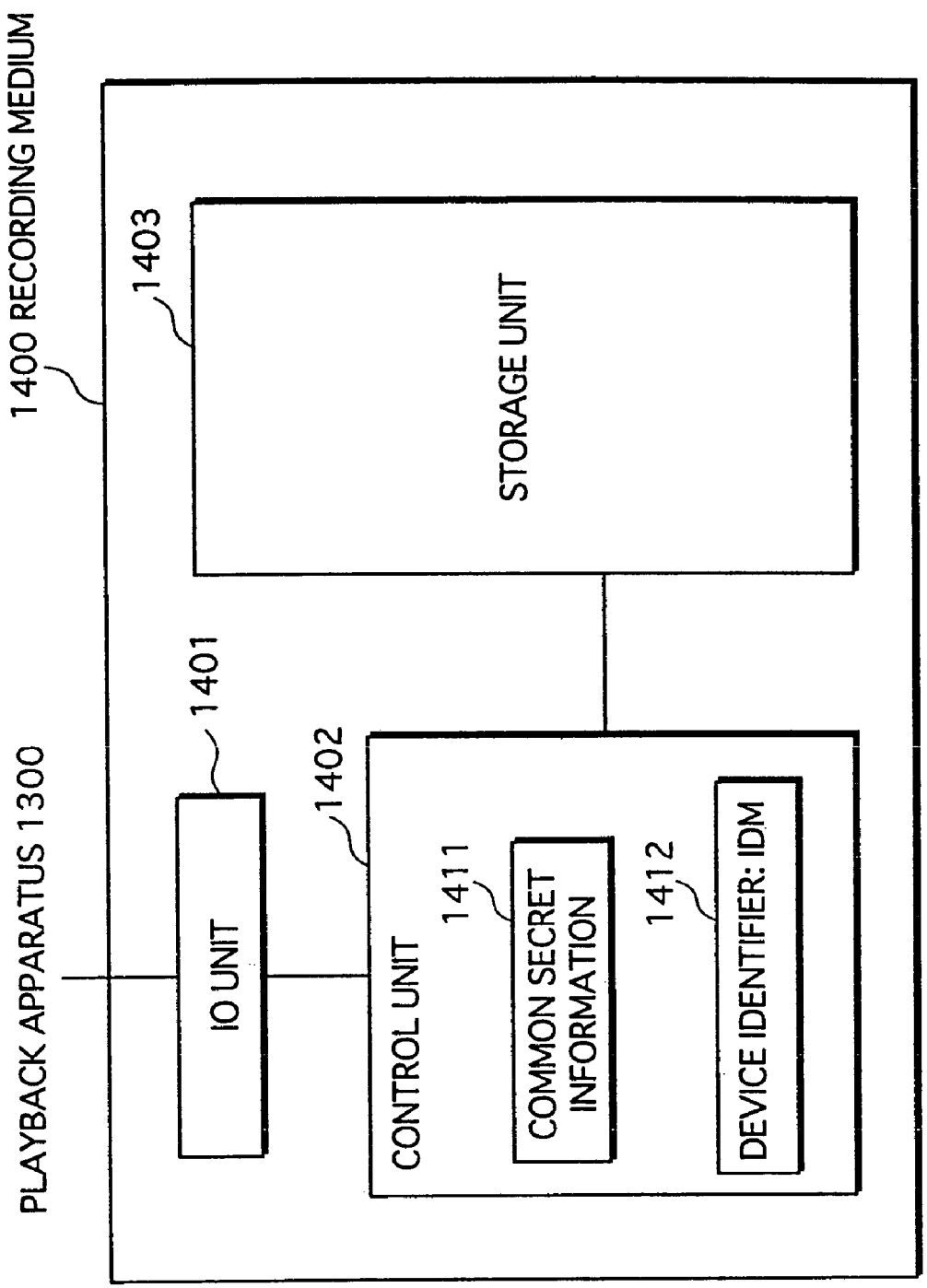
FIG. 31 is a block diagram showing a structure of a recording medium 1400.

As shown in FIG. 31, recording medium 1400 is structured from an IO unit 1401, a control unit 1402, and a storage unit 1403.

Recording medium 1400 is a portable recording medium provided with an IC chip, and is thus capable of performing authentication. In this example, the recording medium 1400 is assumed to be a memory card.

When mounted onto IO unit 1307 of playback apparatus 1300, recording medium 1400 receives a content stored in storage unit 1308 of recording apparatus 1300, and stores the received content to storage unit 1403. In addition, when mounted onto IO unit 1307 of playback apparatus 1300, recording medium 1400 is connected to the home network, which allows the recording medium 1400 to receive a content from an in-group device connected to the home network, and store the received content to storage unit 1403. Further, recording medium 1400 is allowed to transmit a content stored in the storage unit 1403 to an in-group device via the home network.

(1) IO Unit 1401

When recording medium 1400 is mounted to IO unit 1307 of playback apparatus 1300, IO unit 1401 performs input and output of data between control unit 1402 and control unit 1300 that is included in playback apparatus 1300.

(2) Control Unit 1402

As shown in FIG. 31, control unit 1402 stores therein common secret information 1411 and a device identifier 1412. Common secret information 1411 is shared in advance by all the in-group devices, and is used to perform mutual authentication with another in-group device. Device identifier 1412, which reads "IDM" in this example, is a series of symbols that uniquely identify recording medium 1400. When recording medium 1400 is mounted to playback apparatus 1300, control unit 1402 outputs the device identifier "IDM" to control unit 1302.

When playback apparatus 1300 receives a duplication request from a request source device, control unit 1402 receives, via playback apparatus 1300, common secret information that is included in the received duplication request.

Through the use of the received common secret information, control unit 1402 performs challenge/response type handshaking by using the received common secret information in order to judge whether or not the request source device is an in-group device.

Control unit 1402 transmits the judgment result to IO unit 1401 and also to control unit 1302 via IO unit 1307.

Further, control unit 1402 writes, to storage unit 1403, content information received from playback apparatus 1300 via IO unit 1401. In one example, control unit 1402 receives content information 1162 shown in FIG. 27 via playback apparatus 1300, and writes the received content information 1162 to storage unit 1403.

Still further, control unit 1402 reads, in response to a duplication request received via playback apparatus 1300 via IO unit 1401, content information from storage unit 1403, and outputs the read content information to playback apparatus 1300 via IO unit 1401.

(3) Storage Unit 1403

Storage unit 1403 is a tamper-resistant memory area that stores content information written by control unit 1403.

6. Playback Apparatus 1600

Playback apparatus 1600 is not illustrated in a figure as it is similar in structure to playback apparatus 1200 or 1300.

Playback apparatus 1600 is connected to the home network via the internet 1700. Playback apparatus 1600 is an out-group device and is not provided with the common secret information. Consequently, playback apparatus 1600 is not allowed to receive duplication of a content from an in-group device.

<Operations>

Hereinafter, a description is given, with reference to a flowchart shown in FIGS. 32–35, of operations of content duplication management system 1000 for content duplication processing.

Note that the description hereinafter is given in terms of information transmission performed between a content source device that issues a content duplication request, and a duplication destination device that receives the content duplication request. Note that any of the in-group devices constituting the content duplication management system 1000 may act as a request destination device. Similarly, any of the in-group devices constituting the content duplication management system 1000 may act as a request source device.

The duplication source device receives, through user operations, a content identifier, a device identifier of a request destination device, and a requested number of duplications (step S1000).

Next, the request source device transmits a duplication request to the request destination device via the network and the request source device receives the duplication request (step S1002). The duplication request is composed of the content identifier, the device identifier identifying the request target device, the requested number of duplications, the common secret information, and the device identifier identifying the request source device.

Upon receiving the duplication request, the request destination device authenticates the request source device by using the common secret information included in the duplication request (step S1003). When the authentication fails, thereby identifying the request source device as an out-group device (step S1004, NG), the request destination device transmits, to the request source device, an error message informing that the duplication request has been rejected (step S1400). On the other hand, when the authentication is successively performed, thereby identifying the request source device as an in-group device (step S1004, OK), the authentication unit of the request destination judges, with reference to table 1135 stored therein, to which subgroup the destination source device belongs (step S1005).

Next, the update unit judges, with reference to table 1136 stored therein, whether or not it is permitted to duplicate a content from the subgroup of the request destination device to the subgroup of the request source device (step S1006). When it is judged that such duplication is prohibited (step S1007, NO), the update unit transmits, to the request source device, an error message informing that the duplication request has been rejected (step S1008).

When receiving the error message (step S1010, YES), the request source device terminates the processing. On the other hand, when no error message is received (step S1010, NO), the request source device continues the processing.

When it is judged in the step S1006 that such duplication is permitted (step S1007, YES), the update unit judges, with reference to table 1137 stored therein, whether or not the requested number of duplications is not greater than a maximum permissible number for the subgroup of the request source device (step S1009). When it is judged that the requested number is greater than the maximum permissible number shown in table 1137 (step S1100, NO), the update unit replaces the requested number with the maximum permissible number (step S1101) and goes on to the next step.

Next, the update unit identifies, via the recordation control unit, a requested content (step S1102). Update unit then reads the permitted number of duplications from the content information that is attached to the identified content (step S1103). When the requested number of duplications is greater than the read permitted number of duplications (step S1104, NO), the update unit designates the read permitted number as the number of duplications (step S1105). On the other hand, when the read permitted number of duplications is not greater than the requested number of duplications (step S1104, YES), the update unit designates the requested number of duplications as the number of duplications. The update unit then generates duplication restricting information to be attached to the content that is to be transmitted to the request source device (step S1106).

The request source device reads the content identified in the step S1102 from the storage unit, and transmits, to the request source device, the content information that is composed of the read content along with the generated duplication restricting information attached thereto (step S1107). When the request source device completes reception of the content information, the request source device transmits information notifying completion of the reception, and the request destination device receives the information (step S1108). The request source device stores the received content information (step S1109). Upon receiving the information notifying completion of the reception, the request destination device updates the duplication restricting information in the corresponding piece of content information stored in the storage unit (step S1110).

In the case where the permitted number of duplications shown by the updated duplication restricting information is "0" (step S1200, YES), the update unit erases the content information from the storage unit (step S1201), and terminates the processing.

Note that the recording medium is not provided with an update unit for generating the duplication restricting information, although it is provided with the control unit for performing the authentication. Therefore, when the recording medium acts as the request destination device, the operations that are otherwise performed by the request destination device in the step S1006 and thereafter are performed by the control unit of the playback apparatus to which the recording medium is mounted.

<Modifications of Content Duplication Management System 1000>

Up to this point, the present invention has been described by way of the content duplication management system 1000 as an embodiment. It is naturally understood that the present invention is in no way limited to the specific embodiment described above, and various modifications such as those described below are within the scope of the present invention.

(1) Although the control unit of each device stores tables 1135, 1136, and 1137 in the above embodiment, those tables may be included in content information as meta data of a content. This modification still falls within the scope of the present invention.

In this case, home server 1100 may be structured to receive content information from broadcast station 1800, and to attach tables 1135, 1136, and 1137 to the received content information. In response to a request from a request source device, home server 1100 transmits, to the request source device, the content information that is composed of a requested content, duplication restricting information, and tables 1135, 1136, and 1137. Tables 1135, 1136, and 1137 may be stored in the home server in advance, or may be generated by a user.

(2) The subgroups within the house hold may be formed by the user. For example, the user may operate a remote controller of home server 1100 so as to classify and register home server 1100 into the "subgroup A", playback apparatus 1200 into "the subgroup B", and playback apparatus 1300 into the "subgroup C".

Further, home server 1100 may be structured to generate tables 1135, 1136, and 1137 in response to the user operations for subgroup registrations, and to transmit the generated tables as meta data of a content or separately from a content to each in-group device.

(3) In content duplication management system 1000 described in the above embodiment, the flag is always set to "NG", thereby indicating that transmission of content information to an out-group device is prohibited. It is naturally appreciated that the present invention is not limited this embodiment.

For example, content information may be transmitted to an out-group device on the condition that further duplication to another device is prohibited. This modification still falls within the scope of the present invention.

To be more specific, a description hereinafter is given, with reference to a flowchart shown in FIG. 35, of operations performed when there are both types of content information, one having a flag set to "OK" and the other having a flag set to "NG".

Figure 32:
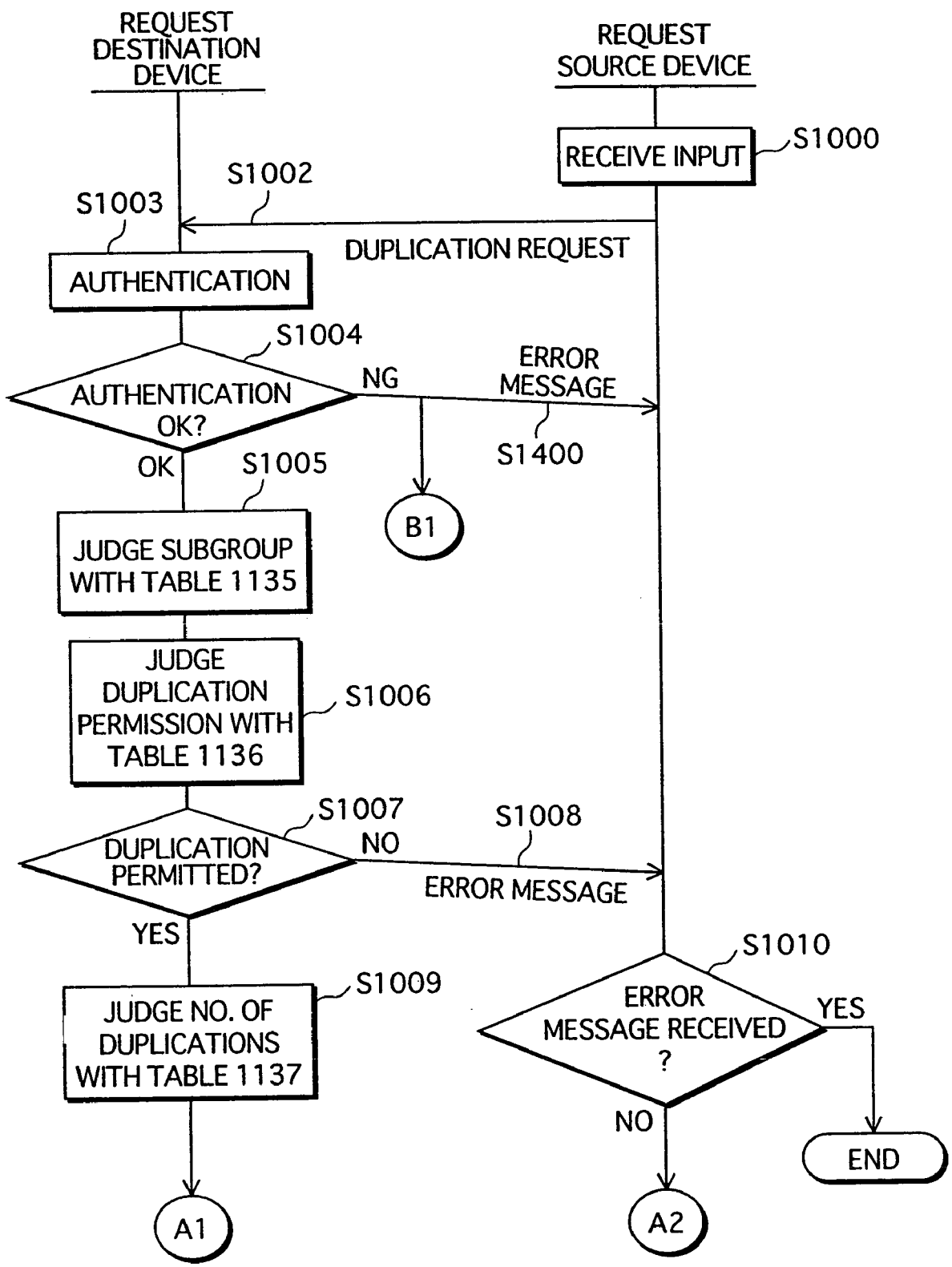
FIG. 32 is a flowchart showing operations performed by content duplication management system 1000, and to be continued onto FIGS. 33 and 35.
Figure 33:
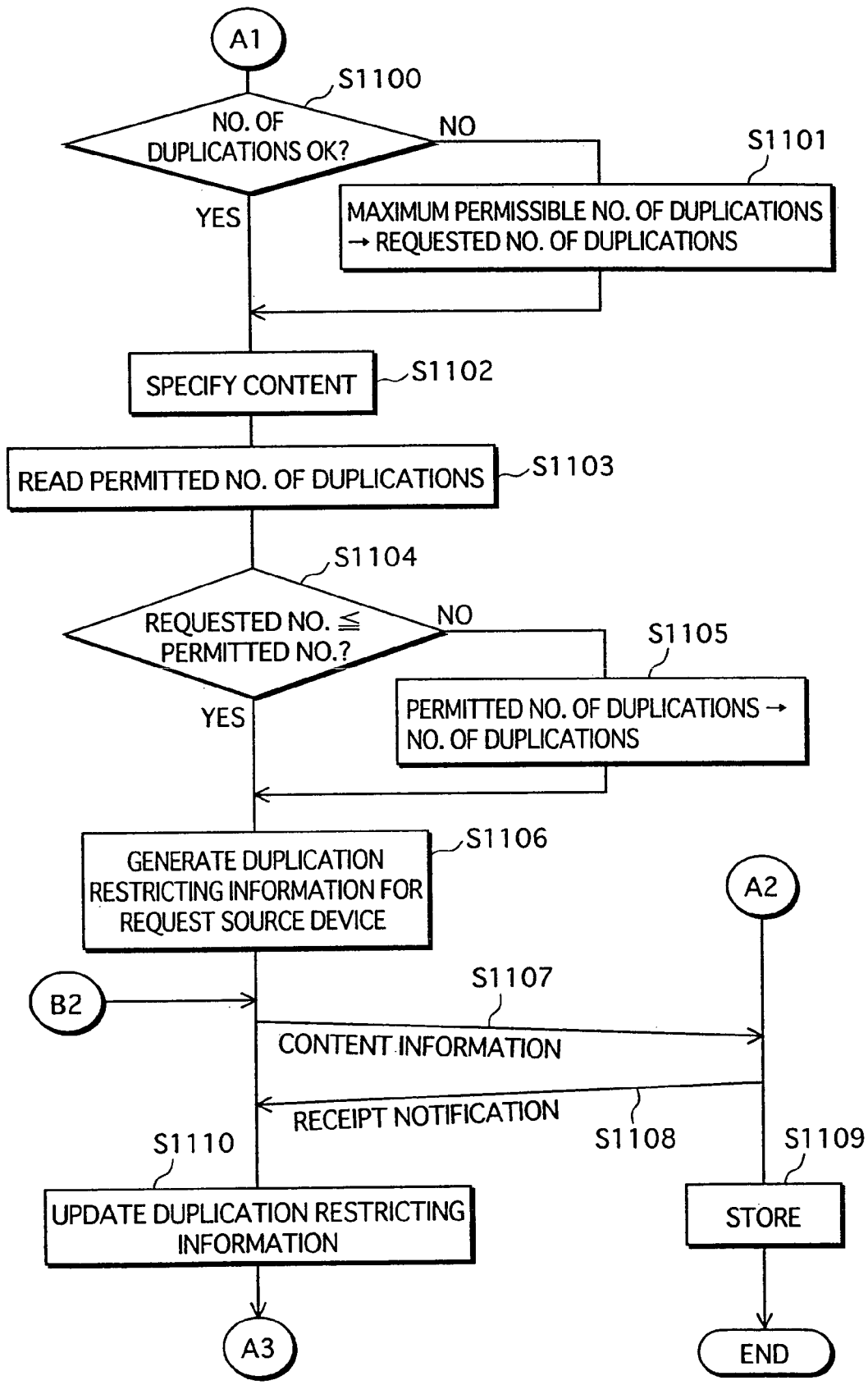
FIG. 33 is the flowchart continued from FIG. 32 and to be continued onto FIG. 34.
Figure 34:
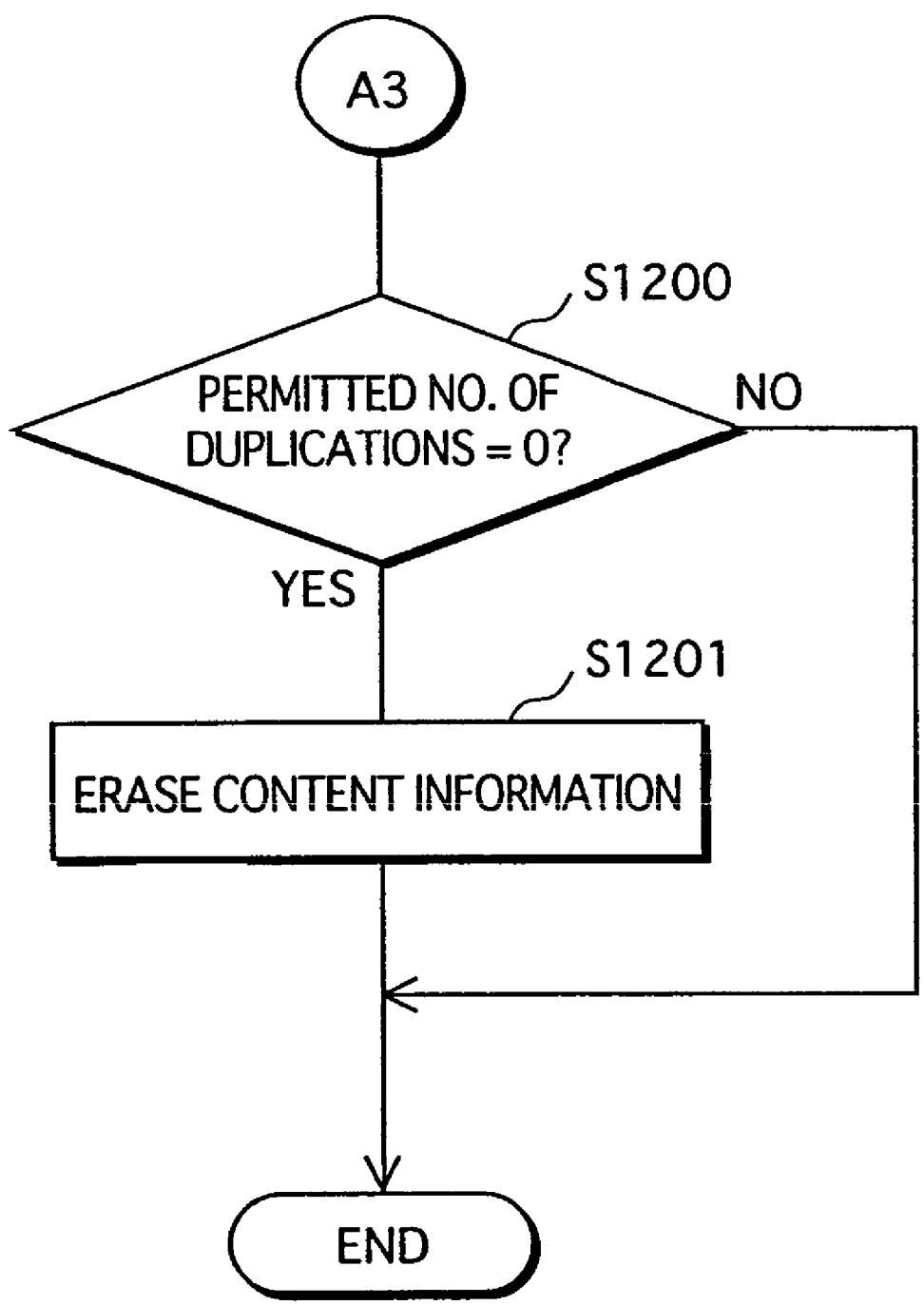
FIG. 34 is the flowchart continued from FIG. 33.
Figure 35:
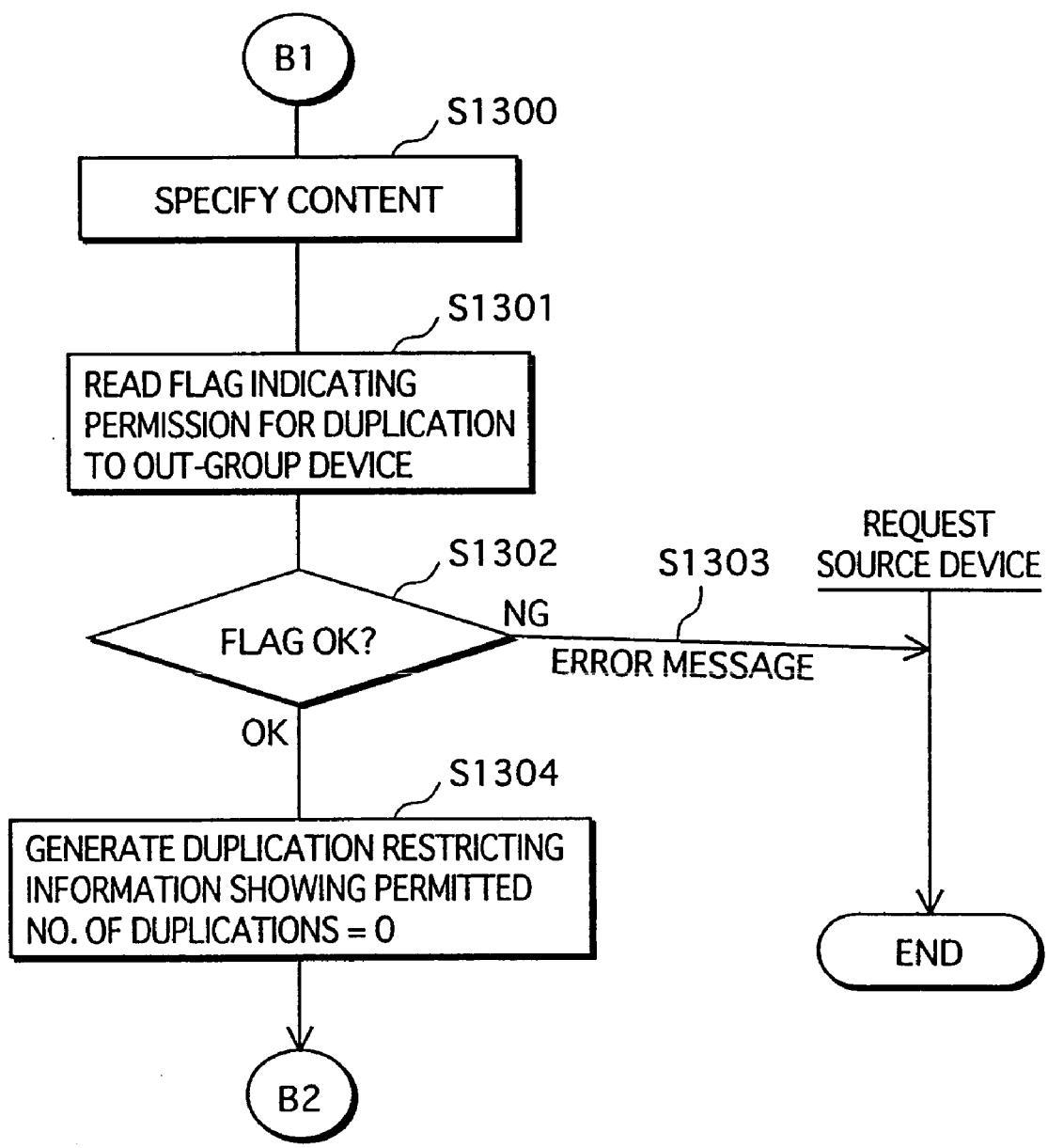
FIG. 35 is the flowchart continued from FIG. 32.

When the authentication fails in the step S1004 shown in FIG. 32, i.e. the request source device is identified as an out-group device, the request destination device goes on to step S1300 shown in FIG. 35.

The request destination device identifies a requested content (step S1300), and reads, from the duplication restricting information attached to the identified content, the flag indicating whether or not duplication of the content is permitted (step S1301). When the flag is set to "NG" (step S1302, NG), the request destination device transmits an error message to the out-group device acting as the request source device in order to inform that the duplication request has been rejected (step S1303).

On the other hand, when the flag is set to "OK" (step S1302, OK), the request destination device generates duplication restricting information showing the permitted duplication number "0 (first type: 0, and second type: 0)" (step S1304). The request destination device then performs the step S1107 shown in FIG. 33.

With the above operations, out-group devices are permitted to play a received content, while they are prohibited to duplicate the received content to another device.

(4) The scope of present invention includes such a modification to update the permitted number of duplications shown by duplication restricting information at a predetermined date-and-time.

To be more specific, the update unit of each device is provided with a clock, and duplication restricting information includes a predetermined date-and-time, a current permitted number of duplications, and a post-update permitted number of duplications. The update unit updates the duplication restricting information at the predetermined date-and-time so that the current permitted number of duplications is overwritten with the post-update permitted number of duplications.

Note that in the case where the permitted number of duplications after the update becomes "0", the update unit erases the content information from the storage unit.

Further, although the permitted number of duplications held in one of the in-group devices is updated at the predetermined date-and-time, the sum of all the permitted numbers of duplications held in each in-group device always remains constant.

Further, in the case where a recording medium acts as an in-group device, the recording medium may not be connected to a playback apparatus when the predetermined date-and-time is reached. Therefore, the recording medium is structured so as to have the playback apparatus confirm the predetermined date-and-time at the time the connection is established. Judging that the predetermined time has already passed, the playback apparatus updates the duplication restricting information by replacing the current permitted number of duplications with the post-update number of duplications.

(5) The scope of present invention includes such a modification to duplicate a content to a predetermined device at a predetermined date-and-time.

To be more specific, the update unit of each device is provided with a clock. The storage unit of the request destination device stores content information that is composed of a content and duplication restricting information. Here, the duplication restriction information includes a duplication date-and-time at which duplication is to be performed, a device identifier of the device to which the content is to be duplicated, and the requested number of duplications. When the duplication date-and-time is reached, the update unit generates duplication restricting information that shows the requested number of duplications, and transmits the requested content along with the generated duplication restricting information to the device identified by the device identifier.

(6) The scope of present invention includes such a modification that each in-group device is capable of detecting a specific content.

To be more specific, in order to detect a specific piece of content information, a request source device transmits detection information including a content identifier to each in-group device. Upon receiving the detection information, each in-group device searches its own storage unit and the storage unit of the recording medium connected thereto in order to detect the content information having a matching content identifier. When detecting the content information, the update unit that has detected the content information transmits, to the request source device, a message informing that the content information in search is detected.

In the case where more than one device has detected the content information, the request source device may receive duplication of the content information from the device that first transmits the message. In one alternative, each in-group device may be structured to transmit the permitted number of duplications along with the message, so that the request source device may receive duplication of the content information from an in-group device whose permitted number of duplications is the greatest. In another alternative, the request source device may receive duplication of the content information from an in-group device whose communications bandwidth is broadest, or whose location is closest.

Note that in the case where the requested number of duplications is not fully covered by the permitted number of duplications held by a request destination device, it is applicable to detect all the other in-group devices also having the requested content through the use of the above-described detection capability. Consequently, the request source device may receive, from a plurality of the in-group devices, duplications of the content so as to receive permitted numbers of duplications that are equal to the requested number in total.

(7) The scope of present invention includes such a modification that the content information, the common secret information, and the device identifier are stored in the tamper-resistant storage area.

(8) The scope of present invention includes such a modification that content information is encrypted in whole or in part.

(9) As shown in FIGS. 25, 26, and 29, each in-group device in the above embodiment commonly store tables 1135, 1136, and 1137. Yet, the scope of present invention includes such a modification that each in-group device includes different tables.

(10) In the above embodiment, whether or not to permit content duplication to an out-group device is set by using the flag included in the duplication restricting information attached to the content. When content duplication to an out-group device is permitted, the duplication restricting information may further include a permitted number duplications to an out-group device.

That is to say, it is permitted to duplicate the content to an out-group device as long as a requested number of duplications is not greater than the permitted number of duplications shown by the duplication restricting information.

(11) Further, when a content is duplicated to an out-group device, the duplication restricting information held in the request destination device may be updated so that the permitted number of duplications to an in-group device is altered to "0". This modification still falls within the scope of the present invention.

(12) The present invention may be embodied as a method composed of the steps described above, or a computer program for a computer to perform the method, or even as digital signals representing the computer program.

Alternatively, the present invention may be embodied as a computer-readable recording medium having the above computer program or digital signals recorded thereon. Examples of such a computer-readable recording medium include a flexible disk, a hard disk, a CD-ROM, an MO, a DVD, a DVD-ROM, a DVD-RAM, a BD (Blu-ray Disc), and a semiconductor memory. Alternatively, the present invention may be embodied as the above computer program or digital signals recorded on such a recording medium.

Further, the computer program or digital signals may be transmitted via a telecommunications circuit, wireless or cable communications circuit, or a network typified by the Internet.

Alternatively, the present invention may be embodied as a computer system composed of a microprocessor and a memory. Here, the memory stores the above computer program, and the microprocessor operates according to the stored computer program.

Further, the program or digital signals may be transported in from of a recording medium, or transmitted over a network, for example. With this arrangement, the programs or digital signals may be performed by another independent computer system.

(13) The present invention may be embodied as any combination of the above embodiments and modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A networked apparatus that belongs to a group, and that is connected via a network to at least one device in the group and to at least one device out of the group, said networked apparatus comprising:

a storage unit operable to store a content and duplication restricting information that is attached to the content, the duplication restricting information indicating a permitted number of duplications, which represents a number of times that the content is able to be duplicated to a device, wherein the permitted number of duplications is a sum of a permitted number of duplications to a first type of device and a permitted number of duplications to a second type of device;

a receiving unit operable to receive, from a device, a duplication request for the content;

a judging unit operable to judge whether the device is in the group or out of the group; and a control unit operable to duplicate the content to the device if said judging unit judges that the device is in the group, and impose restrictions on duplication of the content to the device if said judging unit judges that the device is out of the group.

2. The networked apparatus according to claim 1, wherein:

the duplication restricting information stored in said storage unit also indicates restrictions to be imposed on duplication of the content to a device that is out of the group; and said control unit is operable to control duplication of the content based on the duplication restricting information.

3. The networked apparatus according to claim 2, wherein:
- each device that is in the group is one of a first type of device that records a content to a non-portable recording medium and a second type of device that records a content to a portable recording medium; and
- said control unit is operable to judge, if the device that issued the duplication request is judged to be in the group, whether the device is the first type of device or the second type of device, and control duplication of the content based on the judgment by said control unit and the duplication restricting information.

4. The networked apparatus according to claim 2, wherein:
- each device that is in the group belongs to at least one subgroup;
- said storage unit is operable to store, in advance, a first table indicating whether duplication of the content from a subgroup to another subgroup is permitted; and
- said control unit is operable to judge, if the device that issued the duplication request is judged to be in the group, to which subgroup the device belongs, and control duplication of the content based on the judgment by said control unit, the duplication restricting information, and the first table.

5. The networked apparatus according to claim 2, wherein said control unit is operable to transmit, to the device that issued the duplication request if the device is judged to be in the group, information indicating a permitted number that is equal to or smaller than the permitted number stored in said storage unit, and refuse to perform the transmission to the device that issued the duplication request if the device is judged to be out of the group.

6. The networked apparatus according to claim 5, wherein said control unit is operable to transmit, to the device that issued the duplication request, the content attached to the duplication restricting information that includes the permitted number showing the equal or smaller number.

7. The networked apparatus according to claim 2, wherein:
- said storage unit is operable to store secret information that is also stored in all devices that are in the group; and
- said judging unit is operable to judge that the device that issued the duplication request is in the group if the device has the secret information, and judge that the device is out of the group if the device does not have the secret information.

8. The networked apparatus according to claim 7, wherein said control unit includes
- a first generating unit operable to generate a first permitted number of duplications, and
- a second generating unit operable to generate a second permitted number of duplications, the second permitted number being obtained by subtracting the first permitted number from the permitted number of duplications that is currently stored in said storage unit; and
- said control unit is operable to (i) transmit the first permitted number and the content to the device that issued the duplication request, and (ii) overwrite the permitted number with the second permitted number.

9. The networked apparatus according to claim 8, wherein the duplication request is composed of a requested number of duplications of the content; and
- said first generating unit is operable to (i) judge whether the permitted number of duplications stored in said storage unit is equal to or greater than the requested number of duplications, (ii) designate, if the permitted number of duplications stored in said storage unit is judged to be equal to or greater than the requested number of duplications, the requested number of duplications as the first permitted number, and (iii) designate, if the permitted number of duplications stored in said storage unit is judged to be less than the requested number of duplications, the permitted number of duplications as the first permitted number.

10. The networked apparatus according to claim 8, wherein:
- each device that is in the group is one of a first type of device that records a content to a non-portable recording medium and a second type of device that records a content to a portable recording medium;
- the duplication request is composed of a requested number of duplications of the content to the first type of device and a requested number of duplications of the content to the second type of device; and
- said first generating unit is operable to (i) judge whether each of the two permitted numbers are equal to or greater than a corresponding one of the two requested numbers, (ii) designate, if each of the two permitted numbers are judged to be equal to or greater than the corresponding one of the two requested numbers, a sum of the two requested numbers as the first permitted number, and (iii) designate, if each of the two permitted numbers are not judged to be equal to or greater than the corresponding one of the two requested numbers, a sum of the two permitted numbers as the first permitted number.

11. The networked apparatus according to claim 10, wherein:
- each device that is in the group belongs to at least one subgroup,
- said first generating unit is operable to store a first table indicating whether or not duplication of the content from a subgroup to another subgroup is permitted, judge with reference to the first table whether or not duplication of the content to the device that issued the duplication request is permitted, and generate the first permitted number if duplication of the content to the device that issued the duplication request is judged to be permitted.

12. The networked apparatus according to claim 11, wherein:
- said first generating unit is further operable to store a second table indicating subgroup identifiers that are each associated with an upper limit to a permitted number that is possibly held in total by devices belonging to a subgroup identified by a corresponding subgroup identifier;
- the duplication request includes a subgroup identifier identifying a subgroup to which the device that issued the duplication request belongs; and
- said first generating unit is operable to generate the first permitted number with reference to the second table.

13. The networked apparatus according to claim 11, wherein said control unit is operable to transmit, to the device that issued the duplication request, the first and second tables together with the content and the first permitted number.

14. The networked apparatus according to claim 2, further comprising a time management unit operable to clock a date-and-time, wherein said control unit is operable to store a predetermined date-and-time and a post-update permitted number, and update, when the date-and-time clocked by said time management unit reaches the predetermined date-and-time, the permitted number of duplications stored in said storage unit by overwriting with the post-update permitted number.

15. The networked apparatus according to claim 2, further comprising a time management unit operable to clock a date-and-time,
wherein said control unit is operable to store a predetermined date-and-time and information identifying a device to which the content is to be duplicated, and transmit, when the date-and-time clocked by said time management unit reaches the predetermined date-and-time, to the identified device, the content together with a permitted number that is equal to or smaller than the permitted number of duplications stored in said storage unit.

16. The networked apparatus according to claim 2, wherein said control unit is operable to transmit, to the device, the content together with right to play back the content if the device is judged to be out of the group.

17. A content duplication management system comprising a first device that belongs to a group, and a second device connected to said first device via a network,
wherein said first device includes:
a storage unit storing a content and a permitted number of duplications, which represents a number of times that the content is able to be duplicated, the permitted number of duplications being a sum of a permitted number of duplications to a first type of device and a permitted number of duplications to a second type of device;
a receiving unit operable to receive from said second device, a duplication request for the content;
a judging unit operable to judge whether or not said second device belongs to the group; and
a control unit operable to transmit, to said second device if said judging unit judges that said second device belongs to the group, information indicating a permitted number of duplications that is equal to or smaller than the permitted number of duplications stored in said control unit, and refuse to perform the transmission to said second device if said judging unit judges that the said second device does not belong to the group, and wherein said second device includes:
a requesting unit operable to transmit a duplication request for the content to said first device; and
an obtaining unit operable to receive, from said first device, permission to store the content and the permitted number of duplications.

18. The content management system according to claim 17, further comprising a plurality of devices that belong to the group, wherein:

said first device further includes a detection information transmitting unit operable to transmit to each of the devices, detection information used to detect the requested content; and
each of the devices is operable to receive the detection information and perform a search based on the detection information to judge whether there is the requested content stored within the device.

19. A content duplication management method for use by a networked apparatus, the networked apparatus storing a content and duplication restricting information that is attached to the content, belonging to a group, and being connected via a network to at least one device in the group and to at least one device out of the group, said method comprising:
receiving, from a device, a duplication request for the content;
judging whether the device is in the group or out of the group; and
duplicating the content to the device if said judging judges that the device is in the group, and imposing restrictions on duplication of the content to the device if said judging judges that the device is out of the group,
wherein the duplication restricting information indicates a permitted number of duplications which represents a number of times that the content is able to be duplicated to a device, and the permitted number of duplications is a sum of a permitted number of duplications to a first type of device and a permitted number of duplications to a second type of device.

20. A content duplication management program, tangibly embodied in a computer-readable recording medium, for use by a networked apparatus, the networked apparatus storing a content and duplication restricting information that is attached to the content, belonging to a group, and being connected via a network to at least one device in the group and to at least one device out of the group, said program, when run, causing the networked apparatus to perform operations comprising:
receiving, from a device, a duplication request for the content;
judging whether the device is in the group or out of the group; and
duplicating the content to the device if said judging judges that the device is in the group, and imposing restrictions on duplication of the content to the device if said judging judges that the device is out of the group,
wherein the duplication restricting information indicates a permitted number of duplications, which represents a number of times that the content is able to be duplicated to a device, and the permitted number of duplications is a sum of a permitted number of duplications to a first type of device and a permitted number of duplications to a second type of device.

* * * * *

UNITED STATES PATENT AND TRADEMARK OFFICE
CERTIFICATE OF CORRECTION

PATENT NO. : 7,188,224 B2  Page 1 of 1
APPLICATION NO. : 10/649890
DATED : March 6, 2007
INVENTOR(S) : Yuusaku Ohta et al.

It is certified that error appears in the above-identified patent and that said Letters Patent is hereby corrected as shown below:

IN THE CLAIMS

In column 57, line 49, claim 8, please change "claim 7, wherein" to --claim 7, wherein:--.

In column 57, line 62, claim 9, please change "claim 8, wherein" to --claim 8, wherein:--.

In column 58, line 36, claim 11, please change "subgroup," to --subgroup;--.

In column 59, line 35, claim 17, please change "to receive from" to --to receive, from--.

In column 60, line 2, claim 18, please change "to transmit to" to --to transmit, to--.

Signed and Sealed this

Fifth Day of June, 2007

JON W. DUDAS
*Director of the United States Patent and Trademark Office*